(12) United States Patent
Zhang et al.

(10) Patent No.: US 12,519,930 B2
(45) Date of Patent: Jan. 6, 2026

(54) ADAPTIVE MOTION CANDIDATE LIST

(71) Applicants: Beijing Bytedance Network Technology Co., Ltd., Beijing (CN); Bytedance Inc., Los Angeles, CA (US)

(72) Inventors: Na Zhang, Beijing (CN); Kai Zhang, Los Angeles, CA (US); Li Zhang, Los Angeles, CA (US); Hongbin Liu, Beijing (CN); Zhipin Deng, Beijing (CN); Yang Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 74 days.

(21) Appl. No.: 18/286,212

(22) PCT Filed: Apr. 9, 2022

(86) PCT No.: PCT/CN2022/085991
§ 371 (c)(1),
(2) Date: Oct. 9, 2023

(87) PCT Pub. No.: WO2022/214100
PCT Pub. Date: Oct. 13, 2022

(65) Prior Publication Data
US 2024/0187567 A1 Jun. 6, 2024

(30) Foreign Application Priority Data
Apr. 9, 2021 (WO) ................ PCT/CN2021/086215

(51) Int. Cl.
*H04N 19/105* (2014.01)
*H04N 19/139* (2014.01)
(Continued)

(52) U.S. Cl.
CPC ......... *H04N 19/105* (2014.11); *H04N 19/139* (2014.11); *H04N 19/176* (2014.11); *H04N 19/186* (2014.11)

(58) Field of Classification Search
CPC .. H04N 19/105; H04N 19/139; H04N 19/176; H04N 19/186
(Continued)

(56) References Cited

U.S. PATENT DOCUMENTS 11,206,396 B2 * 12/2021 Seregin ................ H04N 19/159
2020/0053364 A1    2/2020 Seo et al.
(Continued)

FOREIGN PATENT DOCUMENTS

| CN | 107710764 A | 2/2018 |
| CN | 110915214 A | 3/2020 |

(Continued)

OTHER PUBLICATIONS

Saurav Bandyopadhyay et al. "CE1: LIC applied after bi-prediction (CE1-5.3)", Joint Video Experts Team (JVET) of ITU-T SG 16 WP 3 and ISO/IEC JTC 1/SC 29/WG 11, 14th Meeting: Geneva, CH, Mar. 27, 2019, 4 pages.

(Continued)

*Primary Examiner* — Dominic D Saltarelli
(74) *Attorney, Agent, or Firm* — Astute IP Law Group

(57) ABSTRACT

Embodiments of the present disclosure provide a solution for video processing. A method for video processing is proposed. The method comprises: determining, during a conversion between a current block of a video and a bitstream, reference samples of a sub-template of the current block based on a first set of reference samples of the sub-template in a first reference list and a second set of reference samples of the sub-template in a second reference list; and determining a target motion candidate list based on (Continued)

the reference samples of the sub-template. Compared with the conventional solution, the proposed method can advantageously improve the coding efficiency.

19 Claims, 24 Drawing Sheets

(51) Int. Cl.
*H04N 19/176* (2014.01)
*H04N 19/186* (2014.01)

(58) Field of Classification Search
USPC .................................................. 375/240.16
See application file for complete search history.

(56) References Cited

U.S. PATENT DOCUMENTS

| | | | |
|---|---|---|---|
| 2020/0228796 A1 | 7/2020 | Seregin et al. | |
| 2020/0336738 A1 | 10/2020 | Xiu et al. | |

FOREIGN PATENT DOCUMENTS

| | | |
|---|---|---|
| CN | 111194553 A | 5/2020 |
| CN | 112106367 A | 12/2020 |
| CN | 109792518 A | 5/2021 |
| EP | 3468193 A1 | 4/2019 |

OTHER PUBLICATIONS

Na Zhang et al. "CE4-related: Simplified local illumination compensation", Joint Video Experts Team (JVET) of ITU-T SG 16 WP 3 and ISO/IEC JTC 1/SC 29/WG 11 15th Meeting: Gothenburg, SE, Jul. 12, 2019, 5 pages.

International Search Report issued in corresponding International Application No. PCT/CN2022/085991 dated Jun. 29, 2022.

\* cited by examiner

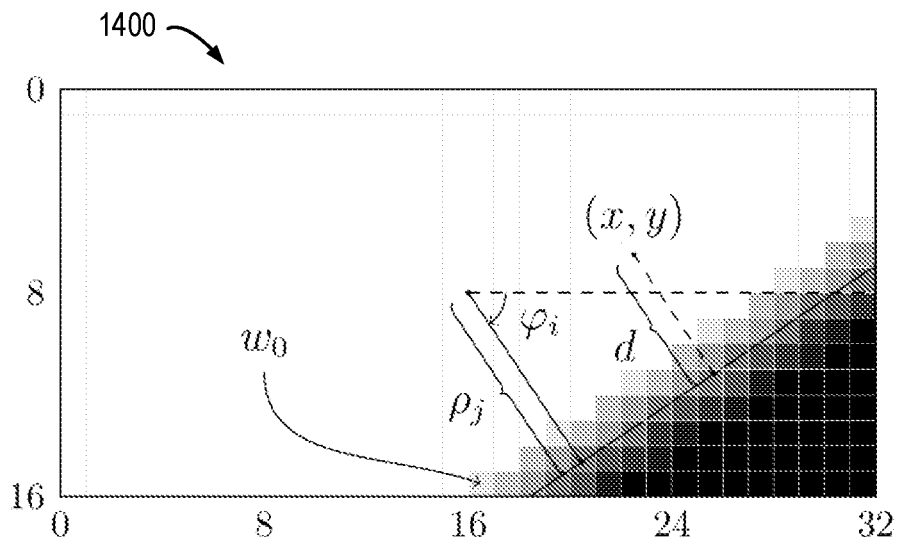
Fig. 13
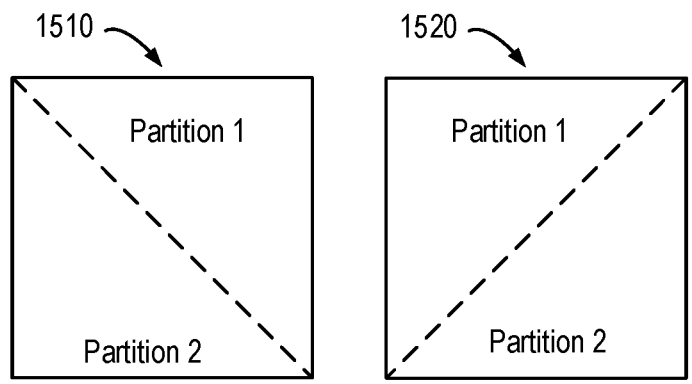
Fig. 14
Fig. 15

ADAPTIVE MOTION CANDIDATE LIST

The present application is a 35 U.S.C. § 371 National Phase of International Patent Application No. PCT/CN2022/085991, titled "ADAPTIVE MOTION CANDIDATE LIST," and filed Apr. 9, 2022, which claims a priority to Chinese International Application No. PCT/CN2021/086215, titled "ADAPTIVE MOTION CANDIDATE LIST" and filed on Apr. 9, 2021, the entire contents of which are incorporated herein by reference.

FIELD

Embodiments of the present disclosure relates generally to video coding techniques, and more particularly, to reference structure for video coding.

BACKGROUND

In nowadays, digital video capabilities are being applied in various aspects of peoples' lives. Multiple types of video compression technologies, such as MPEG-2, MPEG-4, ITU-TH.263, ITU-TH.264/MPEG-4 Part 10 Advanced Video Coding (AVC), ITU-TH.265 high efficiency video coding (HEVC) standard, versatile video coding (VVC) standard, have been proposed for video encoding/decoding. However, coding efficiency of conventional video coding techniques is generally very low, which is undesirable.

SUMMARY

Embodiments of the present disclosure provide a solution for video processing.

In a first aspect, a method for video processing is proposed. The method comprises: determining, during a conversion between a current block of a video and a bitstream of the video, reference samples of a sub-template of the current block based on a first set of reference samples of the sub-template in a first reference list and a second set of reference samples of the sub-template in a second reference list; and determining a target motion candidate list based on the reference samples of the sub-template. The method in accordance with the first aspect of the present disclosure determines the reference samples of a sub-template using reference samples from two reference lists. Compared with the conventional solution, the proposed method can advantageously improve the coding efficiency.

In a second aspect, a further method for video processing is proposed. The method comprises: determining, during a conversion between a current block of a video and a bitstream of the video, reference samples of a template or a sub-template of the current block using a Local illumination compensation (LIC) method, wherein a first set of LIC parameters of the template of the sub-templates are determined based on a second set of LIC parameters of the current block; and determining a target motion candidate list based on the reference samples. The method in accordance with the second aspect of the present disclosure determines the LIC parameters based on the LIC parameters of the current block. Compared with the conventional solution, the proposed method can advantageously improve the coding efficiency.

In a third aspect, a further method for video processing is proposed. The method comprises: determining, during a conversion between a current block of a video and a bitstream of the video, reference samples of a template or sub-template of the current block according to an Overlapped Block Motion Compensation (OBMC) method; and determining a target motion candidate list based on the reference samples of the template or sub-template. The method in accordance with the third aspect of the present disclosure employs OBMC method to determine the reference samples of a template or sub-template. Compared with the conventional solution, the proposed method can advantageously improve the coding efficiency.

In a third aspect, an electronic device is proposed. The electronic device comprises a processing unit, and a memory coupled to the processing unit and having instructions stored thereon which, when executed by the processing unit, cause electronic device to perform a method in accordance with the first, second or third aspect of the present disclosure.

In a fourth aspect, a non-transitory computer-readable storage medium is proposed. The non-transitory computer-readable storage medium storing instructions that cause a processor to perform a method in accordance with the first, second or third aspect of the present disclosure.

In a fifth aspect, a non-transitory computer-readable recording medium is proposed. The non-transitory computer-readable recording medium storing a bitstream of a video which is generated by a method in accordance with the first, second or third aspect of the present disclosure, wherein the method is performed by a video processing apparatus.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

FIG. 13 illustrates a schematic diagram of uni-prediction MV selection for geometric partitioning mode;

FIG. 14 illustrates a schematic diagram of exemplified generation of a bending weight w0 using geometric partitioning mode;

FIG. 15 illustrates a schematic diagram of triangle partition based inter prediction;

Throughout the drawings, the same or similar reference numerals usually refer to the same or similar elements.

DETAILED DESCRIPTION

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Example Environment

Figure 1:
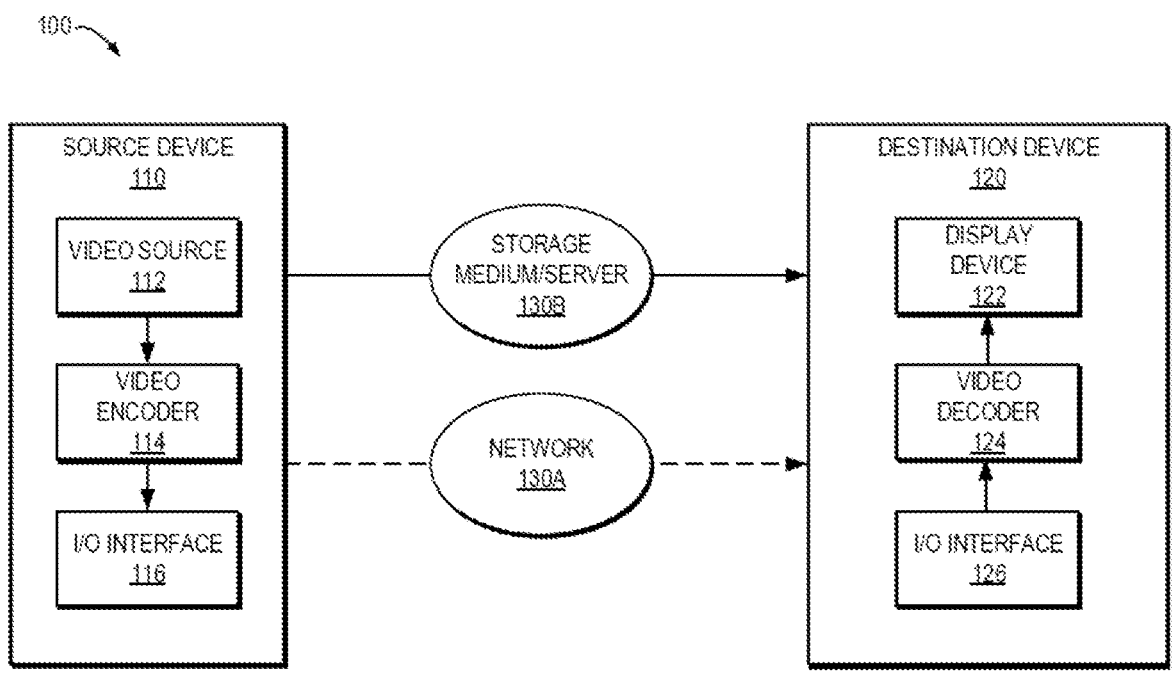
FIG. 1 is a block diagram that illustrates an example video coding system, in accordance with some embodiments of the present disclosure.

FIG. 1 is a block diagram that illustrates an example video coding system 100 that may utilize the techniques of this disclosure. As shown, the video coding system 100 may include a source device 110 and a destination device 120. The source device 110 can be also referred to as a video encoding device, and the destination device 120 can be also referred to as a video decoding device. In operation, the source device 110 can be configured to generate encoded video data and the destination device 120 can be configured to decode the encoded video data generated by the source device 110. The source device 110 may include a video source 112, a video encoder 114, and an input/output (I/O) interface 116.

The video source 112 may include a source such as a video capture device. Examples of the video capture device include, but are not limited to, an interface to receive video data from a video content provider, a computer graphics system for generating video data, and/or a combination thereof.

The video data may comprise one or more pictures. The video encoder 114 encodes the video data from the video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. The I/O interface 116 may include a modulator/demodulator and/or a transmitter. The encoded video data may be transmitted directly to destination device 120 via the I/O interface 116 through the network 130A. The encoded video data may also be stored onto a storage medium/server 130B for access by destination device 120.

The destination device 120 may include an I/O interface 126, a video decoder 124, and a display device 122. The I/O interface 126 may include a receiver and/or a modem. The I/O interface 126 may acquire encoded video data from the source device 110 or the storage medium/server 130B. The video decoder 124 may decode the encoded video data. The display device 122 may display the decoded video data to a user. The display device 122 may be integrated with the destination device 120, or may be external to the destination device 120 which is configured to interface with an external display device.

The video encoder 114 and the video decoder 124 may operate according to a video compression standard, such as the High Efficiency Video Coding (HEVC) standard, Versatile Video Coding (VVC) standard and other current and/or further standards.

Figure 2:
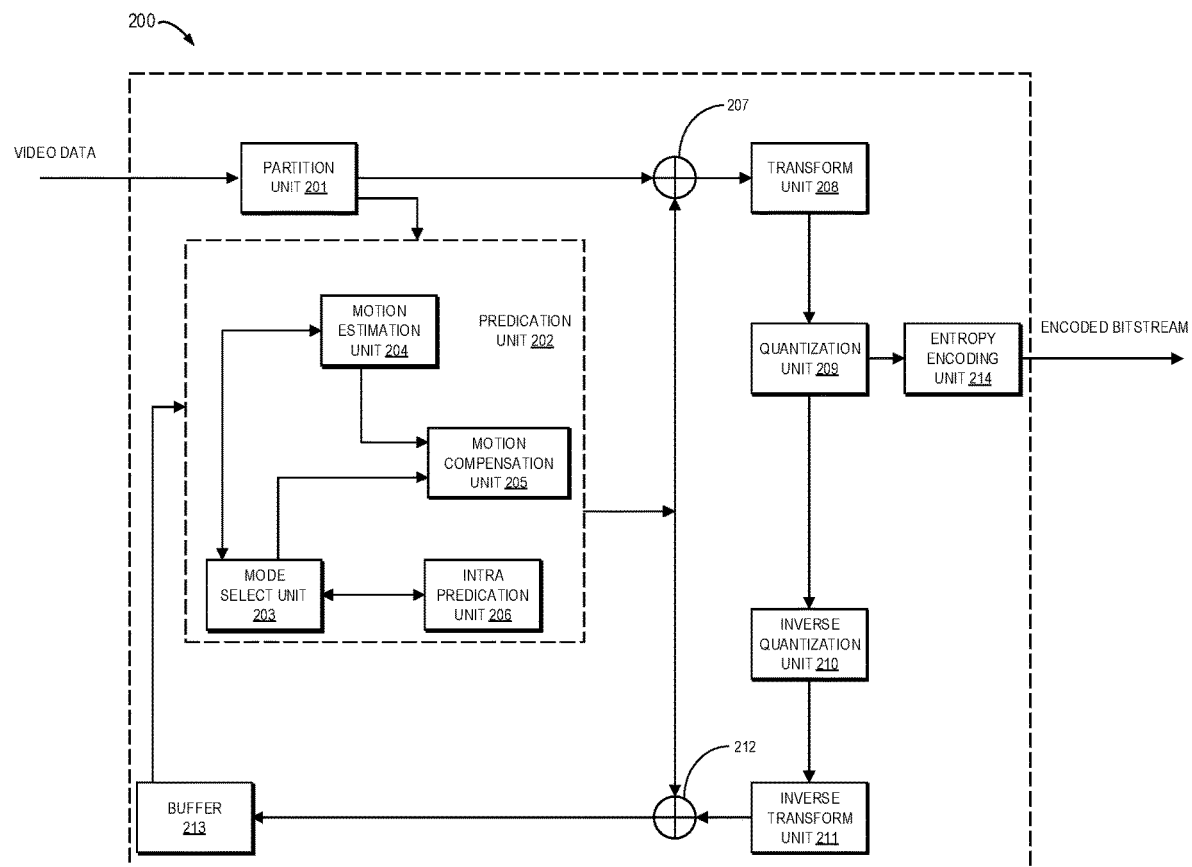
FIG. 2 is a block diagram that illustrates an example video encoder, in accordance with some embodiments of the present disclosure.

FIG. 2 is a block diagram illustrating an example of a video encoder 200, which may be an example of the video encoder 114 in the system 100 illustrated in FIG. 1, in accordance with some embodiments of the present disclosure.

The video encoder 200 may be configured to implement any or all of the techniques of this disclosure. In the example of FIG. 2, the video encoder 200 includes a plurality of functional components. The techniques described in this disclosure may be shared among the various components of the video encoder 200. In some examples, a processor may be configured to perform any or all of the techniques described in this disclosure.

In some embodiments, the video encoder 200 may include a partition unit 201, a predication unit 202 which may include a mode select unit 203, a motion estimation unit 204, a motion compensation unit 205 and an intra-prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, the video encoder 200 may include more, fewer, or different functional components. In an example, the predication unit 202 may include an intra block copy (IBC) unit. The IBC unit may perform predication in an IBC mode in which at least one reference picture is a picture where the current video block is located.

Furthermore, although some components, such as the motion estimation unit 204 and the motion compensation unit 205, may be integrated, but are represented in the example of FIG. 2 separately for purposes of explanation.

The partition unit 201 may partition a picture into one or more video blocks. The video encoder 200 and the video decoder 300 may support various video block sizes.

The mode select unit 203 may select one of the coding modes, intra or inter, e.g., based on error results, and provide the resulting intra-coded or inter-coded block to a residual generation unit 207 to generate residual block data and to a reconstruction unit 212 to reconstruct the encoded block for use as a reference picture. In some examples, the mode select unit 203 may select a combination of intra and inter predication (CIIP) mode in which the predication is based on an inter predication signal and an intra predication signal. The mode select unit 203 may also select a resolution for a motion vector (e.g., a sub-pixel or integer pixel precision) for the block in the case of inter-predication.

To perform inter prediction on a current video block, the motion estimation unit 204 may generate motion information for the current video block by comparing one or more reference frames from buffer 213 to the current video block. The motion compensation unit 205 may determine a predicted video block for the current video block based on the motion information and decoded samples of pictures from the buffer 213 other than the picture associated with the current video block.

The motion estimation unit 204 and the motion compensation unit 205 may perform different operations for a current video block, for example, depending on whether the current video block is in an I-slice, a P-slice, or a B-slice. As used herein, an "I-slice" may refer to a portion of a picture composed of macroblocks, all of which are based upon macroblocks within the same picture. Further, as used herein, in some aspects, "P-slices" and "B-slices" may refer to portions of a picture composed of macroblocks that are not dependent on macroblocks in the same picture.

In some examples, the motion estimation unit 204 may perform uni-directional prediction for the current video block, and the motion estimation unit 204 may search reference pictures of list 0 or list 1 for a reference video block for the current video block. The motion estimation unit 204 may then generate a reference index that indicates the reference picture in list 0 or list 1 that contains the reference video block and a motion vector that indicates a spatial displacement between the current video block and the reference video block. The motion estimation unit 204 may output the reference index, a prediction direction indicator, and the motion vector as the motion information of the current video block. The motion compensation unit 205 may generate the predicted video block of the current video block based on the reference video block indicated by the motion information of the current video block.

Alternatively, in other examples, the motion estimation unit 204 may perform bi-directional prediction for the current video block. The motion estimation unit 204 may search the reference pictures in list 0 for a reference video block for the current video block and may also search the reference pictures in list 1 for another reference video block for the current video block. The motion estimation unit 204 may then generate reference indexes that indicate the reference pictures in list 0 and list 1 containing the reference video blocks and motion vectors that indicate spatial displacements between the reference video blocks and the current video block. The motion estimation unit 204 may output the reference indexes and the motion vectors of the current video block as the motion information of the current video block. The motion compensation unit 205 may generate the predicted video block of the current video block based on the reference video blocks indicated by the motion information of the current video block.

In some examples, the motion estimation unit 204 may output a full set of motion information for decoding processing of a decoder. Alternatively, in some embodiments, the motion estimation unit 204 may signal the motion information of the current video block with reference to the motion information of another video block. For example, the motion estimation unit 204 may determine that the motion information of the current video block is sufficiently similar to the motion information of a neighboring video block.

In one example, the motion estimation unit 204 may indicate, in a syntax structure associated with the current video block, a value that indicates to the video decoder 300 that the current video block has the same motion information as the another video block.

In another example, the motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

The intra prediction unit 206 may perform intra prediction on the current video block. When the intra prediction unit 206 performs intra prediction on the current video block, the intra prediction unit 206 may generate prediction data for the current video block based on decoded samples of other video blocks in the same picture. The prediction data for the current video block may include a predicted video block and various syntax elements.

The residual generation unit 207 may generate residual data for the current video block by subtracting (e.g., indicated by the minus sign) the predicted video block (s) of the current video block from the current video block. The residual data of the current video block may include residual video blocks that correspond to different sample components of the samples in the current video block.

In other examples, there may be no residual data for the current video block for the current video block, for example in a skip mode, and the residual generation unit 207 may not perform the subtracting operation.

The transform processing unit 208 may generate one or more transform coefficient video blocks for the current video block by applying one or more transforms to a residual video block associated with the current video block.

After the transform processing unit 208 generates a transform coefficient video block associated with the current video block, the quantization unit 209 may quantize the transform coefficient video block associated with the current video block based on one or more quantization parameter (QP) values associated with the current video block.

The inverse quantization unit 210 and the inverse transform unit 211 may apply inverse quantization and inverse transforms to the transform coefficient video block, respectively, to reconstruct a residual video block from the transform coefficient video block. The reconstruction unit 212 may add the reconstructed residual video block to corresponding samples from one or more predicted video blocks generated by the predication unit 202 to produce a reconstructed video block associated with the current video block for storage in the buffer 213.

After the reconstruction unit 212 reconstructs the video block, loop filtering operation may be performed to reduce video blocking artifacts in the video block.

The entropy encoding unit 214 may receive data from other functional components of the video encoder 200. When the entropy encoding unit 214 receives the data, the entropy encoding unit 214 may perform one or more entropy encoding operations to generate entropy encoded data and output a bitstream that includes the entropy encoded data.

Figure 3:
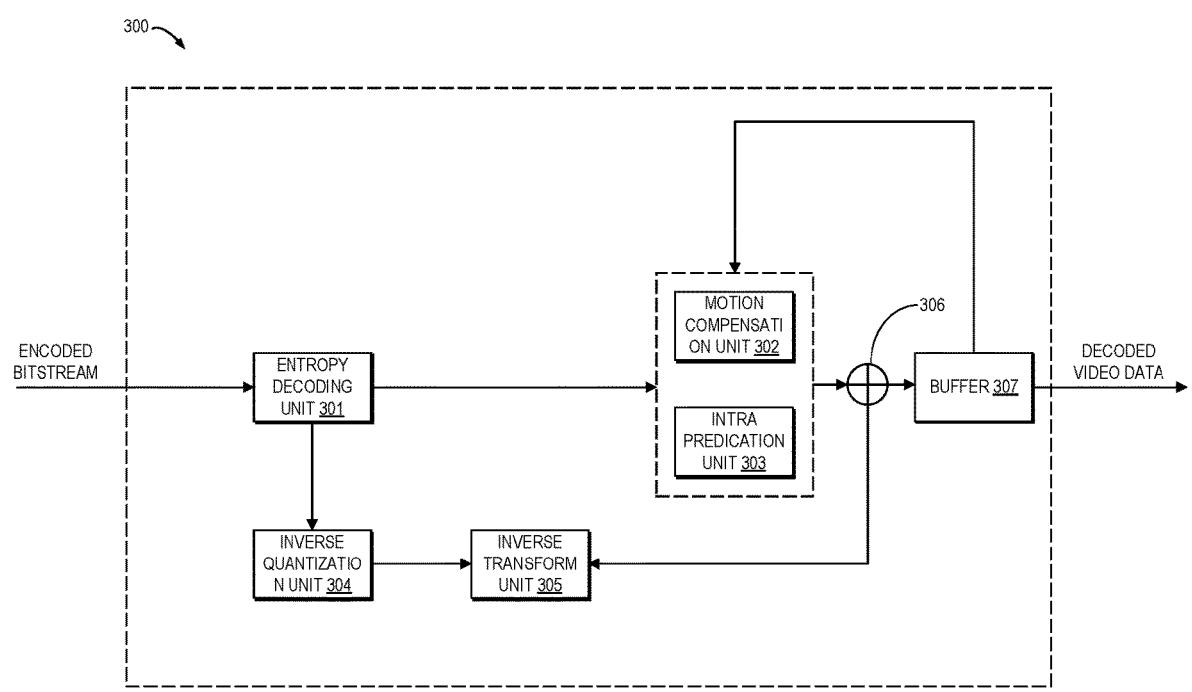
FIG. 3 is a block diagram that illustrates an example video decoder, in accordance with some embodiments of the present disclosure.

FIG. 3 is a block diagram illustrating an example of a video decoder 300, which may be an example of the video decoder 124 in the system 100 illustrated in FIG. 1, in accordance with some embodiments of the present disclosure.

The video decoder 300 may be configured to perform any or all of the techniques of this disclosure. In the example of FIG. 3, the video decoder 300 includes a plurality of functional components. The techniques described in this disclosure may be shared among the various components of the video decoder 300. In some examples, a processor may be configured to perform any or all of the techniques described in this disclosure.

In the example of FIG. 3, the video decoder 300 includes an entropy decoding unit 301, a motion compensation unit 302, an intra prediction unit 303, an inverse quantization unit 304, an inverse transformation unit 305, and a reconstruction unit 306 and a buffer 307. The video decoder 300 may, in some examples, perform a decoding pass generally reciprocal to the encoding pass described with respect to video encoder 200.

The entropy decoding unit 301 may retrieve an encoded bitstream. The encoded bitstream may include entropy coded video data (e.g., encoded blocks of video data). The entropy decoding unit 301 may decode the entropy coded video data, and from the entropy decoded video data, the motion compensation unit 302 may determine motion information including motion vectors, motion vector precision, reference picture list indexes, and other motion information. The motion compensation unit 302 may, for example, determine such information by performing the AMVP and merge mode. AMVP is used, including derivation of several most probable candidates based on data from adjacent PBs and the reference picture. Motion information typically includes the horizontal and vertical motion vector displacement values, one or two reference picture indices, and, in the case of prediction regions in B slices, an identification of which reference picture list is associated with each index. As used herein, in some aspects, a "merge mode" may refer to deriving the motion information from spatially or temporally neighboring blocks.

The motion compensation unit 302 may produce motion compensated blocks, possibly performing interpolation based on interpolation filters. Identifiers for interpolation filters to be used with sub-pixel precision may be included in the syntax elements.

The motion compensation unit 302 may use the interpolation filters as used by the video encoder 200 during encoding of the video block to calculate interpolated values for sub-integer pixels of a reference block. The motion compensation unit 302 may determine the interpolation filters used by the video encoder 200 according to the received syntax information and use the interpolation filters to produce predictive blocks.

The motion compensation unit 302 may use at least part of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence. As used herein, in some aspects, a "slice" may refer to a data structure that can be decoded independently from other slices of the same picture, in terms of entropy coding, signal prediction, and residual signal reconstruction. A slice can either be an entire picture or a region of a picture.

The intra prediction unit 303 may use intra prediction modes for example received in the bitstream to form a prediction block from spatially adjacent blocks. The inverse quantization unit 304 inverse quantizes, i.e., de-quantizes, the quantized video block coefficients provided in the bitstream and decoded by entropy decoding unit 301. The inverse transform unit 305 applies an inverse transform.

The reconstruction unit 306 may obtain the decoded blocks, e.g., by summing the residual blocks with the corresponding prediction blocks generated by the motion compensation unit 302 or intra-prediction unit 303. If desired, a deblocking filter may also be applied to filter the decoded blocks in order to remove blockiness artifacts. The decoded video blocks are then stored in the buffer 307, which provides reference blocks for subsequent motion compensation/intra predication and also produces decoded video for presentation on a display device.

Some exemplary embodiments of the present disclosure will be described in detailed hereinafter. It should be understood that section headings are used in the present document to facilitate ease of understanding and do not limit the embodiments disclosed in a section to only that section. Furthermore, while certain embodiments are described with reference to Versatile Video Coding or other specific video codecs, the disclosed techniques are applicable to other video coding technologies also. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

1. SUMMARY

This disclosure is related to video coding technologies. Specifically, it is related to inter prediction in video coding. It may be applied to the existing video coding standard like HEVC, or the standard Versatile Video Coding (VVC) to be finalized. It may be also applicable to future video coding standards or video codec.

2. BACKGROUND

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards (see ITU-T and ISO/IEC, "High efficiency video coding", Rec. ITU-T H.265| ISO/IEC 23008-2 (in force edition)). Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM) (see J. Chen, E. Alshina, G. J. Sullivan, J.-R. Ohm, J. Boyce, "Algorithm description of Joint Exploration Test Model 7 (JEM7)," JVET-G1001, August 2017; JEM-7.0: https://jvet.hhi.fraunhofer.de/svn/svn_HMJEMSoftware/tags/HM-16.6-JEM-7.0). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

2.1. Extended Merge Prediction

In VVC, the merge candidate list is constructed by including the following five types of candidates in order:
1) Spatial motion vector prediction (MVP) from spatial neighbour coding units (CUs)
2) Temporal MVP from collocated CUs
3) History-based MVP from a first-in-first-out (FIFO) table
4) Pairwise average MVP
5) Zero MVs.

The size of merge list is signalled in sequence parameter set header and the maximum allowed size of merge list is 6. For each CU code in merge mode, an index of best merge candidate is encoded using truncated unary binarization (TU). The first bin of the merge index is coded with context and bypass coding is used for other bins.

The derivation process of each category of merge candidates is provided in this session. As done in HEVC, VVC also supports parallel derivation of the merging candidate lists for all CUs within a certain size of area.

Spatial Candidates Derivation

Figure 4:
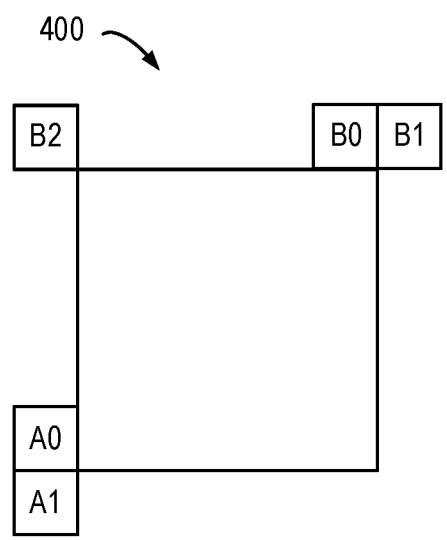
FIG. 4 illustrates a schematic diagram of positions of spatial merge candidates.
Figure 5:
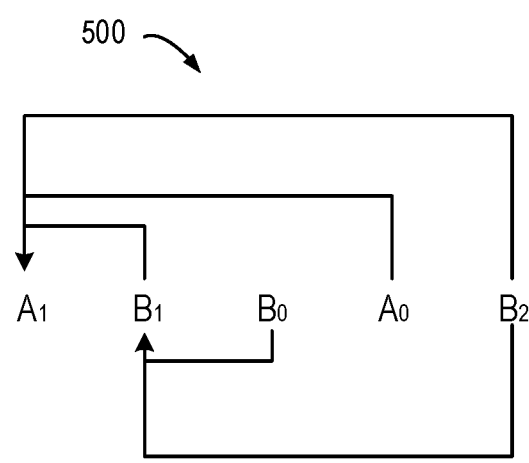
FIG. 5 illustrates a schematic diagram of candidate pairs considered for redundancy check of spatial merge candidates.

The derivation of spatial merge candidates in VVC is same to that in HEVC except the positions of first two merge candidates are swapped. FIG. 4 illustrates a schematic diagram 400 showing positions of spatial merge candidates. A maximum of four merge candidates are selected among candidates located in the positions depicted in FIG. 4. The order of derivation is $B_0$, $A_0$, $B_1$, $A_1$ and $B_2$. Position $B_2$ is considered only when one or more than one CUs of position $B_0$, $A_0$, $B_1$, $A_1$ are not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. FIG. 5 illustrates a schematic diagram 500 showing candidate pairs considered for redundancy check of spatial merge candidates. Instead only the pairs linked with an arrow in FIG. 5 are considered and a candidate is only added to the list if the corresponding candidate used for redundancy check has not the same motion information.

Temporal Candidates Derivation

Figure 6:
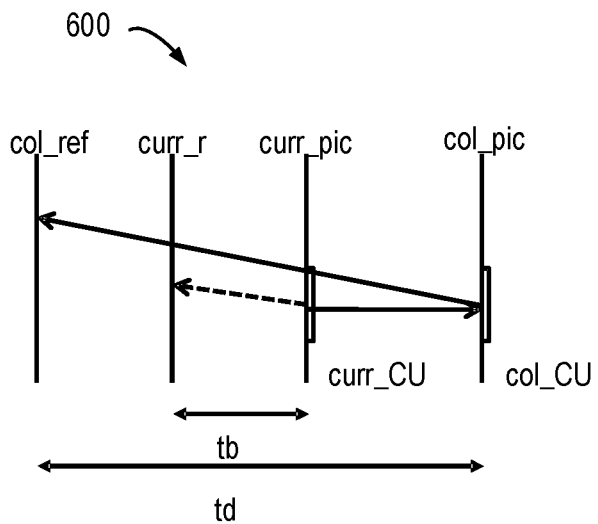
FIG. 6 illustrates a schematic diagram of motion vector scaling for temporal merge candidate.

In this step, only one candidate is added to the list. Particularly, in the derivation of this temporal merge candidate, a scaled motion vector is derived based on co-located CU belonging to the collocated reference picture. The reference picture list to be used for derivation of the co-located CU is explicitly signalled in the slice header. FIG. 6 illustrates a schematic diagram 600 of motion vector scaling for temporal merge candidate. The scaled motion vector for temporal merge candidate is obtained as illustrated by the dotted line in FIG. 6, which is scaled from the motion vector of the co-located CU using the picture order count (POC) distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero.

Figure 7:
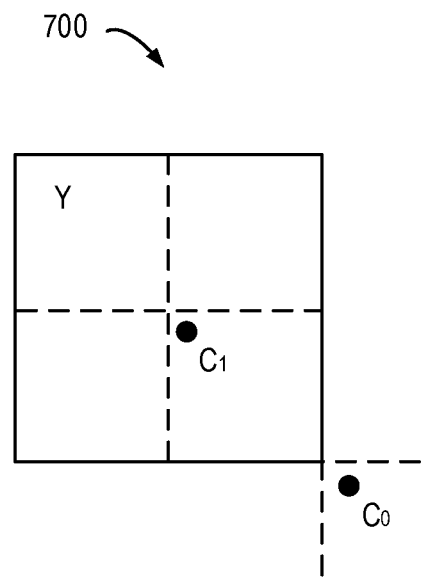
FIG. 7 illustrates a schematic diagram of candidate positions for temporal merge candidates, C0 and C1.

The position for the temporal candidate is selected between candidates $C_0$ and $C_1$, as depicted in a schematic diagram 700 in FIG. 7. If CU at position $C_0$ is not available, is intra coded, or is outside of the current row of coding tree units (CTUs), position $C_1$ is used. Otherwise, position $C_0$ is used in the derivation of the temporal merge candidate.

History-Based Merge Candidates Derivation

The history-based MVP (HMVP) merge candidates are added to merge list after the spatial MVP and TMVP. In this method, the motion information of a previously coded block is stored in a table and used as MVP for the current CU. The table with multiple HMVP candidates is maintained during the encoding/decoding process. The table is reset (emptied) when a new CTU row is encountered. Whenever there is a non-subblock inter-coded CU, the associated motion information is added to the last entry of the table as a new HMVP candidate.

The HMVP table size S is set to be 6, which indicates up to 6 History-based MVP (HMVP) candidates may be added to the table. When inserting a new motion candidate to the table, a constrained first-in-first-out (FIFO) rule is utilized wherein redundancy check is firstly applied to find whether there is an identical HMVP in the table. If found, the identical HMVP is removed from the table and all the HMVP candidates afterwards are moved forward. HMVP candidates could be used in the merge candidate list construction process. The latest several HMVP candidates in the table are checked in order and inserted to the candidate list after the TMVP candidate. Redundancy check is applied on the HMVP candidates to the spatial or temporal merge candidate.

To reduce the number of redundancy check operations, the following simplifications are introduced:

1. Number of HMPV candidates is used for merge list generation is set as (N<=4)?M: (8−N), wherein N indicates number of existing candidates in the merge list and M indicates number of available HMVP candidates in the table.

2. Once the total number of available merge candidates reaches the maximally allowed merge candidates minus 1, the merge candidate list construction process from HMVP is terminated.

Pair-Wise Average Merge Candidates Derivation

Pairwise average candidates are generated by averaging predefined pairs of candidates in the existing merge candidate list, and the predefined pairs are defined as {(0, 1), (0, 2), (1, 2), (0, 3), (1, 3), (2, 3)}, where the numbers denote the merge indices to the merge candidate list. The averaged motion vectors are calculated separately for each reference list. If both motion vectors are available in one list, these two motion vectors are averaged even when they point to different reference pictures; if only one motion vector is available, use the one directly; if no motion vector is available, keep this list invalid.

When the merge list is not full after pair-wise average merge candidates are added, the zero MVPs are inserted in the end until the maximum merge candidate number is encountered.

Merge Estimation Region

Merge estimation region (MER) allows independent derivation of merge candidate list for the CUs in the same merge estimation region (MER). A candidate block that is within the same MER to the current CU is not included for the generation of the merge candidate list of the current CU. In addition, the updating process for the history-based motion vector predictor candidate list is updated only if (xCb+cbWidth)>>Log 2ParMrgLevel is greater than xCb>>Log 2ParMrgLevel and (yCb+cbHeight)>>Log 2ParMrgLevel is great than (yCb>>Log 2ParMrgLevel) and where (xCb,yCb) is the top-left luma sample position of the current CU in the picture and (cbWidth,cbHeight) is the CU size. The MER size is selected at encoder side and signalled as log 2_parallel_merge_level_minus2 in the sequence parameter set.

2.2. New Merge Candidates

Non-Adjacent Merge Candidates Derivation

Figure 8:
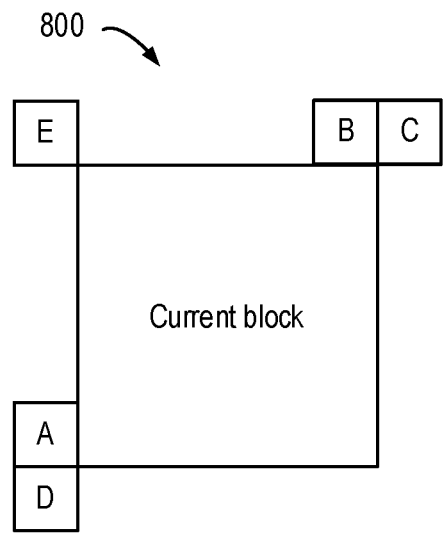
FIG. 8 illustrates a schematic diagram of VVC spatial neighboring blocks of the current block.

FIG. 8 illustrates a schematic diagram 800 of VVC spatial neighboring blocks of the current block. In VVC, five spatially neighboring blocks shown in FIG. 8 as well as one temporal neighbor are used to derive merge candidates.

It is proposed to derive the additional merge candidates from the positions non-adjacent to the current block using the same pattern as that in VVC. To achieve this, for each search round i, a virtual block is generated based on the current block as follows:

First, the relative position of the virtual block to the current block is calculated by:

Offsetx=−i×gridX,Offsety=−i×gridY where the Offsetx and Offsety denote the offset of the top-left corner of the virtual block relative to the top-left corner of the current block, gridX and gridY are the width and height of the search grid.

Second, the width and height of the virtual block are calculated by:

newWidth=i×2×gridX+currWidth newHeight=i×2×gridY+currHeight.

where the currWidth and currHeight are the width and height of current block. The newWidth and newHeight are the width and height of new virtual block.

gridX and gridY are currently set to currWidth and currHeight, respectively.

Figure 9:
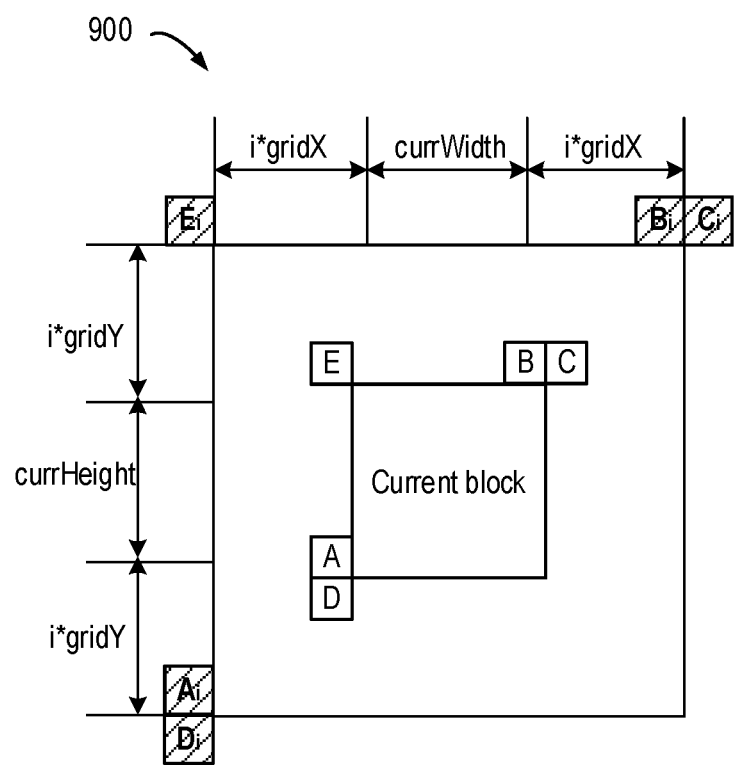
FIG. 9 illustrates a schematic diagram of a virtual block in the ith search round.

FIG. 9 illustrates a schematic diagram of a virtual block in the ith search round, which shows the relationship between the virtual block and the current block.

After generating the virtual block, the blocks $A_i$, $B_i$, $C_i$, $D_i$ and $E_i$ can be regarded as the VVC spatial neighboring blocks of the virtual block and their positions are obtained with the same pattern as that in VVC. Obviously, the virtual block is the current block if the search round i is 0. In this case, the blocks $A_i$, $B_i$, $C_i$, $D_i$ and $E_i$ are the spatially neighboring blocks that are used in VVC merge mode.

When constructing the merge candidate list, the pruning is performed to guarantee each element in merge candidate list to be unique. The maximum search round is set to 1, which means that five non-adjacent spatial neighbor blocks are utilized.

Non-adjacent spatial merge candidates are inserted into the merge list after the temporal merge candidate in the order of $B_1 \to A_1 \to C_1 \to D_1 \to E_1$.

STMVP

It is proposed to derive an averaging candidate as STMVP candidate using three spatial merge candidates and one temporal merge candidate.

STMVP is inserted before the above-left spatial merge candidate.

The STMVP candidate is pruned with all the previous merge candidates in the merge list.

For the spatial candidates, the first three candidates in the current merge candidate list are used.

For the temporal candidate, the same position as VTM/HEVC collocated position is used.

For the spatial candidates, the first, second, and third candidates inserted in the current merge candidate list before STMVP are denoted as F, S, and, T.

The temporal candidate with the same position as VTM/HEVC collocated position used in TMVP is denoted as Col.

The motion vector of the STMVP candidate in prediction direction X (denoted as mvLX) is derived as follows:

1) If the reference indices of the four merge candidates are all valid and are all equal to zero in prediction direction X (X=0 or 1), $mvLX=(mvLX\_F+mvLX\_S+mvLX\_T+mvLX\_Col)>>2$ 2) If reference indices of three of the four merge candidates are valid and are equal to zero in prediction direction X (X=0 or 1), $mvLX=(mvLX\_F\times 3+mvLX\_S\times 3+mvLX\_Col\times 2)>>3$ or $mvLX=(mvLX\_F\times 3+mvLX\_T\times 3+mvLX\_Col\times 2)>>3$ or $mvLX=(mvLX\_S\times 3+mvLX\_T\times 3+mvLX\_Col\times 2)>>3$ 3) If reference indices of two of the four merge candidates are valid and are equal to zero in prediction direction X (X=0 or 1), $mvLX=(mvLX\_F+mvLX\_Col)>>1$ or $mvLX=(mvLX\_S+mvLX\_Col)>>1$ or $mvLX=(mvLX\_T+mvLX\_Col)>>1$ Note: If the temporal candidate is unavailable, the STMVP mode is off.

Merge List Size

If considering both non-adjacent and STMVP merge candidates, the size of merge list is signalled in sequence parameter set header and the maximum allowed size of merge list is 8.

2.3. Merge Mode with MVD (MMVD)

In addition to merge mode, where the implicitly derived motion information is directly used for prediction samples generation of the current CU, the merge mode with motion vector differences (MMVD) is introduced in VVC, which is also known as ultimate motion vector expression. A MMVD flag is signaled right after sending a skip flag and merge flag to specify whether MMVD mode is used for a CU.

In MMVD, a merge candidate (which is called, base merge candidate) is selected, it is further refined by the signalled MVD information. The related syntax elements include an index to specify MVD distance (denoted by mmvd_distance_idx), and an index for indication of motion direction (denoted by mmvd_direction_idx). In MMVD mode, one for the first two candidates in the merge list is selected to be used as MV basis (or base merge candidate). The merge candidate flag is signalled to specify which one is used.

Figure 10:
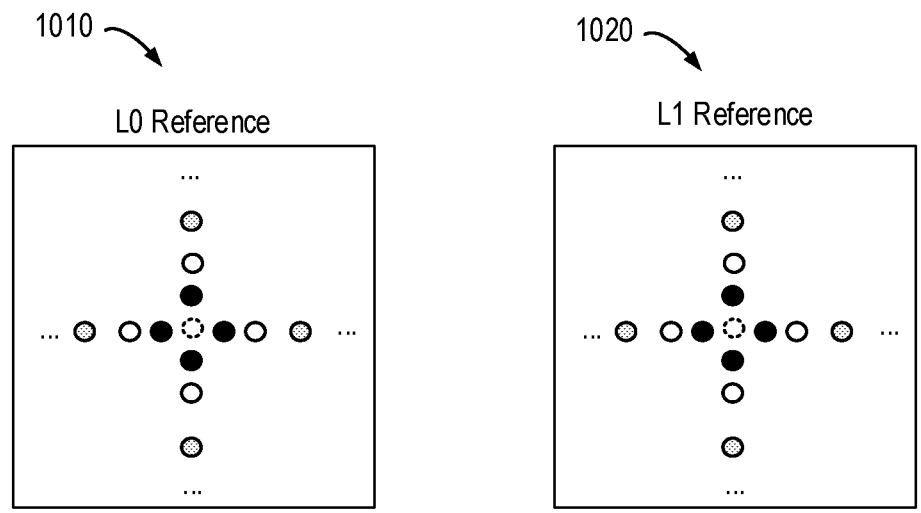
FIG. 10 illustrates a schematic diagram of MMVD Search Point.

Distance index specifies motion magnitude information and indicate the pre-defined offset from the starting point. FIG. 10 illustrates a schematic diagram of MMVD Search Point. As shown in FIG. 10, an offset is added to either horizontal component or vertical component of starting MV. The relation of distance index and pre-defined offset is specified in Table 1.

TABLE 1

The relation of distance index and pre-defined offset

| Distance IDX | 0 | 1 | 2 | 3 | 4 | 5 | 6 | 7 |
|---|---|---|---|---|---|---|---|---|
| Offset (in unit of luma sample) | ¼ | ½ | 1 | 2 | 4 | 8 | 16 | 32 |

Direction index represents the direction of the MVD relative to the starting point. The direction index can represent of the four directions as shown in Table 2. It's noted that the meaning of MVD sign could be variant according to the information of starting MVs. When the starting MVs is a uni-prediction MV or bi-prediction MVs with both lists point to the same side of the current picture (i.e. POCs of two references are both larger than the POC of the current picture, or are both smaller than the POC of the current picture), the sign in Table 2 specifies the sign of MV offset added to the starting MV. When the starting MVs is bi-prediction MVs with the two MVs point to the different sides of the current picture (i.e. the POC of one reference is larger than the POC of the current picture, and the POC of the other reference is smaller than the POC of the current picture), the sign in Table 2 specifies the sign of MV offset added to the list0 MV component of starting MV and the sign for the list1 MV has opposite value.

TABLE 2

Sign of MV offset specified by direction index

| Direction IDX | 00 | 01 | 10 | 11 |
|---|---|---|---|---|
| x-axis | + | − | N/A | N/A |
| y-axis | N/A | N/A | + | − |

Derivation of MVD for Each Reference Picture List

One internal MVD (denoted by MmvdOffset) is firstly derived according to the decoded indices of MVD distance (denoted by mmvd_distance_idx), and motion direction (denoted by mmvd_direction_idx).

Afterwards, if the internal MVD is determined, the final MVD to be added to the base merge candidate for each reference picture list is further derived according to POC distances of reference pictures relative to the current picture, and reference picture types (long-term or short-term). More specifically, the following steps are performed in order:

If the base merge candidate is bi-prediction, the POC distance between current picture and reference picture in list 0, and the POC distance between current picture and reference picture in list 1 is calculated, denoted by POCDiffL0, and POCDidffL1, respectively.

If POCDiffL0 is equal to POCDidffL1, the final MVD for two reference picture lists are both set to the internal MVD.

Otherwise, if Abs(POCDiffL0) is greater than or equal to Abs(POCDiffL1), the final MVD for reference picture list 0 is set to the internal MVD, and the final MVD for reference picture list 1 is set to the scaled MVD using the internal MVD reference picture types of the two reference pictures (both are not long-term reference pictures) or the internal MVD or (zero MV minus the internal MVD) depending on the POC distances.

Otherwise, if Abs(POCDiffL0) is smaller than Abs (POCDiffL1), the final MVD for reference picture list 1 is set to the internal MVD, and the final MVD for reference picture list 0 is set to the scaled MVD using the internal MVD reference picture types of the two reference pictures (both are not long-term reference pictures) or the internal MVD or (zero MV minus the internal MVD) depending on the POC distances.

If the base merge candidate is uni-prediction from reference picture list X, the final MVD for reference picture list X is set to the internal MVD, and the final MVD for reference picture list Y (Y=1−X) is set to 0.

MMVD is also known as Ultimate Motion Vector Expression (UMVE).

2.4. Combined Inter and Intra Prediction (CIIP)

Figure 11:
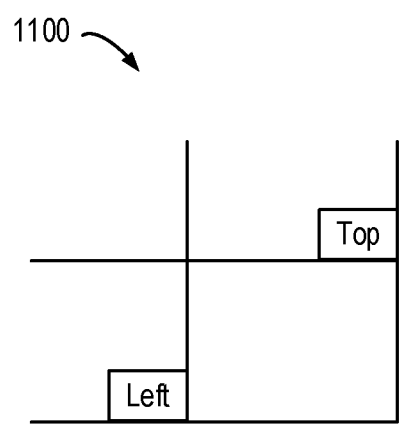
FIG. 11 illustrates a schematic diagram of top and left neighboring blocks used in CIIP weight derivation.

In VVC, when a CU is coded in merge mode, if the CU contains at least 64 luma samples (that is, CU width times CU height is equal to or larger than 64), and if both CU width and CU height are less than 128 luma samples, an additional flag is signalled to indicate if the combined inter/intra prediction (CIIP) mode is applied to the current CU. As its name indicates, the CIIP prediction combines an inter prediction signal with an intra prediction signal. The inter prediction signal in the CIIP mode $P_{inter}$ is derived using the same inter prediction process applied to regular merge mode; and the intra prediction signal $P_{intra}$ is derived following the regular intra prediction process with the planar mode. Then, the intra and inter prediction signals are combined using weighted averaging, where the weight value is calculated depending on the coding modes of the top and left neighbouring blocks (depicted in a schematic diagram 1100 of FIG. 11) as follows:

If the top neighbor is available and intra coded, then set isIntraTop to 1, otherwise set isIntraTop to 0;

If the left neighbor is available and intra coded, then set isIntraLeft to 1, otherwise set isIntraLeft to 0;

If (isIntraLeft+isIntraTop) is equal to 2, then wt is set to 3;

Otherwise, if (isIntraLeft+isIntraTop) is equal to 1, then wt is set to 2;

Otherwise, set wt to 1.

The CIP prediction is formed as follows:

$P_{CIIP}=((4-wt)*P_{inter}+wt*P_{intra}+2)>>2$ 2.5. Geometric Partitioning Mode (GPM)

Figure 12:
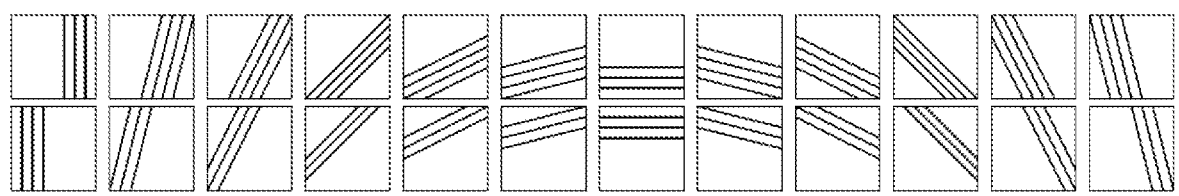
FIG. 12 illustrates examples of the GPM splits grouped by identical angles.

In VVC, a geometric partitioning mode is supported for inter prediction. The geometric partitioning mode is signalled using a CU-level flag as one kind of merge mode, with other merge modes including the regular merge mode, the MMVD mode, the CIIP mode and the subblock merge mode. In total 64 partitions are supported by geometric partitioning mode for each possible CU size w×h=$2^m$×$2^n$ with m,n∈ {3 . . . 6} excluding 8×64 and 64×8. When this mode is used, a CU is split into two parts by a geometrically located straight line (as shown in FIG. 12). The location of the splitting line is mathematically derived from the angle and offset parameters of a specific partition. Each part of a geometric partition in the CU is inter-predicted using its own motion; only uni-prediction is allowed for each partition, that is, each part has one motion vector and one reference index. The uni-prediction motion constraint is applied to ensure that same as the conventional bi-prediction, only two motion compensated prediction are needed for each CU. The uni-prediction motion for each partition is derived using the process described in 2.5.1.

If geometric partitioning mode is used for the current CU, then a geometric partition index indicating the partition mode of the geometric partition (angle and offset), and two merge indices (one for each partition) are further signalled. The number of maximum GPM candidate size is signalled explicitly in SPS and specifies syntax binarization for GPM merge indices. After predicting each of part of the geometric partition, the sample values along the geometric partition edge are adjusted using a blending processing with adaptive weights as in 2.5.2. This is the prediction signal for the whole CU, and transform and quantization process will be applied to the whole CU as in other prediction modes. Finally, the motion field of a CU predicted using the geometric partition modes is stored as in 2.5.3.

2.5.1 Uni-Prediction Candidate List Construction

The uni-prediction candidate list is derived directly from the merge candidate list constructed according to the extended merge prediction process in 2.1. FIG. 13 illustrates a schematic diagram of uni-prediction MV selection for geometric partitioning mode. Denote n as the index of the uni-prediction motion in the geometric uni-prediction candidate list 1310. The LX motion vector of the n-th extended merge candidate, with X equal to the parity of n, is used as the n-th uni-prediction motion vector for geometric partitioning mode. These motion vectors are marked with "x" in FIG. 13. In case a corresponding LX motion vector of the n-the extended merge candidate does not exist, the L(1−X) motion vector of the same candidate is used instead as the uni-prediction motion vector for geometric partitioning mode.

2.5.2 Blending Along the Geometric Partitioning Edge

After predicting each part of a geometric partition using its own motion, blending is applied to the two prediction signals to derive samples around geometric partition edge. The blending weight for each position of the CU are derived based on the distance between individual position and the partition edge.

The distance for a position (x,y) to the partition edge are derived as:

$$d(x, y) = (2x + 1 - w)\cos(\varphi_i) + (2y + 1 - h)\sin(\varphi_i) - \rho_j \quad (2\text{-}1)$$

$$\rho_j = \rho_{x,j}\cos(\varphi_i) + \rho_{y,j}\sin(\varphi_i) \quad (2\text{-}2)$$

-continued $$\rho_{x,j} = \begin{cases} 0 & i\%16 = 8 \text{ or } (i\%16 \neq 0 \text{ and } h \geq w) \\ \pm(j \times w) \gg 2 & \text{otherwise} \end{cases} \quad (2\text{-}3)$$

$$\rho_{y,j} = \begin{cases} \pm(j \times h) \gg 2 & i\%16 = 8 \text{ or } (i\%16 \neq 0 \text{ and } h \geq w) \\ 0 & \text{otherwise} \end{cases} \quad (2\text{-}4)$$

where i,j are the indices for angle and offset of a geometric partition, which depend on the signaled geometric partition index. The sign of $\rho_{x,j}$ and $\rho_{y,j}$ depend on angle index i.

The weights for each part of a geometric partition are derived as following:

$$wIdxL(x, y) = partIdx ? 32 + d(x, y):32 - d(x, y) \quad (2\text{-}5)$$

$$w_0(x, y) = \frac{\text{Clip3}(0, 8, (wIdxL(x, y) + 4) \gg 3)}{8} \quad (2\text{-}6)$$

$$w_1(x, y) = 1 - w_0(x, y) \quad (2\text{-}7)$$

The partIdx depends on the angle index i. FIG. 14 illustrates a schematic diagram 1400 of exemplified generation of a bending weight w0 using geometric partitioning mode. One example of weight $w_0$ is illustrated in FIG. 14.

2.5.3 Motion Field Storage for Geometric Partitioning Mode

Mv1 from the first part of the geometric partition, Mv2 from the second part of the geometric partition and a combined Mv of Mv1 and Mv2 are stored in the motion filed of a geometric partitioning mode coded CU.

The stored motion vector type for each individual position in the motion filed are determined as:

$$sType=abs(motionIdx)<32?2:(motionIdx\leq 0?(1-partIdx):partIdx) \quad (2\text{-}8)$$

where motionIdx is equal to d(4x+2, 4y+2), which is recalculated from equation (2-1). The partIdx depends on the angle index i.

If sType is equal to 0 or 1, Mv0 or Mv1 are stored in the corresponding motion field, otherwise if sType is equal to 2, a combined Mv from Mv0 and Mv2 are stored. The combined Mv are generated using the following process:
1) If Mv1 and Mv2 are from different reference picture lists (one from L0 and the other from L1), then Mv1 and Mv2 are simply combined to form the bi-prediction motion vectors.
2) Otherwise, if Mv1 and Mv2 are from the same list, only uni-prediction motion Mv2 is stored.

2.6. Triangle Partition for Inter Prediction

In VVC, a triangle partition mode (TPM) is supported for inter prediction. The triangle partition mode is only applied to CUs that are 8×8 or larger. The triangle partition mode is signalled using a CU-level flag as one kind of merge mode, with other merge modes including the regular merge mode, the MMVD mode, the CIIP mode and the subblock merge mode.

When this mode is used, a CU is split evenly into two triangle-shaped partitions, using either the diagonal split (a CU 1510 depicted in FIG. 15) or the anti-diagonal split (a CU 1520 depicted in FIG. 15). Each triangle partition in the CU is inter-predicted using its own motion; only uni-prediction is allowed for each partition, that is, each partition has one motion vector and one reference index. The uni-prediction motion constraint is applied to ensure that same as the conventional bi-prediction, only two motion compensated prediction are needed for each CU. The uni-prediction motion for each partition is derived using the process described in 2.6.1.

If triangle partition mode is used for the current CU, then a flag indicating the direction of the triangle partition (diagonal or anti-diagonal), and two merge indices (one for each partition) are further signalled. The number of maximum TPM candidate size is signalled explicitly at slice level and specifies syntax binarization for TMP merge indices. After predicting each of the triangle partitions, the sample values along the diagonal or anti-diagonal edge are adjusted using a blending processing with adaptive weights. This is the prediction signal for the whole CU, and transform and quantization process will be applied to the whole CU as in other prediction modes. Finally, the motion field of a CU predicted using the triangle partition mode is stored as in 2.6.3.

The triangle partition mode is not used in combination with SBT, that is, when the signalled triangle mode is equal to 1, the cu_sbt_flag is inferred to be 0 without signalling.

2.6.1 Uni-Prediction Candidate List Construction

Figures 16, 17:
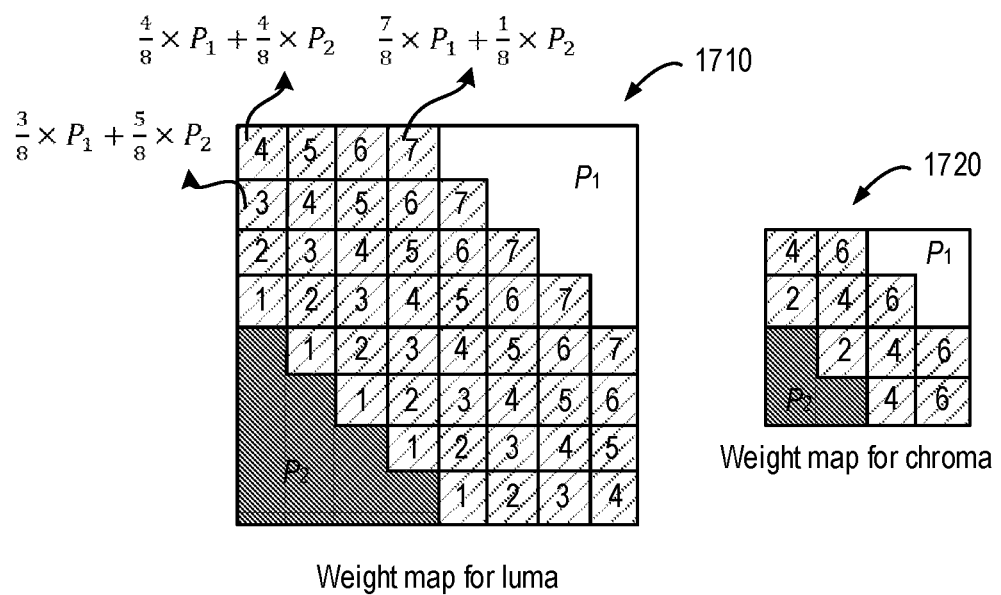
FIG. 16 illustrates a schematic diagram of uni-prediction MV selection for triangle partition mode.
FIG. 17 illustrates a schematic diagram of weights used in the blending process.

The uni-prediction candidate list is derived directly from the merge candidate list constructed according to the extended merge prediction process in 2.1. FIG. 16 illustrates a schematic diagram of uni-prediction MV selection for geometric partitioning mode. Denote n as the index of the uni-prediction motion in the triangle uni-prediction candidate list 1610. The LX motion vector of the n-th extended merge candidate, with X equal to the parity of n, is used as the n-th uni-prediction motion vector for triangle partition mode. These motion vectors are marked with "x" in FIG. 16. In case a corresponding LX motion vector of the n-th extended merge candidate does not exist, the L(1−X) motion vector of the same candidate is used instead as the uni-prediction motion vector for triangle partition mode.

2.6.2 Blending Along the Triangle Partition Edge

After predicting each triangle partition using its own motion, blending is applied to the two prediction signals to derive samples around the diagonal or anti-diagonal edge. The following weights are used in the blending process:

{7/8, 6/8, 5/8, 4/8, 3/8, 2/8, 1/8} for luma and {6/8, 4/8, 2/8} for chroma, as shown in the weight map 1710 and the weight map 1720 of FIG. 17, respectively.

2.6.3 Motion Field Storage

The motion vectors of a CU coded in triangle partition mode are generated using the following process:
1) If Mv1 and Mv2 are from different reference picture lists (one from L0 and the other from L1), then Mv1 and Mv2 are simply combined to form the bi-prediction motion vector.
2) Otherwise, if Mv1 and Mv2 are from the same list, only uni-prediction motion Mv2 is stored.

2.7. JVET-K0143: Template Matching Based Adaptive Merge Candidate Reorder

To improve the coding efficiency, after the merge candidate list is constructed, the order of each merge candidate is adjusted according to the template matching cost. The merge candidates are arranged in the list in accordance with the template matching cost of ascending order. It is operated in the form of sub-group.

Figure 18:
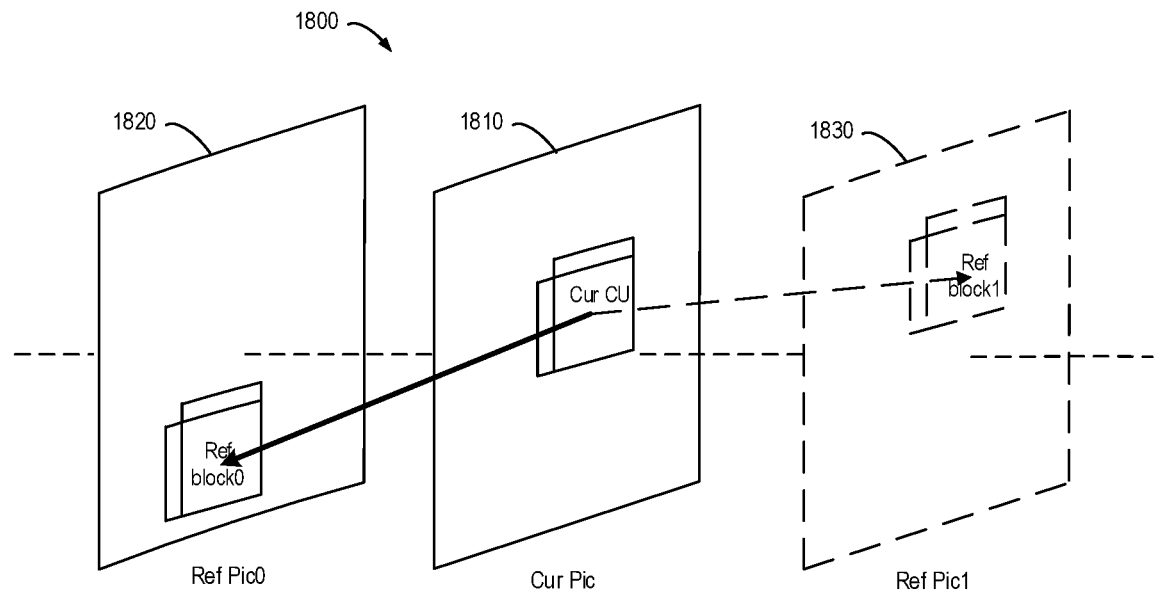
FIG. 18 illustrates a schematic diagram of neighboring samples used for calculating SAD.
Figure 19:
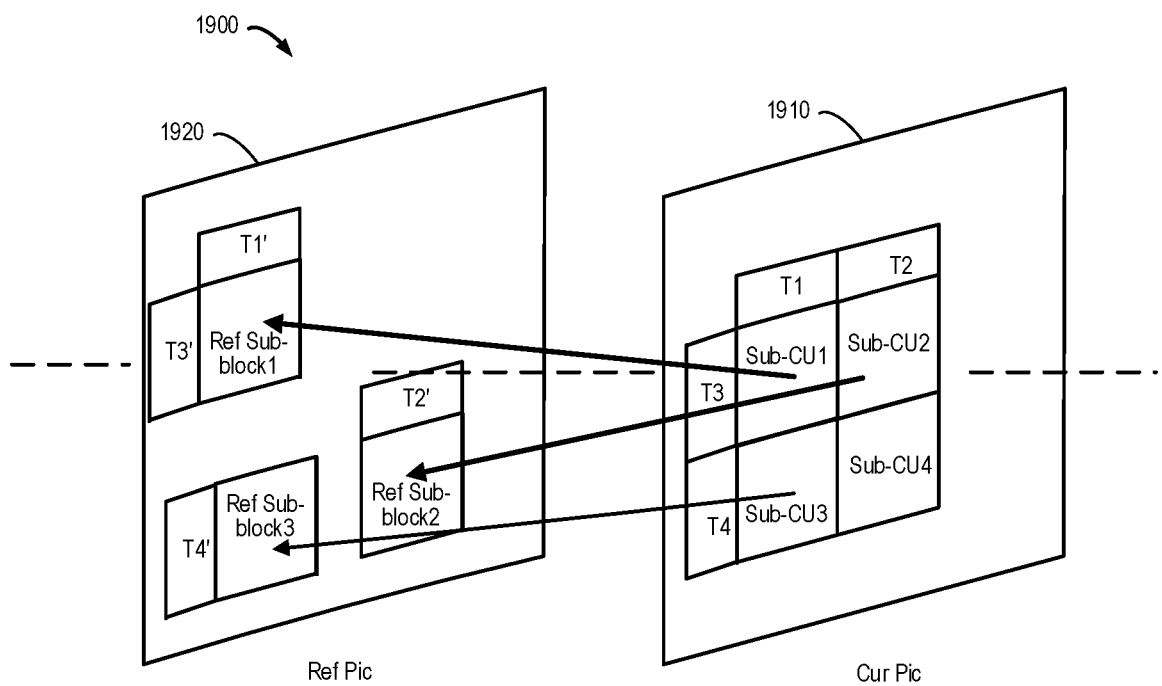
FIG. 19 illustrates a schematic diagram of neighboring samples used for calculating SAD for sub-CU level motion information.

FIG. 18 illustrates a schematic diagram 1800 of neighboring samples used for calculating SAD (Sum of absolute differences). The template matching cost is measured by the SAD between the neighbouring samples of the current CU in the current picture 1810 and their corresponding reference samples. If a merge candidate includes bi-predictive motion information, the corresponding reference samples are the average of the corresponding reference samples in reference list0 1820 and the corresponding reference samples in reference list1 1830, as illustrated in FIG. 18. If a merge candidate includes sub-CU level motion information, the corresponding reference samples for a current CU in a current picture 1910 consist of the neighbouring samples of the corresponding reference sub-blocks in a reference picture 1920, as illustrated in FIG. 19.

Figure 20:
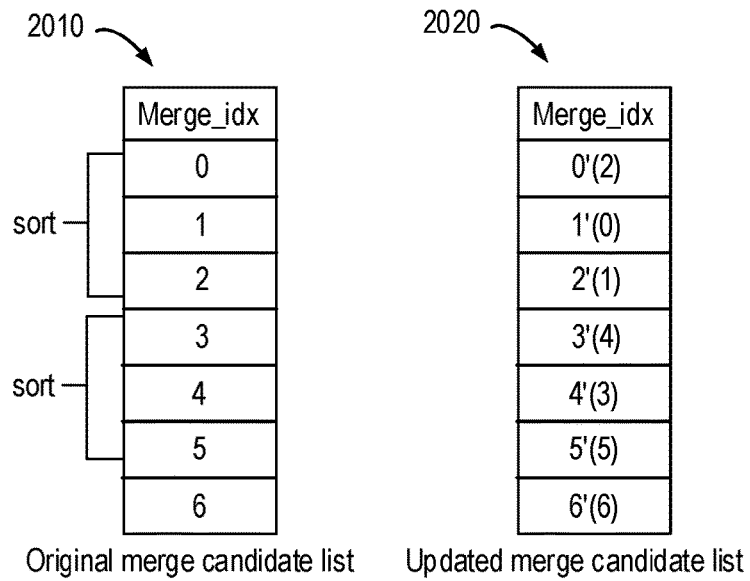
FIG. 20 illustrates a schematic diagram of the sorting process.

The sorting process is operated in the form of sub-group, as illustrated in FIG. 20. The first three merge candidates are sorted together. The following three merge candidates are sorted together. As shown in FIG. 20, an original merge candidate list 2010 is sorted to obtain an updated merge candidate list 2020. In this example, the template size (width of the left template or height of the above template) is 1, and the sub-group size is 3.

2.8. Local Illumination Compensation (LIC)

Figure 21:
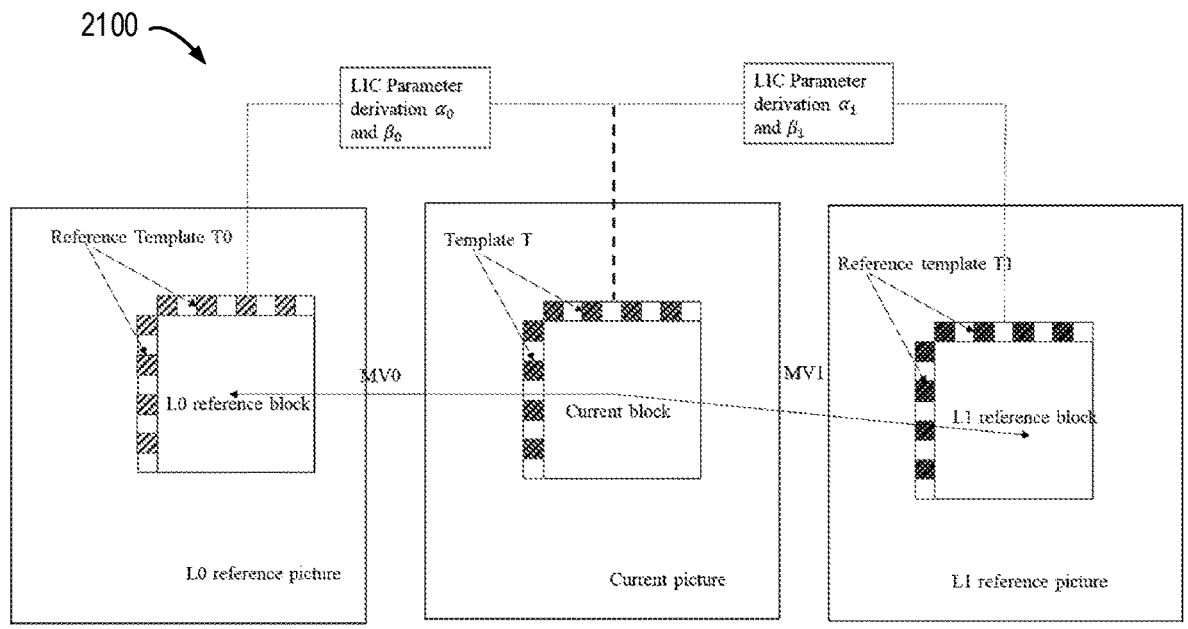
FIG. 21 illustrates a schematic diagram of local illumination compensation.

Local illumination compensation (LIC) is a coding tool to address the issue of local illumination changes between current picture and its temporal reference pictures. The LIC is based on a linear model where a scaling factor and an offset are applied to the reference samples to obtain the prediction samples of a current block. Specifically, the LIC can be mathematically modeled by the following equation:

$$P(x,y) = \alpha \cdot P_r(x+v_x, y+v_y) + \beta$$

where P(x,y) is the prediction signal of the current block at the coordinate (x,y); $P_r(x+v_x, y+v_y)$ is the reference block pointed by the motion vector $(v_x, v_y)$; α and β are the corresponding scaling factor and offset that are applied to the reference block. FIG. 21 illustrates the LIC process 2100. In FIG. 21, when the LIC is applied for a block, a least mean square error (LMSE) method is employed to derive the values of the LIC parameters (i.e., α and β) by minimizing the difference between the neighboring samples of the current block (i.e., the template T in FIG. 21) and their corresponding reference samples in the temporal reference pictures (i.e., either T0 or T1 in FIG. 21). Additionally, to reduce the computational complexity, both the template samples and the reference template samples are subsampled (adaptive subsampling) to derive the LIC parameters, i.e., only the shaded samples in FIG. 21 are used to derive α and β.

Figure 22:
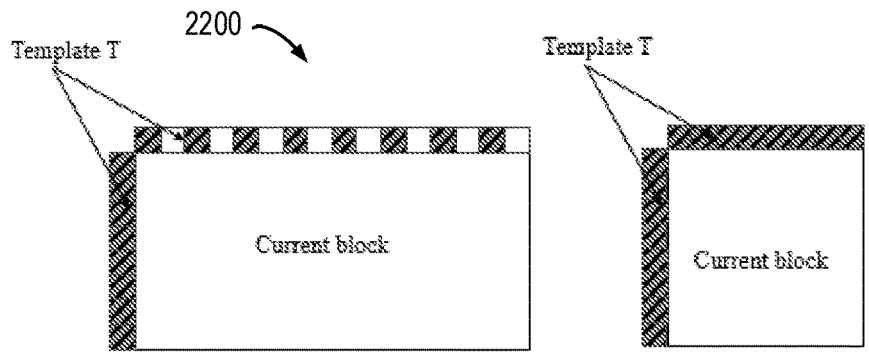
FIG. 22 illustrates a schematic diagram of no subsampling for the short side.

To improve the coding performance, no subsampling for the short side is performed as shown in the diagram 2200 of FIG. 22.

2.9. Bi-Prediction with CU-Level Weight (BCW)

In HEVC, the bi-prediction signal is generated by averaging two prediction signals obtained from two different reference pictures and/or using two different motion vectors. In VVC, the bi-prediction mode is extended beyond simple averaging to allow weighted averaging of the two prediction signals.

$$P_{bi\text{-}pred} = ((8-w) * P_0 + w * P_1 + 4) >> 3$$

Five weights are allowed in the weighted averaging bi-prediction, $w \in \{-2, 3, 4, 5, 10\}$. For each bi-predicted CU, the weight w is determined in one of two ways: 1) for a non-merge CU, the weight index is signalled after the motion vector difference; 2) for a merge CU, the weight index is inferred from neighbouring blocks based on the merge candidate index. BCW is only applied to CUs with 256 or more luma samples (i.e., CU width times CU height is greater than or equal to 256). For low-delay pictures, all 5 weights are used. For non-low-delay pictures, only 3 weights ($w \in \{3,4,5\}$) are used.

At the encoder, fast search algorithms are applied to find the weight index without significantly increasing the encoder complexity. These algorithms are summarized as follows. The VTM software and document JVET-L0646 may be referred to for further details. When combined with AMVR, unequal weights are only conditionally checked for 1-pel and 4-pel motion vector precisions if the current picture is a low-delay picture.

When combined with affine, affine ME will be performed for unequal weights if and only if the affine mode is selected as the current best mode.

When the two reference pictures in bi-prediction are the same, unequal weights are only conditionally checked.

Unequal weights are not searched when certain conditions are met, depending on the POC distance between current picture and its reference pictures, the coding QP, and the temporal level.

The BCW weight index is coded using one context coded bin followed by bypass coded bins. The first context coded bin indicates if equal weight is used; and if unequal weight is used, additional bins are signalled using bypass coding to indicate which unequal weight is used. Weighted prediction (WP) is a coding tool supported by the H.264/AVC and HEVC standards to efficiently code video content with fading. Support for WP was also added into the VVC standard. WP allows weighting parameters (weight and offset) to be signalled for each reference picture in each of the reference picture lists L0 and L1. Then, during motion compensation, the weight(s) and offset(s) of the corresponding reference picture(s) are applied. WP and BCW are designed for different types of video content. In order to avoid interactions between WP and BCW, which will complicate VVC decoder design, if a CU uses WP, then the BCW weight index is not signalled, and w is inferred to be 4 (i.e. equal weight is applied). For a merge CU, the weight index is inferred from neighbouring blocks based on the merge candidate index. This can be applied to both normal merge mode and inherited affine merge mode. For constructed affine merge mode, the affine motion information is constructed based on the motion information of up to 3 blocks. The BCW index for a CU using the constructed affine merge mode is simply set equal to the BCW index of the first control point MV.

In VVC, CIIP and BCW cannot be jointly applied for a CU. When a CU is coded with CIIP mode, the BCW index of the current CU is set to 2, e.g. equal weight.

2.10. Subblock-Based Temporal Motion Vector Prediction (SbTMVP)

VVC supports the subblock-based temporal motion vector prediction (SbTMVP) method. Similar to the temporal motion vector prediction (TMVP) in HEVC, SbTMVP uses the motion field in the collocated picture to improve motion vector prediction and merge mode for CUs in the current picture. The same collocated picture used by TMVP is used for SbTMVP. SbTMVP differs from TMVP in the following two main aspects:

TMVP predicts motion at CU level but SbTMVP predicts motion at sub-CU level;

Whereas TMVP fetches the temporal motion vectors from the collocated block in the collocated picture (the collocated block is the bottom-right or center block relative to the current CU), SbTMVP applies a motion shift before fetching the temporal motion information from the collocated picture, where the motion shift is obtained from the motion vector from one of the spatial neighboring blocks of the current CU.

Figure 23A:
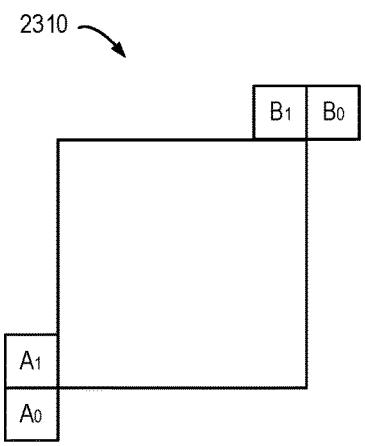
FIG. 23A illustrates a schematic diagram of spatial neighboring blocks used by SbTMVP.
Figure 23B:
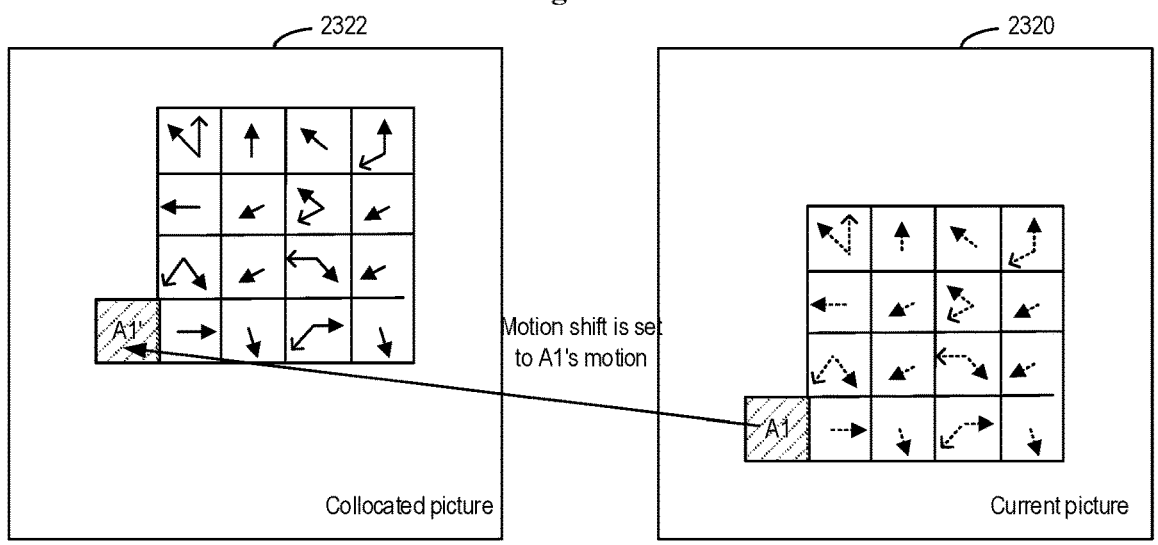
FIG. 23B illustrates a schematic diagram of driving sub-CU motion field by applying a motion shift from spatial neighbor and scaling the motion information from the corresponding collocated sub-CUs.

The SbTMVP process is illustrated in FIG. 23A and FIG. 23B. FIG. 23A illustrates a schematic diagram 2310 of spatial neighboring blocks used by SbTMVP. SbTMVP predicts the motion vectors of the sub-CUs within the current CU in two steps. In the first step, the spatial neighbor A1 in FIG. 23A is examined. If A1 has a motion vector that uses the collocated picture as its reference picture, this motion vector is selected to be the motion shift to be applied. If no such motion is identified, then the motion shift is set to (0, 0). FIG. 23B illustrates a schematic diagram of driving sub-CU motion field by applying a motion shift from spatial neighbor and scaling the motion information from the corresponding collocated sub-CUs. In the second step, the motion shift identified in Step 1 is applied (i.e. added to the coordinates of the current block in the current picture 2320) to obtain sub-CU-level motion information (motion vectors and reference indices) from the collocated picture 2322 as shown in FIG. 23B. The example in FIG. 23B assumes the motion shift is set to block A1's motion. Then, for each sub-CU, the motion information of its corresponding block (the smallest motion grid that covers the center sample) in the collocated picture 2322 is used to derive the motion information for the sub-CU. After the motion information of the collocated sub-CU is identified, it is converted to the motion vectors and reference indices of the current sub-CU in a similar way as the TMVP process of HEVC, where temporal motion scaling is applied to align the reference pictures of the temporal motion vectors to those of the current CU.

In VVC, a combined subblock based merge list which contains both SbTMVP candidate and affine merge candidates is used for the signalling of subblock based merge mode. The SbTMVP mode is enabled/disabled by a sequence parameter set (SPS) flag. If the SbTMVP mode is enabled, the SbTMVP predictor is added as the first entry of the list of subblock based merge candidates, and followed by the affine merge candidates. The size of subblock based merge list is signalled in SPS and the maximum allowed size of the subblock based merge list is 5 in VVC.

The sub-CU size used in SbTMVP is fixed to be 8×8, and as done for affine merge mode, SbTMVP mode is only applicable to the CU with both width and height are larger than or equal to 8.

The encoding logic of the additional SbTMVP merge candidate is the same as for the other merge candidates, that is, for each CU in P or B slice, an additional RD check is performed to decide whether to use the SbTMVP candidate.

2.11. Affine Motion Compensated Prediction

Figure 24:
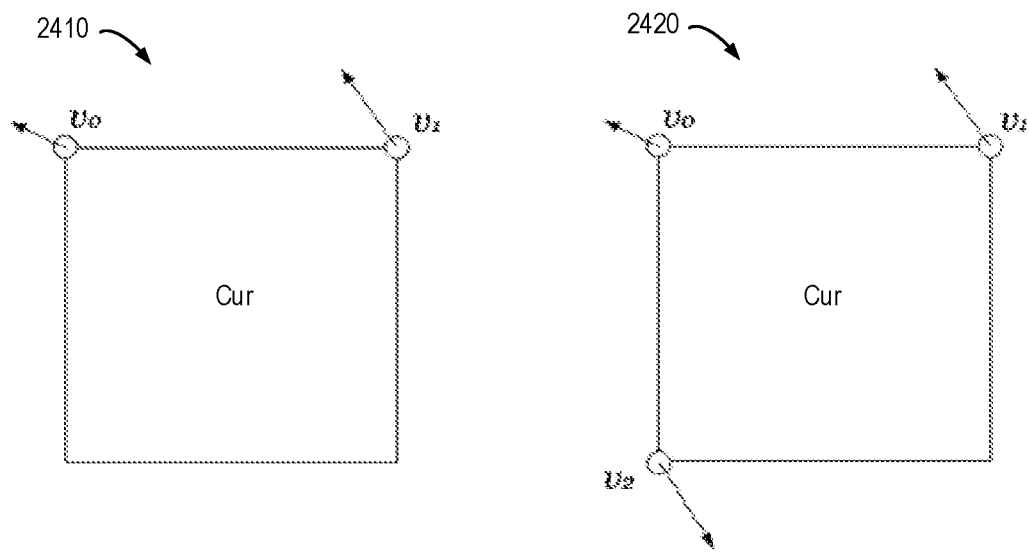
FIG. 24 illustrates a schematic diagram of control point based affine motion model.

In HEVC, only translation motion model is applied for motion compensation prediction (MCP). While in the real world, there are many kinds of motion, e.g. zoom in/out, rotation, perspective motions and the other irregular motions. In VVC, a block-based affine transform motion compensation prediction is applied. FIG. 24 illustrates a schematic diagram of control point based affine motion model. As shown FIG. 24, the affine motion field of the block is described by motion information of two control point (4-parameter) or three control point motion vectors (6-parameter).

For the 4-parameter affine motion model 2410 in FIG. 24, motion vector at sample location (x, y) in a block is derived as:

$$\begin{cases} mv_x = \frac{mv_{1x} - mv_{0x}}{W}x + \frac{mv_{0y} - mv_{1y}}{W}y + mv_{0x} \\ mv_y = \frac{mv_{1y} - mv_{0y}}{W}x + \frac{mv_{1x} - mv_{0x}}{W}y + mv_{0y} \end{cases}$$

For the 6-parameter affine motion model 2420 in FIG. 24, motion vector at sample location (x, y) in a block is derived as:

$$\begin{cases} mv_x = \frac{mv_{1x} - mv_{0x}}{W}x + \frac{mv_{2x} - mv_{0x}}{H}y + mv_{0x} \\ mv_y = \frac{mv_{1y} - mv_{0y}}{W}x + \frac{mv_{2y} - mv_{0y}}{H}y + mv_{0y} \end{cases}$$

Where ($mv_{0x}$, $mv_{0y}$) is motion vector of the top-left corner control point, ($mv_{1x}$, $mv_{1y}$) is motion vector of the top-right corner control point, and ($mv_{2x}$, $mv_{2y}$) is motion vector of the bottom-left corner control point.

Figure 25:
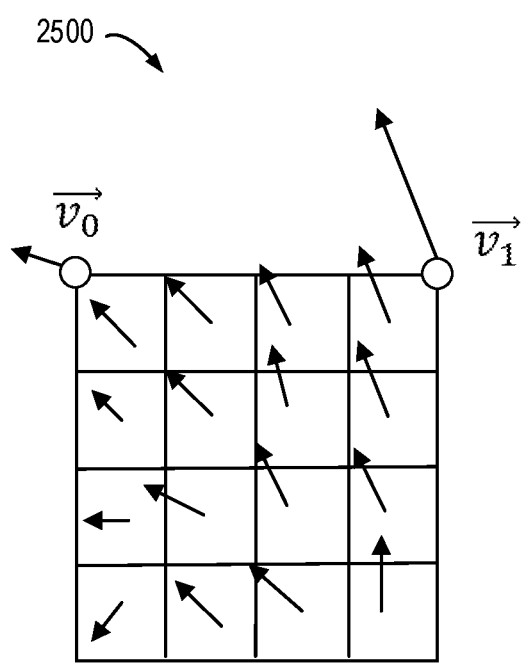
FIG. 25 illustrates a schematic diagram of affine MVF per subblock.

In order to simplify the motion compensation prediction, block based affine transform prediction is applied. FIG. 25 illustrates a schematic diagram 2500 of affine MVF per subblock. To derive motion vector of each 4×4 luma subblock, the motion vector of the center sample of each subblock, as shown in FIG. 25, is calculated according to above equations, and rounded to 1/16 fraction accuracy. Then the motion compensation interpolation filters are applied to generate the prediction of each subblock with derived motion vector. The subblock size of chroma-components is also set to be 4×4. The MV of a 4×4 chroma subblock is calculated as the average of the MVs of the top-left and bottom-right luma subblocks in the collocated 8×8 luma region.

As done for translational motion inter prediction, there are also two affine motion inter prediction modes: affine merge mode and affine AMVP mode.

Affine Merge Prediction

Figure 26:
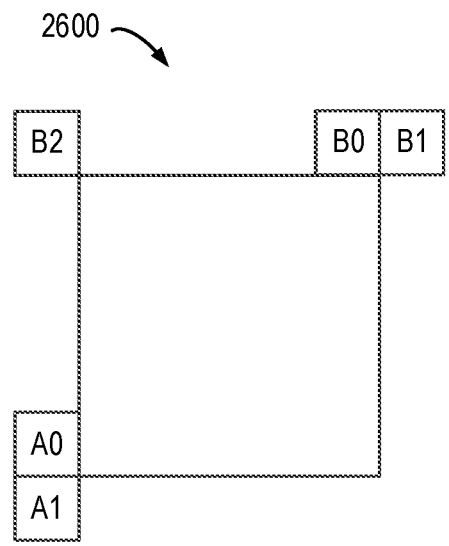
FIG. 26 illustrates a schematic diagram of locations of inherited affine motion predictors.
Figure 27:
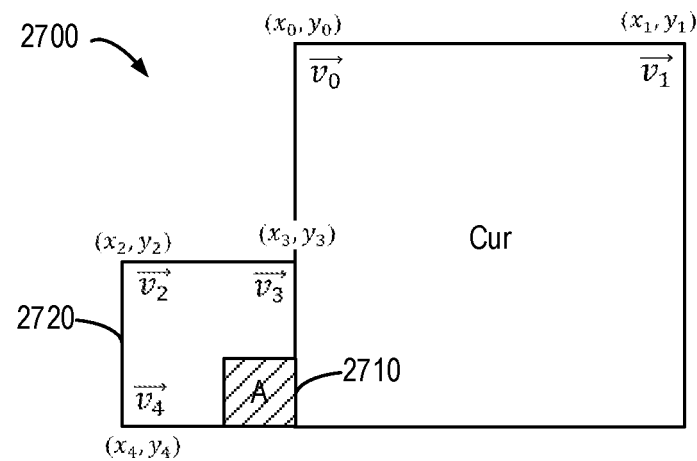
FIG. 27 illustrates a schematic diagram of control point motion vector inheritance.

AF_MERGE mode can be applied for CUs with both width and height larger than or equal to 8. In this mode the CPMVs of the current CU is generated based on the motion information of the spatial neighboring CUs. There can be up to five CPMVP candidates and an index is signalled to indicate the one to be used for the current CU. The following three types of CPVM candidate are used to form the affine merge candidate list:

Inherited affine merge candidates that extrapolated from the CPMVs of the neighbour CUs Constructed affine merge candidates CPMVPs that are derived using the translational MVs of the neighbour CUs Zero MVs In VVC, there are maximum two inherited affine candidates, which are derived from affine motion model of the neighboring blocks, one from left neighboring CUs and one from above neighboring CUs. FIG. 26 illustrates a schematic diagram 2600 of locations of inherited affine motion predictors. The candidate blocks are shown in FIG. 26. For the left predictor, the scan order is A0→A1, and for the above predictor, the scan order is B0→B1→B2. Only the first inherited candidate from each side is selected. No pruning check is performed between two inherited candidates. When a neighboring affine CU is identified, its control point motion vectors are used to derive the CPMVP candidate in the affine merge list of the current CU. FIG. 27 illustrates a schematic diagram of control point motion vector inheritance. As shown in FIG. 27, if the neighbour left bottom block A 2710 is coded in affine mode, the motion vectors $v_2$, $v_3$ and $v_4$ of the top left corner, above right corner and left bottom corner of the CU 2720 which contains the block A 2710 are attained. When block A 2710 is coded with 4-parameter affine model, the two CPMVs of the current CU are calculated according to $v_2$, and $v_3$. In case that block A is coded with 6-parameter affine model, the three CPMVs of the current CU are calculated according to $v_2$, $v_3$ and $v_4$.

Constructed affine candidate means the candidate is constructed by combining the neighbor translational motion information of each control point. The motion information for the control points is derived from the specified spatial neighbors and temporal neighbor shown in FIG. 28 which illustrates a schematic diagram 2800 of locations of candidates position for constructed affine merge mode. $CPMV_k$ (k=1, 2, 3, 4) represents the k-th control point. For $CPMV_1$, the B2→B3→A2 blocks are checked and the MV of the first available block is used. For $CPMV_2$, the $B_1$→B0 blocks are checked and for $CPMV_3$, the A1→A0 blocks are checked. TMVP is used as $CPMV_4$ if it's available.

After MVs of four control points are attained, affine merge candidates are constructed based on those motion information. The following combinations of control point MVs are used to construct in order:

{$CPMV_1$, $CPMV_2$, $CPMV_3$}, {$CPMV_1$, $CPMV_2$, $CPMV_4$}, {$CPMV_1$, $CPMV_3$, $CPMV_4$}, {$CPMV_2$, $CPMV_3$, $CPMV_4$}, {$CPMV_1$, $CPMV_2$}, {$CPMV_1$, $CPMV_3$}

The combination of 3 CPMVs constructs a 6-parameter affine merge candidate and the combination of 2 CPMVs constructs a 4-parameter affine merge candidate. To avoid motion scaling process, if the reference indices of control points are different, the related combination of control point MVs is discarded.

After inherited affine merge candidates and constructed affine merge candidate are checked, if the list is still not full, zero MVs are inserted to the end of the list.

Affine AMVP Prediction

Affine AMVP mode can be applied for CUs with both width and height larger than or equal to 16. An affine flag in CU level is signalled in the bitstream to indicate whether affine AMVP mode is used and then another flag is signalled to indicate whether 4-parameter affine or 6-parameter affine. In this mode, the difference of the CPMVs of current CU and their predictors CPMVPs is signalled in the bitstream. The affine AVMP candidate list size is 2 and it is generated by using the following four types of CPVM candidate in order:

Inherited affine AMVP candidates that extrapolated from the CPMVs of the neighbour CUs
Constructed affine AMVP candidates CPMVPs that are derived using the translational MVs of the neighbour CUs
Translational MVs from neighboring CUs
Zero MVs The checking order of inherited affine AMVP candidates is same to the checking order of inherited affine merge candidates. The only difference is that, for AVMP candidate, only the affine CU that has the same reference picture as in current block is considered. No pruning process is applied when inserting an inherited affine motion predictor into the candidate list.

Figure 28:
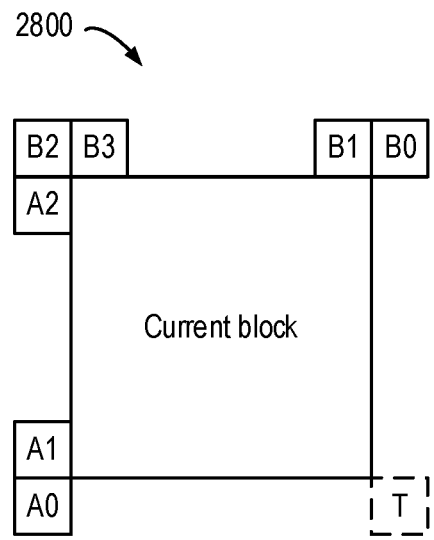
FIG. 28 illustrates a schematic diagram of locations of candidates position for constructed affine merge mode.

Constructed AMVP candidate is derived from the specified spatial neighbors shown in FIG. 28. The same checking order is used as done in affine merge candidate construction. In addition, reference picture index of the neighboring block is also checked. The first block in the checking order that is inter coded and has the same reference picture as in current CUs is used. There is only one. When the current CU is coded with 4-parameter affine mode, and $mv_0$ and $mv_1$ are both available, they are added as one candidate in the affine AMVP list. When the current CU is coded with 6-parameter affine mode, and all three CPMVs are available, they are added as one candidate in the affine AMVP list. Otherwise, constructed AMVP candidate is set as unavailable.

If the number of affine AMVP list candidates is still less than 2 after valid inherited affine AMVP candidates and constructed AMVP candidate are inserted, $mv_0$, $mv_1$ and $mv_2$ will be added, in order, as the translational MVs to predict all control point MVs of the current CU, when available. Finally, zero MVs are used to fill the affine AMVP list if it is still not full.

2.12. Template Matching (TM)

Figure 29:
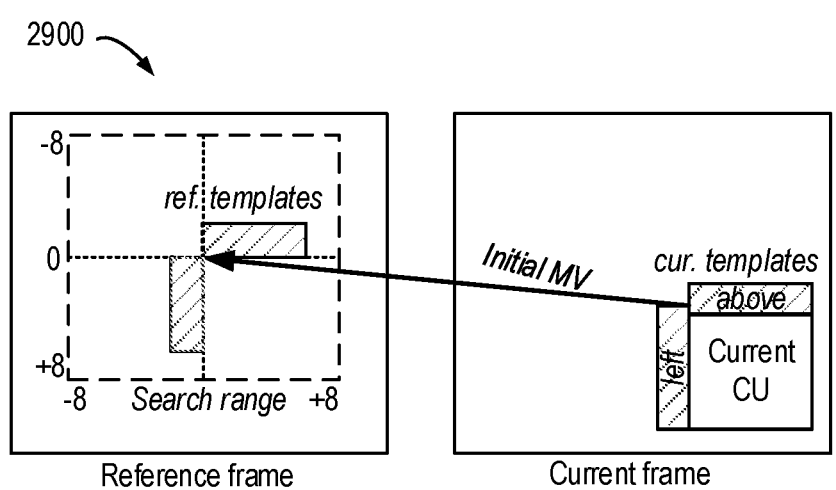
FIG. 29 illustrates a schematic diagram of template matching performed on a search area around initial MV.

Template matching (TM) is a decoder-side MV derivation method to refine the motion information of the current CU by finding the closest match between a template (i.e., top and/or left neighbouring blocks of the current CU) in the current picture and a block (i.e., same size to the template) in a reference picture. FIG. 29 illustrates a schematic diagram 2900 of template matching performed on a search area around initial MV. As illustrated in FIG. 29, a better MV is to be searched around the initial motion of the current CU within a [−8, +8]-pel search range. The template matching that was previously proposed in JVET-J0021 is adopted in this contribution with two modifications: search step size is determined based on AMVR mode and TM can be cascaded with bilateral matching process in merge modes. In AMVP mode, an MVP candidate is determined based on template matching error to pick up the one which reaches the minimum difference between current block template and reference block template, and then TM performs only for this particular MVP candidate for MV refinement. TM refines this MVP candidate, starting from full-pel MVD precision (or 4-pel for 4-pel AMVR mode) within a [−8, +8]-pel search range by using iterative diamond search. The AMVP candidate may be further refined by using cross search with full-pel MVD precision (or 4-pel for 4-pel AMVR mode), followed sequentially by half-pel and quarter-pel ones depending on AMVR mode as specified in Table 3. This search process ensures that the MVP candidate still keeps the same MV precision as indicated by AMVR mode after TM process.

TABLE 3

Search patterns of AMVR and merge mode with AMVR.

| Search pattern | AMVR mode | | | | Merge mode | |
| --- | --- | --- | --- | --- | --- | --- |
| | 4-pel | Full-pel | Half-pel | Quarter-pel | AltIF = 0 | AltIF = 1 |
| 4-pel diamond | v | | | | | |
| 4-pel cross | v | | | | | |
| Full-pel diamond | | v | v | v | v | v |
| Full-pel cross | | v | v | v | v | v |
| Half-pel cross | | | v | v | v | v |
| Quarter-pel cross | | | | v | v | |
| ⅛-pel cross | | | | | v | |

In merge mode, similar search method is applied to the merge candidate indicated by the merge index. As shown in Table 3, TM may perform all the way down to ⅛-pel MVD precision or skipping those beyond half-pel MVD precision, depending on whether the alternative interpolation filter (that is used when AMVR is of half-pel mode) is used according to merged motion information. Besides, when TM mode is enabled, template matching may work as an independent process or an extra MV refinement process between block-based and subblock-based bilateral matching (BM) methods, depending on whether BM can be enabled or not according to its enabling condition check.

At encoder side, TM merge mode will do MV refinement for each merge candidate.

2.13. Multi-Hypothesis Prediction (MHP, in JVET-U0100)

The multi-hypothesis prediction previously proposed in JVET-M0425 is adopted in this contribution. Up to two additional predictors are signalled on top of inter AMVP mode, regular merge mode, and MMVD mode. The resulting overall prediction signal is accumulated iteratively with each additional prediction signal.

$$p_{n+1}=(1-\alpha_{n+1})p_n+\alpha_{n+1}h_{n+1}$$

The weighting factor $\alpha$ is specified according to the following table:

| add_hyp_weight_idx | $\alpha$ |
|---|---|
| 0 | $\frac{1}{4}$ |
| 1 | $-\frac{1}{8}$ |

For inter AMVP mode, MHP is only applied if non-equal weight in BCW is selected in bi-prediction mode.

2.14. JVET-M0425: Multi-Hypothesis Inter Prediction

In the multi-hypothesis inter prediction mode, one or more additional prediction signals are signaled, in addition to the conventional uni/bi prediction signal. The resulting overall prediction signal is obtained by sample-wise weighted superposition. With the uni/bi prediction signal $p_{uni/bi}$ and the first additional inter prediction signal/hypothesis $h_3$, the resulting prediction signal $P_3$ is obtained as follows:

$$p_3=(1-\alpha)p_{uni/bi}+\alpha h_3$$

The weighting factor $\alpha$ is specified by the new syntax element add_hyp_weight_idx, according to the following mapping:

| add_hyp_weight_idx | $\alpha$ |
|---|---|
| 0 | $\frac{1}{4}$ |
| 1 | $-\frac{1}{8}$ |

Note that for the additional prediction signals, in the tests CE10.1.2.a, CE10.1.2.b, and CE10.1.2.d, the concept of prediction list0/list1 is abolished, and instead one combined list is used. This combined list is generated by alternatingly inserting reference frames from list0 and list1 with increasing reference index, omitting reference frames which have already been inserted, such that double entries are avoided. In test CE10.1.2.c, only 2 different reference pictures can be used within each PU, and therefore it is indicated by one flag which reference frame is used.

Analogously to above, more than one additional prediction signal can be used. The resulting overall prediction signal is accumulated iteratively with each additional prediction signal.

$$p_{n+1}=(1-\alpha_{n+1})p_n+\alpha_{n+1}h_{n+1}$$

The resulting overall prediction signal is obtained as the last $p_n$ (i.e., the $p_n$ having the largest index n). Within this CE, up to two additional prediction signals can be used (i.e., n is limited to 2). Note that due to the iterative accumulation approach, the number of required PU sample buffers for storing intermediate prediction signals is not increased relative to bi-prediction (i.e., two buffers are sufficient).

2.14.1 Multi-Hypothesis Motion Estimation

First, the inter modes with no explicitly signaled additional inter prediction parameters are tested. For the best two of these modes (i.e., having lowest Hadamard RD cost), additional inter prediction hypotheses are searched. For that purpose, for all combinations of the following parameters, a motion estimation with a restricted search range of 16 is performed:

Weighting factor $\alpha$

Reference frame for the additional prediction hypothesis

For determining the best combination of these two parameters, a simplified RD cost using Hadamard distortion measure and approximated bit rate is used. The chosen parameter combination is then used to compute a more accurate RD cost, using forward transform and quantization, which is compared against the so-far best found coding mode for the current block.

2.14.2 Interaction with Other Coding Tools

Normal Merge Mode (Non-MMVD, Non-Sub-Block)
   Additional prediction signals can be explicitly signaled, but not in SKIP mode
   Additional prediction signals can also be inherited from spatially neighboring blocks as part of the merging candidate, but this is limited to
      neighboring blocks within the current CTU, or
      neighboring blocks from the left CTU
   Additional prediction signals cannot be inherited from the top CTU or from a temporally co-located block.
   All explicitly signaled additional prediction signals use the same AMVP candidate list which is generated for the first explicitly signaled additional prediction signal, so there has to be done
      one merging candidate list construction process
      one AMVP candidate list construction process
   The total of explicitly signaled and inherited (merged) additional prediction signals is limited to be less than or equal to 2.
MMVD
   Additional prediction signals can be explicitly signaled, but not in MMVD SKIP mode
   There is no inheritance/merging of additional prediction signals from merging candidates
   All explicitly signaled additional prediction signals use the same AMVP candidate list which is generated for the first explicitly signaled additional prediction signal, so there has to be done
      one MMVD list construction process
      one AMVP candidate list construction process
Sub-Block Merge Mode
   Additional prediction signals can be explicitly signaled, but not in SKIP mode.
   There is no inheritance/merging of additional prediction signals from merging candidates.
   All explicitly signaled additional prediction signals use the same AMVP candidate list which is generated for the first explicitly signaled additional prediction signal, so there has to be done
      one sub-block merging candidate list construction process,
      one AMVP candidate list construction process.
Non-Affine AMVP Mode
   Additional prediction signals can be explicitly signaled in case of bi-prediction.
   Only two AMVP candidate lists have to be constructed (for the first two, i.e. non-additional prediction signals).
   For the additional prediction signals, one of the two AMVP candidate lists is used:

If the POC of the reference picture of the additional prediction signal equals the POC of the used list1 reference picture, the list1 AMVP candidate list is used, Otherwise the list0 AMVP candidate list is used.

Affine AMVP Mode

Additional (translational) prediction signals can be explicitly signaled in case of bi-prediction.

Two affine AMVP candidate lists have to be constructed (for the first two, i.e. non-additional prediction signals).

For the additional prediction signals, one of the two AMVP candidate lists is used:

If the POC of the reference picture of the additional prediction signal equals the POC of the used list1 reference picture, the list1 AMVP candidate list is used.

Otherwise the list0 AMVP candidate list is used.

The affine LT mv predictor is used as the mv predictor for the additional prediction signal.

BIO

Multi-hypothesis inter prediction cannot be used together with BIO within one PU:

If there are additional prediction signals, BIO is disabled for the current PU

Combined Intra/Inter

Multi-hypothesis inter prediction cannot be used together with combined intra/inter within one PU:

If combined intra/inter is selected with a merging candidate that has additional prediction signals, those additional prediction signals are not inherited/merged.

Additional prediction signals cannot be explicitly signaled in combined intra/inter mode.

Triangular Mode

Multi-hypothesis inter prediction cannot be used together with triangular mode within one PU:

If triangular mode is selected with a merging candidate that has additional prediction signals, those additional prediction signals are not inherited/merged.

Additional prediction signals cannot be explicitly signaled in triangular mode.

2.15. Overlapped Block Motion Compensation

Figure 30:
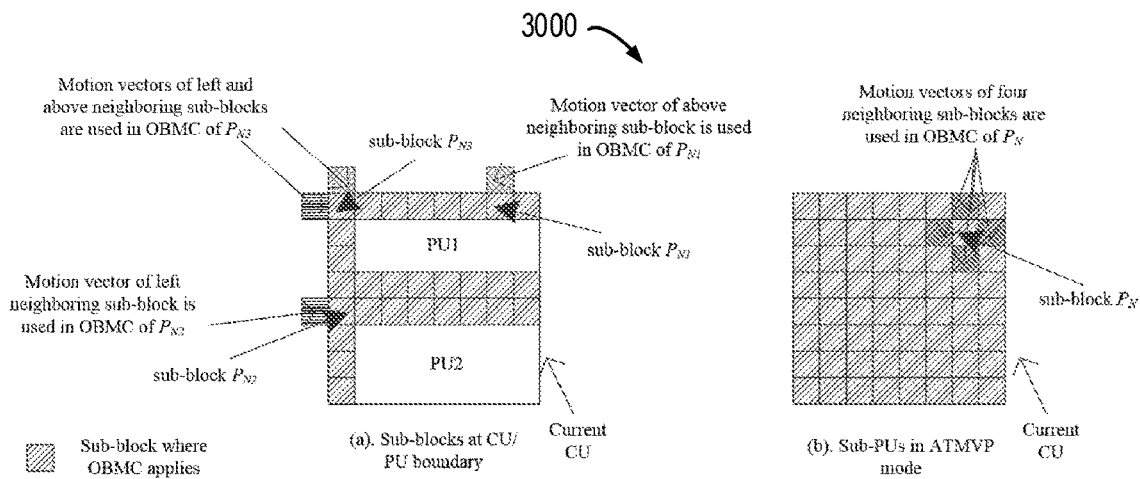
FIG. 30 illustrates a schematic diagram of sub-blocks where OBMC applies.

Overlapped Block Motion Compensation (OBMC) has previously been used in H.263. In the JEM, unlike in H.263, OBMC can be switched on and off using syntax at the CU level. When OBMC is used in the JEM, the OBMC is performed for all motion compensation (MC) block boundaries except the right and bottom boundaries of a CU. Moreover, it is applied for both the luma and chroma components. In the JEM, a MC block is corresponding to a coding block. When a CU is coded with sub-CU mode (includes sub-CU merge, affine and FRUC mode), each sub-block of the CU is a MC block. FIG. 30 illustrates a schematic diagram 3000 of sub-blocks where OBMC applies. To process CU boundaries in a uniform fashion, OBMC is performed at sub-block level for all MC block boundaries, where sub-block size is set equal to 4×4, as illustrated in FIG. 30.

When OBMC applies to the current sub-block, besides current motion vectors, motion vectors of four connected neighbouring sub-blocks, if available and are not identical to the current motion vector, are also used to derive prediction block for the current sub-block. These multiple prediction blocks based on multiple motion vectors are combined to generate the final prediction signal of the current sub-block.

Prediction block based on motion vectors of a neighbouring sub-block is denoted as $P_N$, with N indicating an index for the neighbouring above, below, left and right sub-blocks and prediction block based on motion vectors of the current sub-block is denoted as $P_C$. When $P_N$ is based on the motion information of a neighbouring sub-block that contains the same motion information to the current sub-block, the OBMC is not performed from $P_N$. Otherwise, every sample of $P_N$ is added to the same sample in $P_C$, i.e., four rows/columns of $P_N$ are added to $P_C$. The weighting factors {1/4, 1/8, 1/16, 1/32} are used for $P_N$ and the weighting factors {3/4, 7/8, 15/16, 31/32} are used for $P_C$. The exception are small MC blocks, (i.e., when height or width of the coding block is equal to 4 or a CU is coded with sub-CU mode), for which only two rows/columns of $P_N$ are added to $P_C$. In this case weighting factors {1/4, 1/8} are used for $P_N$ and weighting factors {3/4, 7/8} are used for $P_C$. For $P_N$ generated based on motion vectors of vertically (horizontally) neighbouring sub-block, samples in the same row (column) of $P_N$ are added to $P_C$ with a same weighting factor.

In the JEM, for a CU with size less than or equal to 256 luma samples, a CU level flag is signalled to indicate whether OBMC is applied or not for the current CU. For the CUs with size larger than 256 luma samples or not coded with AMVP mode, OBMC is applied by default. At the encoder, when OBMC is applied for a CU, its impact is taken into account during the motion estimation stage. The prediction signal formed by OBMC using motion information of the top neighbouring block and the left neighbouring block is used to compensate the top and left boundaries of the original signal of the current CU, and then the normal motion estimation process is applied.

2.16. Adaptive Merge Candidate List

It is to assume the number of the merge candidates is 8. The first 5 merge candidates are taken as a first subgroup and take the following 3 merge candidates as a second subgroup (i.e. the last subgroup).

Figure 31:
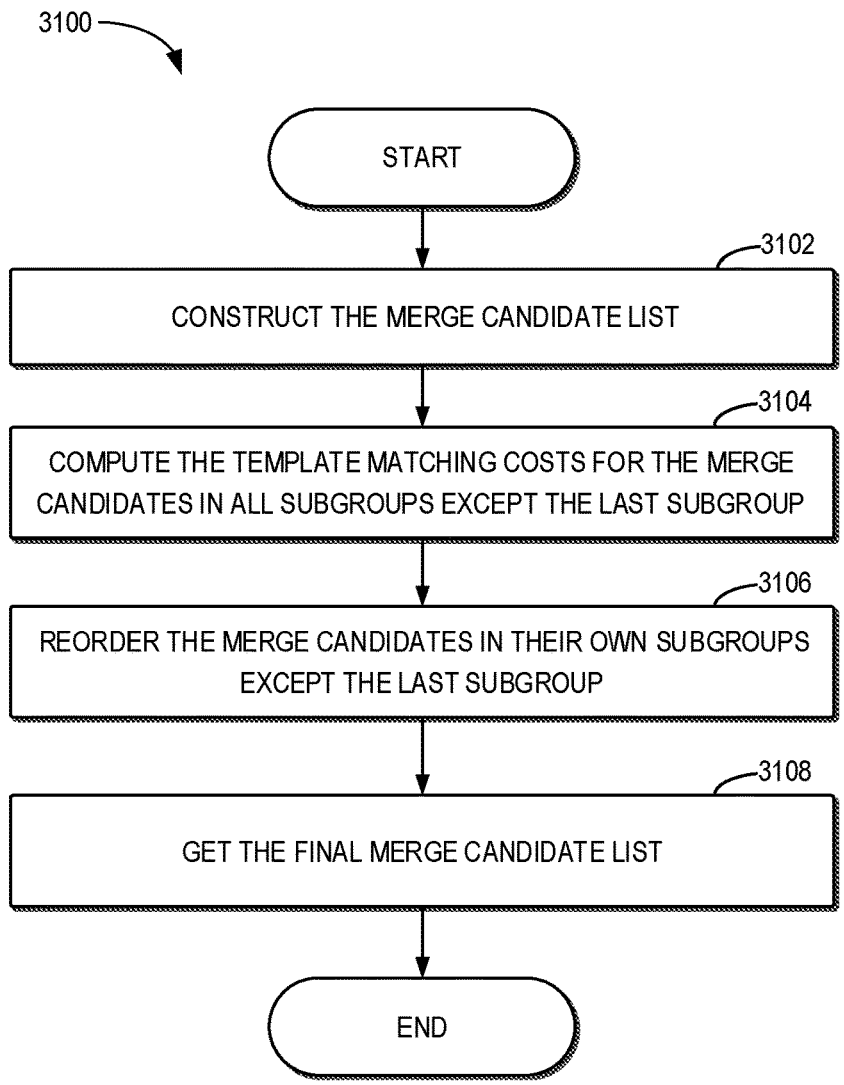
FIG. 31 illustrates a flowchart of a reorder process in an encoder.

FIG. 31 which illustrates a flowchart of a reorder process 3100 in an encoder. For the encoder, after the merge candidate list is constructed at block 3102, some merge candidates are adaptively reordered in an ascending order of costs of merge candidates as shown in FIG. 31.

More specifically, at block 3104, the template matching costs for the merge candidates in all subgroups except the last subgroup are computed; then at block 3106, the merge candidates in their own subgroups are reordered except the last subgroup; finally, at block 3108, the final merge candidate list will be got.

Figure 32:
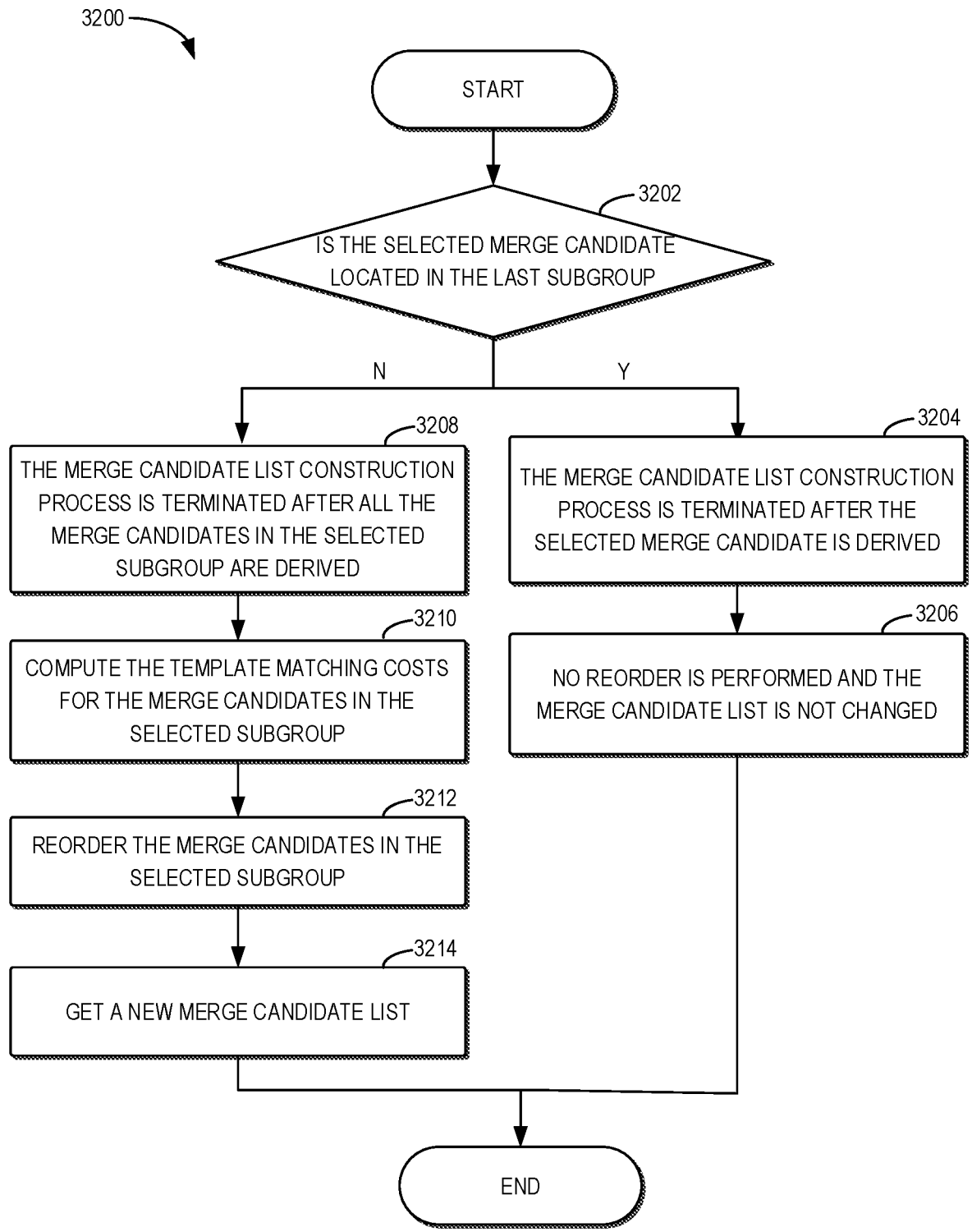
FIG. 32 illustrates a flowchart of a reorder process in a decoder.

For the decoder, after the merge candidate list is constructed, some/no merge candidates are adaptively reordered in ascending order of costs of merge candidates as shown in FIG. 32 which illustrates a flowchart of a reorder process 3200 in a decoder. In FIG. 32, the subgroup the selected (signaled) merge candidate located in is called the selected subgroup.

More specifically, at block 3202, it is determined if the selected merge candidate is located in the last subgroup. If the selected merge candidate is located in the last subgroup, at block 3204, the merge candidate list construction process is terminated after the selected merge candidate is derived, and at block 3206, no reorder is performed and the merge candidate list is not changed; otherwise, the execution process is as follows:

At block 3208, the merge candidate list construction process is terminated after all the merge candidates in the selected subgroup are derived; at block 3210, the template matching costs for the merge candidates in the selected subgroup are computed; at block 3212, the merge candidates in the selected subgroup are reordered; finally, at block 3214, a new merge candidate list will be got.

For both encoder and decoder,

A template matching cost is derived as a function of T and RT, wherein T is a set of samples in the template and RT is a set of reference samples for the template.

When deriving the reference samples of the template for a merge candidate, the motion vectors of the merge candidate are rounded to the integer pixel accuracy.

The reference samples of the template (RT) for bi-directional prediction are derived by weighted averaging of the reference samples of the template in reference list0 ($RT_0$) and the reference samples of the template in reference list1 (RTs) as follows.

$$RT=((8-w)*RT_0+w*RT_1+4)>>3$$

where the weight of the reference template in reference list0 (8−w) and the weight of the reference template in reference list1 (w) are decided by the BCW index of the merge candidate. BCW index equal to {0,1,2,3,4} corresponds to w equal to {−2,3,4,5,10}, respectively.

If the Local Illumination Compensation (LIC) flag of the merge candidate is true, the reference samples of the template are derived with LIC method.

The template matching cost is calculated based on the sum of absolute differences (SAD) of T and RT.

The template size is 1. That means the width of the left template and/or the height of the above template is 1.

If the coding mode is MMVD, the merge candidates to derive the base merge candidates are not reordered.

If the coding mode is GPM, the merge candidates to derive the uni-prediction candidate list are not reordered.

2.17. GMVD

In Geometric prediction mode with Motion Vector Difference (GMVD), each geometric partition in GPM can decide to use GMVD or not. If GMVD is chosen for a geometric region, the MV of the region is calculated as a sum of the MV of a merge candidate and an MVD. All other processing is kept the same as in GPM.

With GMVD, an MVD is signaled as a pair of direction and distance. There are nine candidate distances (¼-pel, ½-pel, 1-pel, 2-pel, 3-pel, 4-pel, 6-pel, 8-pel, 16-pel), and eight candidate directions (four horizontal/vertical directions and four diagonal directions) involved In addition, when pic_fpel_mmvd_enabled_flag is equal to 1, the MVD in GMVD is also left shifted by 2 as in MMVD.

2.18. Affine MMVD

In affine MMVD, an affine merge candidate (which is called, base affine merge candidate) is selected, the MVs of the control points are further refined by the signalled MVD information.

The MVD information for the MVs of all the control points are the same in one prediction direction.

When the starting MVs is bi-prediction MVs with the two MVs point to the different sides of the current picture (i.e. the POC of one reference is larger than the POC of the current picture, and the POC of the other reference is smaller than the POC of the current picture), the MV offset added to the list0 MV component of starting MV and the MV offset for the list1 MV has opposite value; otherwise, when the starting MVs is bi-prediction MVs with both lists point to the same side of the current picture (i.e. POCs of two references are both larger than the POC of the current picture, or are both smaller than the POC of the current picture), the MV offset added to the list0 MV component of starting MV and the MV offset for the list1 MV are the same.

2.19. Multi-Pass Decoder-Side Motion Vector Refinement

In this contribution, a multi-pass decoder-side motion vector refinement is applied. In the first pass, bilateral matching (BM) is applied to the coding block. In the second pass, BM is applied to each 16×16 subblock within the coding block. In the third pass, MV in each 8×8 subblock is refined by applying bi-directional optical flow (BDOF). The refined MVs are stored for both spatial and temporal motion vector prediction.

First Pass—Block Based Bilateral Matching MV Refinement

In the first pass, a refined MV is derived by applying BM to a coding block. Similar to decoder-side motion vector refinement (DMVR), in bi-prediction operation, a refined MV is searched around the two initial MVs (MV0 and MV1) in the reference picture lists L0 and L1. The refined MVs (MV0_pass1 and MV1_pass1) are derived around the initiate MVs based on the minimum bilateral matching cost between the two reference blocks in L0 and L1.

BM performs local search to derive integer sample precision intDeltaMV. The local search applies a 3×3 square search pattern to loop through the search range [−sHor, sHor] in horizontal direction and [−sVer, sVer] in vertical direction, wherein, the values of sHor and sVer are determined by the block dimension, and the maximum value of sHor and sVer is 8.

The bilateral matching cost is calculated as: bilCost=mvDistanceCost+sadCost. When the block size cbW*cbH is greater than 64, MRSAD cost function is applied to remove the DC effect of distortion between reference blocks. When the bilCost at the center point of the 3×3 search pattern has the minimum cost, the intDeltaMV local search is terminated. Otherwise, the current minimum cost search point becomes the new center point of the 3×3 search pattern and continue to search for the minimum cost, until it reaches the end of the search range.

The existing fractional sample refinement is further applied to derive the final deltaMV. The refined MVs after the first pass is then derived as:

MV0_pass1=MV0+deltaMV
MV1_pass1=MV1−deltaMV

Second Pass—Subblock Based Bilateral Matching MV Refinement

In the second pass, a refined MV is derived by applying BM to a 16×16 grid subblock. For each subblock, a refined MV is searched around the two MVs (MV0_pass1 and MV1_pass1), obtained on the first pass, in the reference picture list L0 and L1. The refined MVs (MV0_pass2 (sbIdx2) and MV1_pass2(sbIdx2)) are derived based on the minimum bilateral matching cost between the two reference subblocks in L0 and L1.

For each subblock, BM performs full search to derive integer sample precision intDeltaMV. The full search has a search range [−sHor, sHor] in horizontal direction and [−sVer, sVer] in vertical direction, wherein, the values of sHor and sVer are determined by the block dimension, and the maximum value of sHor and sVer is 8.

Figure 33:
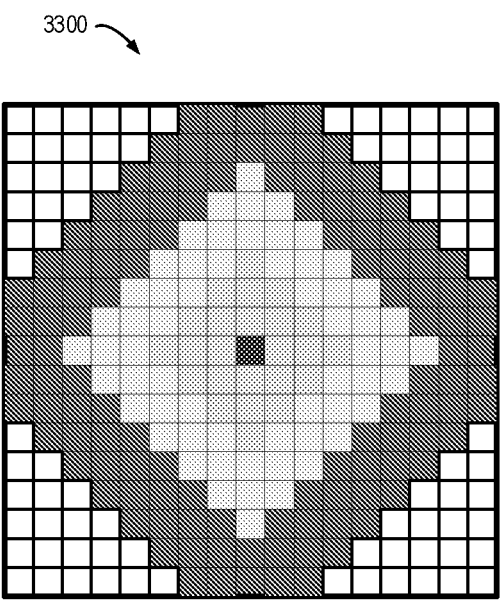
FIG. 33 illustrates a schematic diagram of diamond regions in the search area.

The bilateral matching cost is calculated by applying a cost factor to the SATD cost between two reference subblocks, as: bilCost=satdCost*costFactor. The search area (2*sHor+1)*(2*sVer+1) is divided up to 5 diamond shape search regions shown in the diagram 3300 of FIG. 33. Diamond regions in the search area. Each search region is assigned a costFactor, which is determined by the distance (intDeltaMV) between each search point and the starting MV, and each diamond region is processed in the order starting from the center of the search area. In each region, the search points are processed in the raster scan order starting from the top left going to the bottom right corner of the region. When the minimum bilCost within the current search region is less than a threshold equal to sbW*sbH, the int-pel full search is terminated, otherwise, the int-pel full search continues to the next search region until all search points are examined.

The existing VVC DMVR fractional sample refinement is further applied to derive the final deltaMV(sbIdx2). The refined MVs at second pass is then derived as:

MV0_pass2(*sbIdx*2)=MV0_pass1+deltaMV(*sbIdx*2)

MV1_pass2(*sbIdx*2)=MV1_pass1−deltaMV(*sbIdx*2)

Third Pass—Subblock Based Bi-Directional Optical Flow MV Refinement

In the third pass, a refined MV is derived by applying BDOF to an 8×8 grid subblock. For each 8×8 subblock, BDOF refinement is applied to derive scaled Vx and Vy without clipping starting from the refined MV of the parent subblock of the second pass. The derived bioMv(Vx, Vy) is rounded to $1/16$ sample precision and clipped between −32 and 32.

The refined MVs (MV0_pass3(sbIdx3) and MV1_pass3 (sbIdx3)) at third pass are derived as:

MV0_pass3(*sbIdx*3)=MV0_pass2(*sbIdx*2)+bioMv

MV1_pass3(*sbIdx*3)=MV0_pass2(*sbIdx*2)−bioMv 2.20. Decoder Side Motion Vector Refinement (DMVR)

Figure 34:
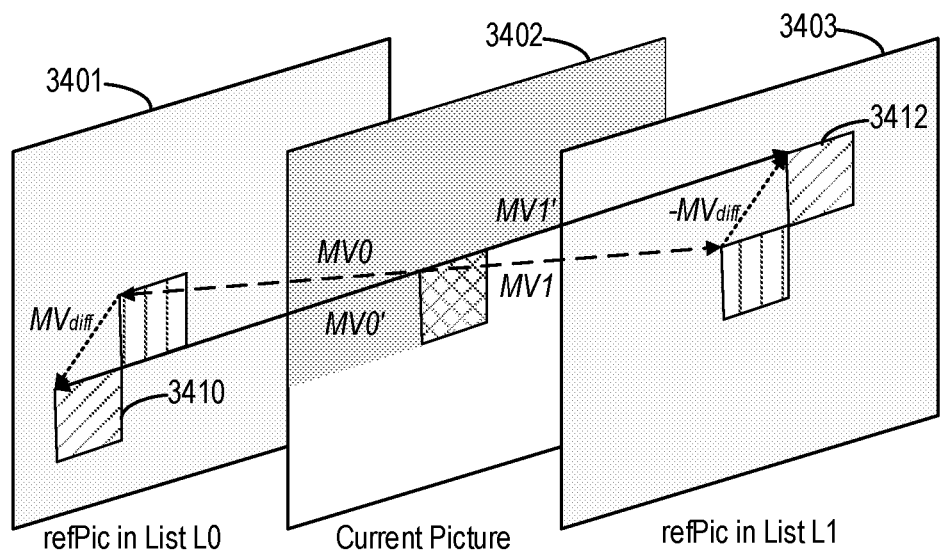
FIG. 34 illustrates a schematic diagram of decoding side motion vector refinement.

In order to increase the accuracy of the MVs of the merge mode, a bilateral-matching (BM) based decoder side motion vector refinement is applied in VVC. In bi-prediction operation, a refined MV is searched around the initial MVs in the reference picture list L0 and reference picture list L1. The BM method calculates the distortion between the two candidate blocks in the reference picture list L0 and list L1. As illustrated in FIG. 34, the SAD between the blocks 3410 and 3412 based on each MV candidate around the initial MV is calculated, where the block 3410 is in a reference picture 3401 in the list L0 and the block 3412 is in a reference picture 3403 in the List L1 for the current picture 3402. The MV candidate with the lowest SAD becomes the refined MV and used to generate the bi-predicted signal.

In VVC, the application of DMVR is restricted and is only applied for the CUs which are coded with following modes and features:

CU level merge mode with bi-prediction MV

One reference picture is in the past and another reference picture is in the future with respect to the current picture The distances (i.e. POC difference) from two reference pictures to the current picture are same Both reference pictures are short-term reference pictures CU has more than 64 luma samples Both CU height and CU width are larger than or equal to 8 luma samples BCW weight index indicates equal weight WP is not enabled for the current block CIIP mode is not used for the current block The refined MV derived by DMVR process is used to generate the inter prediction samples and also used in temporal motion vector prediction for future pictures coding. While the original MV is used in deblocking process and also used in spatial motion vector prediction for future CU coding.

The additional features of DMVR are mentioned in the following sub-clauses.

Searching Scheme

In DVMR, the search points are surrounding the initial MV and the MV offset obey the MV difference mirroring rule. In other words, any points that are checked by DMVR, denoted by candidate MV pair (MV0, MV1) obey the following two equations:

MV0′=MV0+MV_offset

MV1′=MV1−MV_offset

Where MV_offset represents the refinement offset between the initial MV and the refined MV in one of the reference pictures. The refinement search range is two integer luma samples from the initial MV. The searching includes the integer sample offset search stage and fractional sample refinement stage.

25 points full search is applied for integer sample offset searching. The SAD of the initial MV pair is first calculated. If the SAD of the initial MV pair is smaller than a threshold, the integer sample stage of DMVR is terminated. Otherwise SADs of the remaining 24 points are calculated and checked in raster scanning order. The point with the smallest SAD is selected as the output of integer sample offset searching stage. To reduce the penalty of the uncertainty of DMVR refinement, it is proposed to favor the original MV during the DMVR process. The SAD between the reference blocks referred by the initial MV candidates is decreased by $1/4$ of the SAD value.

The integer sample search is followed by fractional sample refinement. To save the calculational complexity, the fractional sample refinement is derived by using parametric error surface equation, instead of additional search with SAD comparison. The fractional sample refinement is conditionally invoked based on the output of the integer sample search stage. When the integer sample search stage is terminated with center having the smallest SAD in either the first iteration or the second iteration search, the fractional sample refinement is further applied.

In parametric error surface based sub-pixel offsets estimation, the center position cost and the costs at four neighboring positions from the center are used to fit a 2-D parabolic error surface equation of the following form $$E(x,y)=A(x-x_{min})^2+B(y-y_{min})^2+C$$

where ($x_{min}$, $y_{min}$) corresponds to the fractional position with the least cost and C corresponds to the minimum cost value. By solving the above equations by using the cost value of the five search points, the ($x_{min}$,$y_{min}$) is computed as:

$x_{min}$=(E(−1,0)−E(1,0))/(2(E(−1,0)+E(1,0)−2E(0,0)))

$y_{min}$=(E(0,−1)−E(0,1))/(2((E(0,−1)+E(0,1)−2E(0,0)))

The value of $x_{min}$ and $y_{min}$ are automatically constrained to be between −8 and 8 since all cost values are positive and the smallest value is E(0,0). This corresponds to half peal offset with $1/16$th-pel MV accuracy in VVC. The computed fractional ($x_{min}$, $y_{min}$) are added to the integer distance refinement MV to get the sub-pixel accurate refinement delta MV.

Bilinear-Interpolation and Sample Padding

In VVC, the resolution of the MVs is $1/16$ luma samples. The samples at the fractional position are interpolated using a 8-tap interpolation filter. In DMVR, the search points are surrounding the initial fractional-pel MV with integer sample offset, therefore the samples of those fractional position need to be interpolated for DMVR search process. To reduce the calculation complexity, the bi-linear interpolation filter is used to generate the fractional samples for the searching process in DMVR. Another important effect is that by using bi-linear filter is that with 2-sample search range, the DVMR does not access more reference samples compared to the normal motion compensation process. After the refined MV is attained with DMVR search process, the normal 8-tap interpolation filter is applied to generate the final prediction. In order to not access more reference samples to normal MC process, the samples, which is not needed for the interpolation process based on the original MV but is needed for the interpolation process based on the refined MV, will be padded from those available samples.

Maximum DMVR Processing Unit

When the width and/or height of a CU are larger than 16 luma samples, it will be further split into subblocks with width and/or height equal to 16 luma samples. The maximum unit size for DMVR searching process is limit to 16×16.

2.21. Adaptive Merge Candidate List Proposed in U.S. Application Ser. No. 17/161,335 (which is Incorporated Herein in its Entirety)

Figure 35:
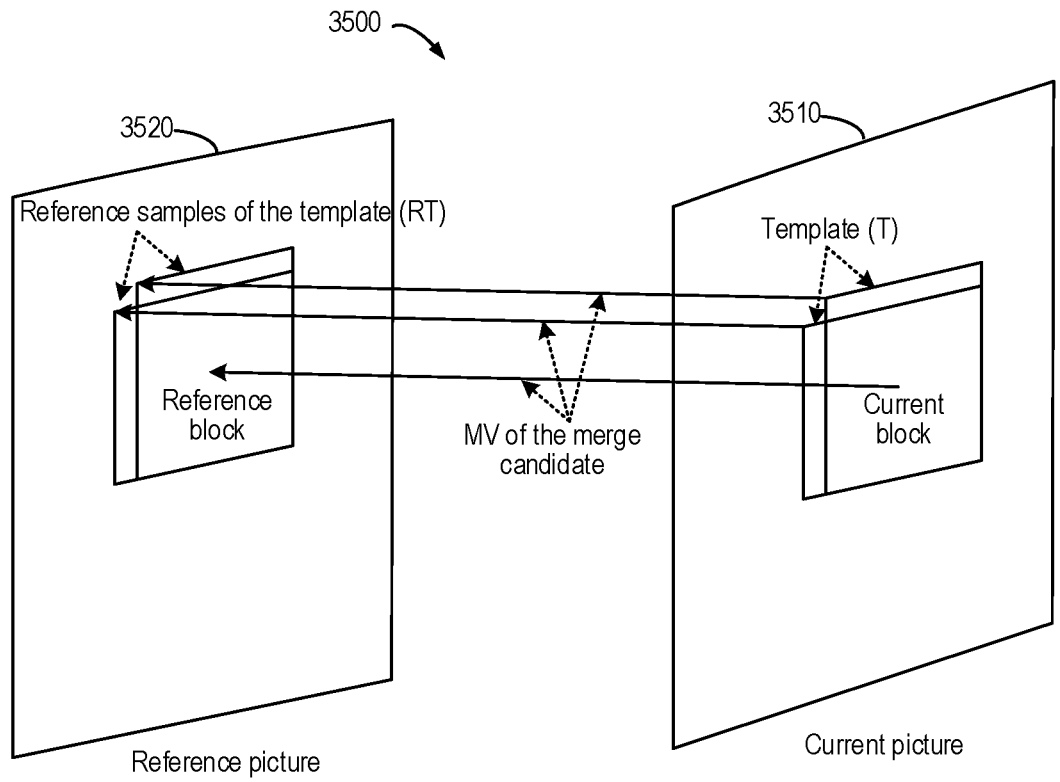
FIG. 35 illustrates a schematic diagram of a template and reference samples of the template.

Hereinafter, template is a set of reconstructed samples adjacently or non-adjacently neighboring to the current block. Reference samples of the template are derived according to the same motion information of the current block. For example, reference samples of the template are mapping of the template depend on a motion information. In this case, reference samples of the template are located by a motion vector of the motion information in a reference picture indicated by the reference index of the motion information. FIG. 35 shows a schematic diagram 3500 of an example of a template and reference samples of the template, wherein RT in a reference picture 3520 represents the reference samples of the template T in a current picture 3510.

Figure 36:
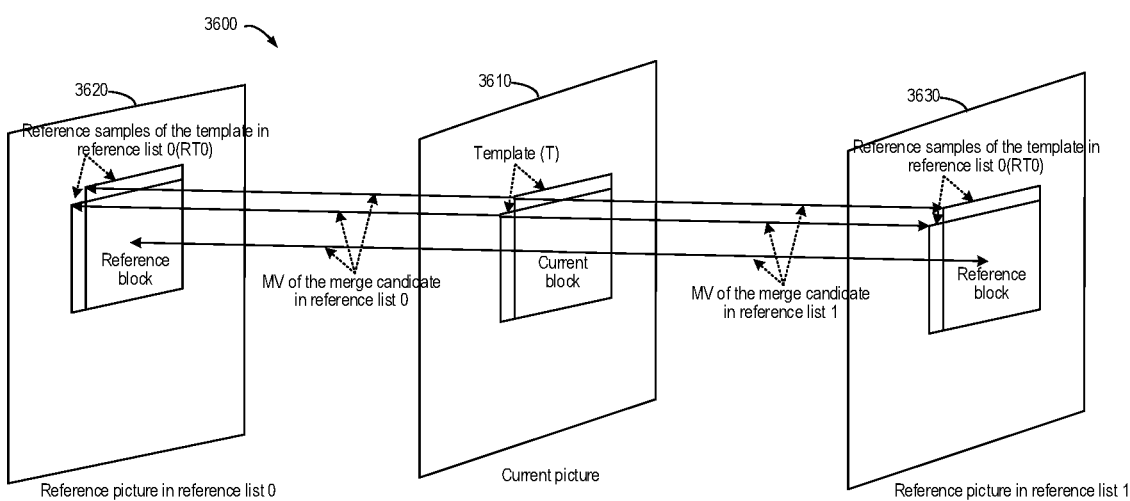
FIG. 36 illustrates a schematic diagram of a template and reference samples of the template in reference list 0 and reference list 1.
Figure 37:
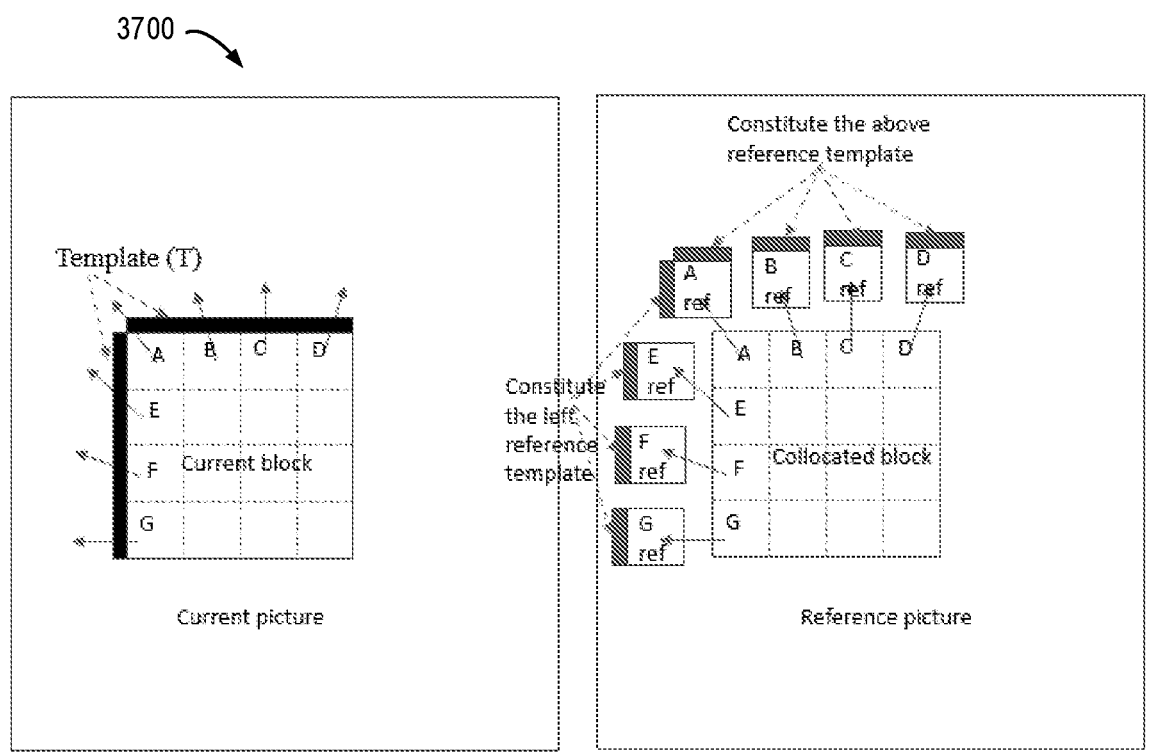
FIG. 37 illustrates a schematic diagram of a template and reference samples of the template for block with sub-block motion using the motion information of the subblocks of current block.
Figure 38:
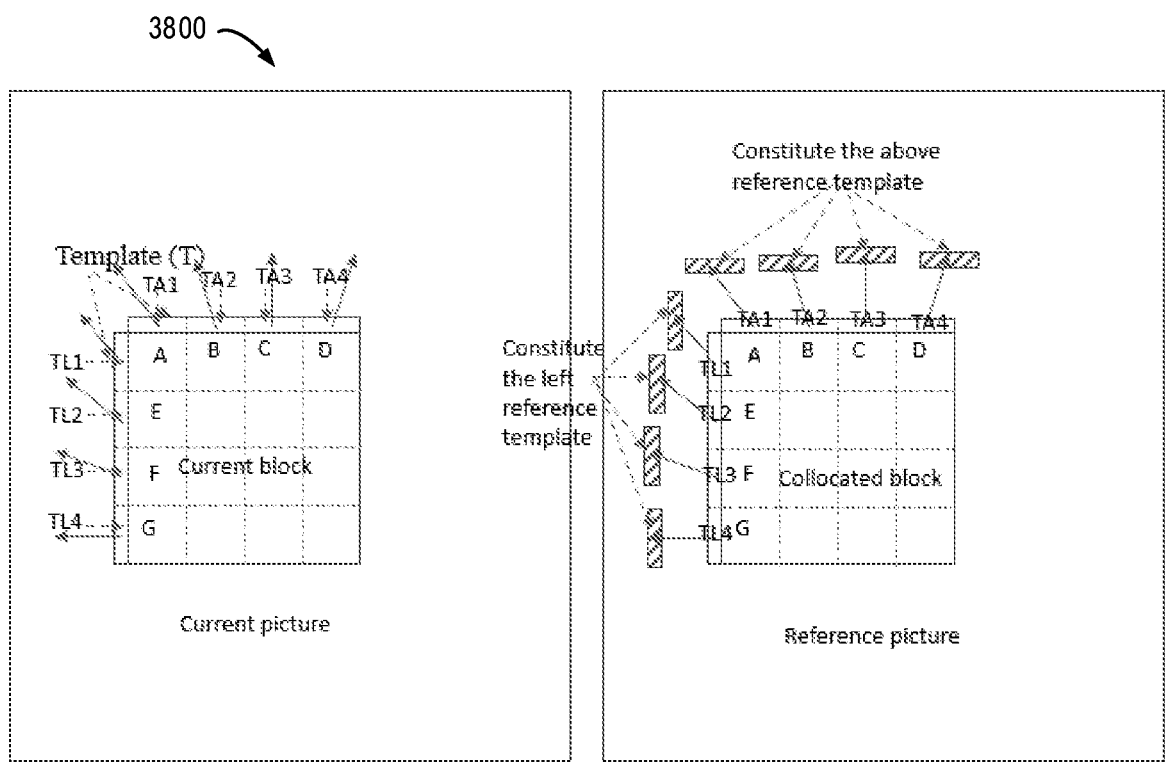
FIG. 38 illustrates a schematic diagram of a template and reference samples of the template for block with sub-block motion using the motion information of each sub-template.
Figure 39:
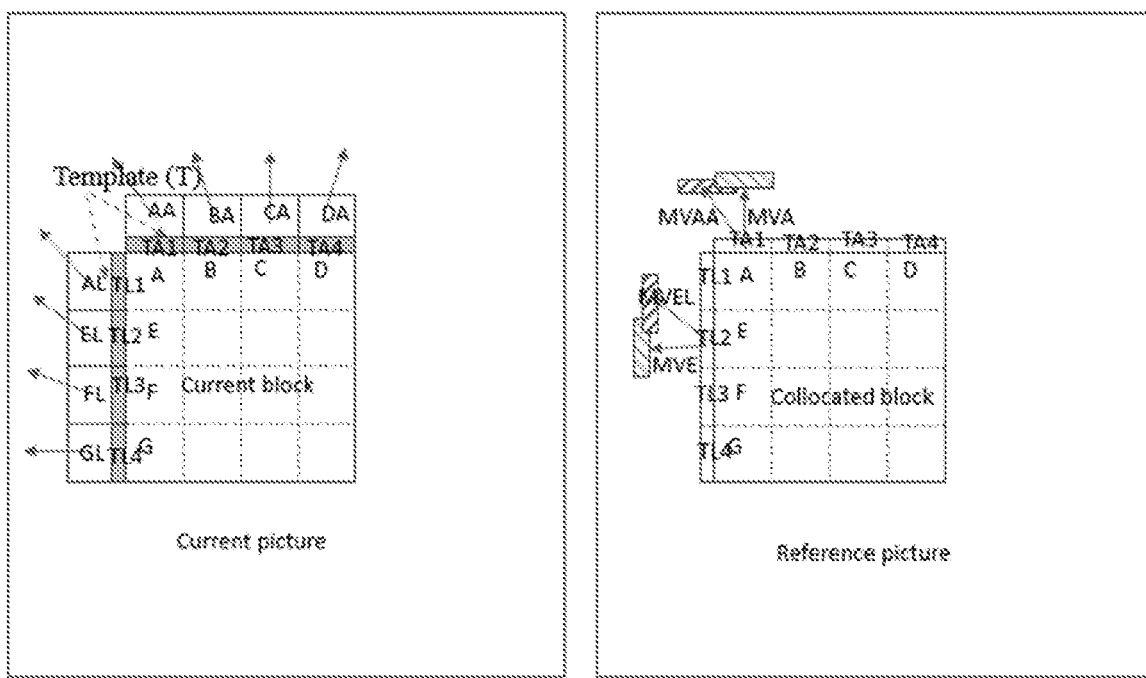
FIG. 39 illustrates a flowchart of a reorder process in an encoder.
Figure 40:
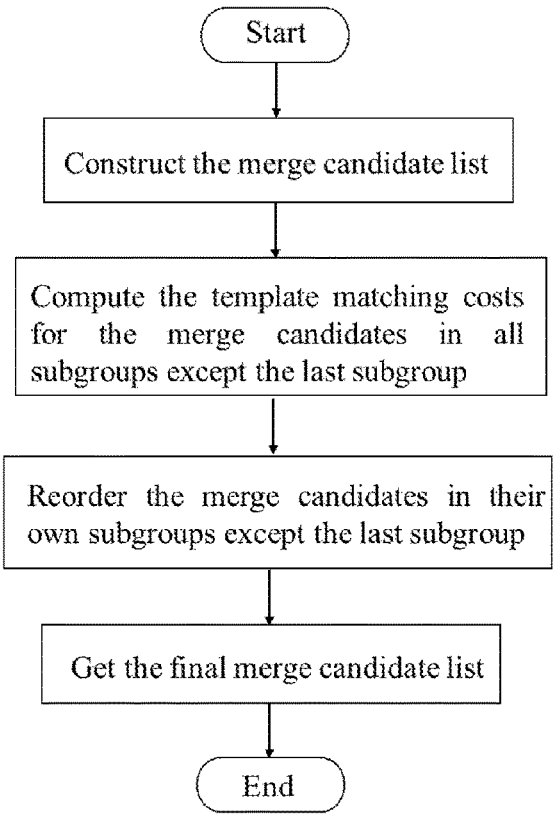
FIG. 40 illustrates a flowchart of a reorder process in a decoder.
Figure 41:
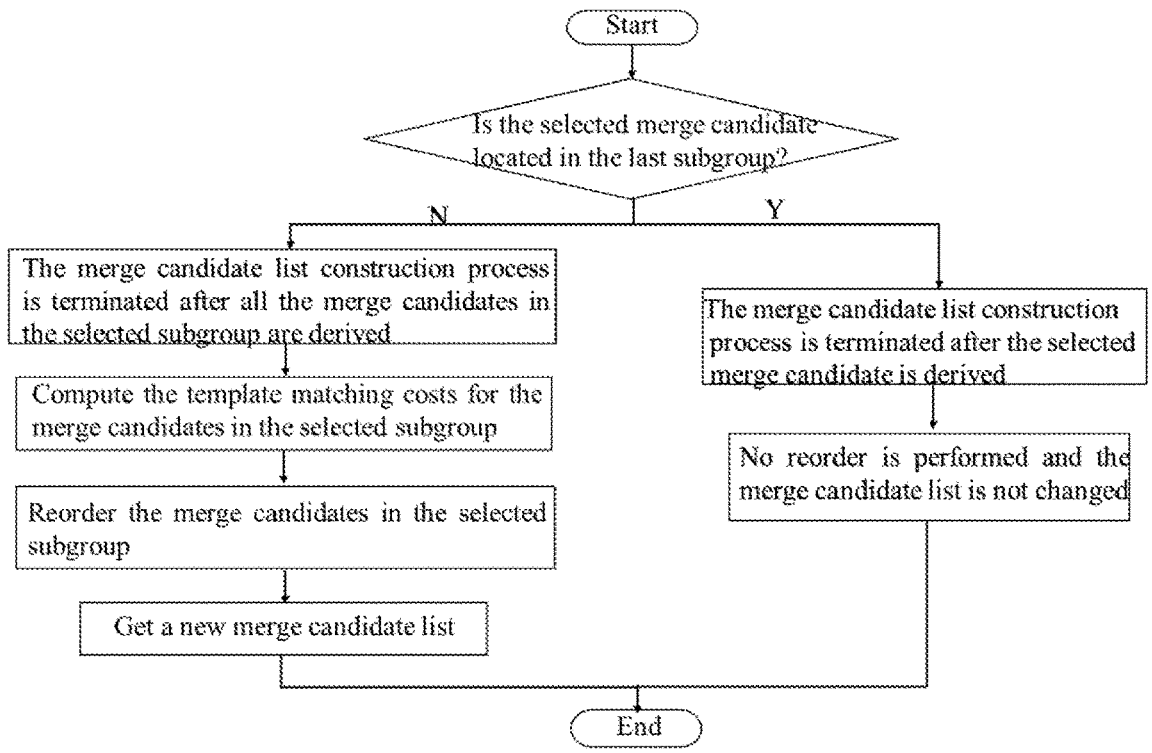
FIG. 41 illustrates template and reference samples of the template for block with OBMC.

When a merge candidate utilizes bi-directional prediction, the reference samples of the template of the merge candidate are denoted by RT and RT may be generated from $RT_0$ which are derived from a reference picture in reference picture list 0 and $RT_1$ derived from a reference picture in reference picture list 1. In one example, $RT_0$ includes a set of reference samples on the reference picture of the current block indicated by the reference index of the merge candidate referring to a reference picture in reference list 0 with the MV of the merge candidate referring to reference list 0), In one example, $RT_1$ includes a set of reference samples on the reference picture of the current block indicated by the reference index of the merge candidate referring to a reference picture in reference list 1 with the MV of the merge candidate referring to reference list 1). An example is shown in FIG. 36 which illustrates a schematic diagram 3600 of a template in a current picture 3610 and reference samples of the template in a reference picture 3620 in reference list 0 and in a reference picture 3630 in reference list 1.

In one example, the reference samples of the template (RT) for bi-directional prediction are derived by equal weighted averaging of the reference samples of the template in reference list0 ($RT_0$) and the reference samples of the template in reference list1 ($RT_1$). One example is as follows:

$$RT=(RT_0+RT_1+1)>>1$$

In one example, the reference samples of the template ($RT_{bi-pred}$) for bi-directional prediction are derived by weighted averaging of the reference samples of the template in reference list0 ($RT_0$) and the reference samples of the template in reference list1 ($RT_1$). One example is as follows:

$$RT=((2^N-w)*RT_0+w*RT_1+2^{N-1})>>N, \text{ for example, } N=3.$$

In one example, the weight of the reference template in reference list0 such as (8−w) and the weight of the reference template in reference list1 such as (w) maybe decided by the BCW index of the merge candidate.

The merge candidates can be divided to several groups according to some criterions. Each group is called a subgroup. For example, adjacent spatial and temporal merge candidates can be taken as a first subgroup and take the remaining merge candidates as a second subgroup; In another example, the first N (N≥2) merge candidates can be also taken as a first subgroup, take the following M (M≥2) merge candidates as a second subgroup, and take the remaining merge candidates as a third subgroup. Note that the proposed methods may be applied to merge candidate list construction process for inter coded blocks (e.g., translational motion), affine coded blocks; or other motion candidate list construction process (e.g., AMVP list; IBC AMVP list; IBC merge list).

W and H are the width and height of current block (e.g., luma block). Taking merge candidate list construction process as an example in the following descriptions:

1. The merge candidates can be adaptively rearranged in the final merge candidate list according to one or some criterions.
    a. In one example, partial or full process of current merge candidate list construction process is firstly invoked, followed by the reordering of candidates in the list.
        i. Alternatively, candidates in a first subgroup may be reordered and they should be added before those candidates in a second subgroup wherein the first subgroup is added before the second subgroup.
            (i) In one example, multiple merge candidates for a first category may be firstly derived and then reordered within the first category; then merge candidates from a second category may be determined according to the reordered candidates in the first category (e.g., how to apply pruning).
        ii. Alternatively, a first merge candidate in a first category may be compared to a second merge candidate in a second category, to decide the order of the first or second merge candidate in the final merge candidate list.
    b. In one example, the merge candidates may be adaptively rearranged before retrieving the merge candidates.
        i. In one example, the procedure of arranging merge candidates adaptively may be processed before the obtaining the merge candidate to be used in the motion compensation process.
    c. In one example, if the width of current block is larger than the height of current block, the above candidate is added before the left candidate.
    d. In one example, if the width of current block is smaller than the height of current block, the above candidate is added after the left candidate.
    e. Whether merge candidates are rearranged adaptively may depend on the selected merging candidate or the selected merging candidate index.
        i. In one example, if the selected merging candidate is in the last sub-group, the merge candidates are not rearranged adaptively.
    f In one example, a merge candidate is assigned with a cost, the merge candidates are adaptively reordered in an ascending order of costs of merge candidates.

i. In one example, the cost of a merge candidate may be a template matching cost.
ii. In one example, template is a set of reconstructed samples adjacently or non-adjacently neighboring to the current block.
iii. A template matching cost is derived as a function of T and RT, wherein T is a set of samples in the template and RT is a set of reference samples for the template.
   (i) How to obtain the reference samples of the template for a merge candidate may depend on the motion information of the merge candidate
      a) In one example, when deriving the reference samples of the template, the motion vectors of the merge candidate are rounded to the integer pixel accuracy, where the integer motion vector may be its nearest integer motion vector.
      b) In one example, when deriving the reference samples of the template, N-tap interpolation filtering is used to get the reference samples of the template at sub-pixel positions. For example, N may be 2, 4, 6, or 8.
      c) In one example, when deriving the reference samples of the template, the motion vectors of the merge candidates may be scaled to a given reference picture (e.g., for each reference picture list if available).
      d) For example, the reference samples of the template of a merge candidate are obtained on the reference picture of the current block indicated by the reference index of the merge candidate with the MVs or modified MVs (e.g., according to bullets a)-b)) of the merge candidate as shown in FIG. 35.
      e) For example, when a merge candidate utilizes bi-directional prediction, the reference samples of the template of the merge candidate are denoted by RT and RT may be generated from $RT_0$ which are derived from a reference picture in reference picture list 0 and $RT_1$ derived from a reference picture in reference picture list 1.
         [1] In one example, $RT_0$ includes a set of reference samples on the reference picture of the current block indicated by the reference index of the merge candidate referring to a reference picture in reference list 0 with the MV of the merge candidate referring to reference list 0),
         [2] In one example, $RT_1$ includes a set of reference samples on the reference picture of the current block indicated by the reference index of the merge candidate referring to a reference picture in reference list 1 with the MV of the merge candidate referring to reference list 1).
         [3] An example is shown in FIG. 36.
      f) In one example, the reference samples of the template (RT) for bi-directional prediction are derived by equal weighted averaging of the reference samples of the template in reference list0 ($RT_0$) and the reference samples of the template in reference list1 ($RT_1$). One example is as follows:

$RT=(RT_0+RT_1+1)>>1$ g) In one example, the reference samples of the template ($RT_{bi-pred}$) for bi-directional prediction are derived by weighted averaging of the reference samples of the template in reference list0 ($RT_0$) and the reference samples of the template in reference list1 ($RT_1$). One example is as follows:

$RT=((2^N-w)*RT_0+w*RT_1+2^{N-1})>>N$, for example, $N=3$.

h) h) In one example, the weight of the reference template in reference list0 such as (8−w) and the weight of the reference template in reference list1 such as (w) maybe decided by the BCW index of the merge candidate.
         [1] In one example, BCW index is equal to 0, w is set equal to −2.
         [2] In one example, BCW index is equal to 1, w is set equal to 3.
         [3] In one example, BCW index is equal to 2, w is set equal to 4.
         [4] In one example, BCW index is equal to 3, w is set equal to 5.
         [5] In one example, BCW index is equal to 4, w is set equal to 10
      i) In one example, if the Local Illumination Compensation (LIC) flag of the merge candidate is true, the reference samples of the template are derived with LIC method.
   (ii) The cost may be calculated based on the sum of absolute differences (SAD) of T and RT.
      a) Alternatively, the cost may be calculated based on the sum of absolute transformed differences (SATD) of T and RT.
      b) Alternatively, the cost may be calculated based on the sum of squared differences (SSD) of T and RT.
      c) Alternatively, the cost may be calculated based on weighted SAD/weighted SATD/ weighted SSD.
   (iii) The cost may consider the continuity (Boundary_SAD) between RT and reconstructed samples adjacently or non-adjacently neighboring to T in addition to the SAD calculated in (ii). For example, reconstructed samples left and/or above adjacently or non-adjacently neighboring to T are considered.
      a) In one example, the cost may be calculated based on SAD and Boundary_SAD
         [1] In one example, the cost may be calculated as (SAD+w*Boundary_SAD). w may be predefined, or signaled or derived according to decoded information.
2. Whether to and/or how to reorder the merge candidates may depend on the category of the merge candidates.
   a. In one example, only adjacent spatial and temporal merge candidates can be reordered.
   b. In one example, only adjacent spatial, STMVP, and temporal merge candidates can be reordered.
   c. In one example, only adjacent spatial, STMVP, temporal and non-adjacent spatial merge candidates can be reordered.
   d. In one example, only adjacent spatial, STMVP, temporal, non-adjacent spatial and HMVP merge candidates can be reordered.

e. In one example, only adjacent spatial, STMVP, temporal, non-adjacent spatial, HMVP and pair-wise average merge candidates can be reordered.
f. In one example, only adjacent spatial, temporal, HMVP and pair-wise average merge candidates can be reordered.
g. In one example, only adjacent spatial, temporal, and HMVP merge candidates can be reordered.
h. In one example, only adjacent spatial merge candidates can be reordered.
i. In one example, only the first subgroup can be reordered.
j. In one example, the last subgroup can not be reordered.
k. In one example, only the first N merge candidates can be reordered.
 i. In one example, N is set equal to 5.
l. In one example, for the candidates not to be reordered, they will be arranged in the merge candidate list according to the initial order.
m. In one example, candidates not to be reordered may be put behind the candidates to be reordered.
n. In one example, candidates not to be reordered may be put before the candidates to be reordered.
o. In one example, a combination of some of the above items (a-k) can be reordered.
p. Different subgroups may be reordered separately.
q. Two candidates in different subgroups cannot be compared and/or reordered.
r. A first candidate in a first subgroup must be put ahead of a second candidate in a second subgroup after reordering if the first subgroup is ahead of a second subgroup.

3. Whether to and/or how to reorder the merge candidates may depend on the coding mode.
 a. In one example, if the coding mode is regular merge mode, the merge candidates can be reordered.
 b. In one example, if the coding mode is MMVD, the merge candidates to derive the base merge candidates are not reordered.
  i. Alternatively, the reordering method may be different for the MMVD mode and other merge modes.
 c. In one example, if the coding mode is CIIP, the merge candidates used for combination with intra prediction are based on the reordered merge candidates.
  i. Alternatively, the reordering method may be different for the CIIP mode and other merge modes.
 d. In one example, if the coding mode is GPM, the merge candidates to derive the uni-prediction candidate list are not reordered.
  i. Alternatively, the reordering method may be different for the GPM mode and other merge modes.
 e. In one example, if the coding mode is a triangle partition mode, the merge candidates to derive the uni-prediction candidate list are not reordered.
  i. Alternatively, the reordering method may be different for the triangular mode and other merge modes.
 f. In one example, if the coding mode is a subblock based merge mode, partial or full subblock based merge candidates are reordered.
  i. Alternatively, the reordering method may be different for the subblock based merge mode and other merge modes
  ii. In one example, the uni-prediction subblock based merge candidates are not reordered.
  iii. In one example, the SbTMVP candidate is not reordered.
  iv. In one example, the constructed affine candidates are not reordered.
  v. In one example, the zero padding affine candidates are not reordered.

4. Whether to and/or how to reorder the merge candidates may depend on the available number of adjacent spatial and/or STMVP and/or temporal merge candidates 5. Whether the merge candidates need to be reordered or not may depend on decoded information (e.g., the width and/or height of the CU).
 a. In one example, if the height is larger than or equal to M, the width is larger than or equal to N, and width*height is larger than or equal to R, the merge candidates can be reordered.
  i. In one example, M, N, and R are set equal to 8, 8, and 128.
  ii. In one example, M, N, and R are set equal to 16, 16, and 512.
 b. In one example, if the height is larger than or equal to M and the width is larger than or equal to N, the merge candidates can be reordered.
  i. In one example, M and N are set equal to 8 and 8.
  ii. In one example, M and N are set equal to 16 and 16.

6. The subgroup size can be adaptive.
 a. In one example, the subgroup size is decided according to the available number of adjacent spatial and/or STMVP and/or temporal merge candidates denoted as N.
  i. In one example, if N is smaller than M and larger than Q, the subgroup size is set to N;
  ii. In one example, if N is smaller than or equal to Q, no reordering is performed;
  iii. In one example, if N is larger than or equal to M, the subgroup size is set to M.
  iv. In one example, M and Q are set equal to 5 and 1, respectively.
   (i) Alternatively, M and/or Q may be pre-defined, or signaled or derived according to decoded information.
 b. In one example, the subgroup size is decided according to the available number of adjacent spatial and temporal merge candidates denoted as N.
  i. In one example, if N is smaller than M and larger than Q, the subgroup size is set to N;
  ii. In one example, if N is smaller than or equal to Q, no reorder is performed;
  iii. In one example, if N is larger than or equal to M, the subgroup size is set to M.
  iv. In one example, M and Q are set equal to 5 and 1, respectively.

7. The template shape can be adaptive.
 a. In one example, the template may only comprise neighboring samples left to the current block.
 b. In one example, the template may only comprise neighboring samples above to the current block.
 c. In one example, the template shape is selected according to the CU shape.
 d. In one example, the width of the left template is selected according to the CU height.
  i. For example, if H<=M, then the left template size is w1×H; otherwise, the left template size is w2×H.
 e. In one example, M, w1, and w2 are set equal to 8, 1, and 2, respectively.

f. In one example, the height of the above template is selected according to the CU width.
   i. For example, if W<=N, then the above template size is W×h1; otherwise, the above template size is W×h2.
      (i) In one example, N, h1, and h2 are set equal to 8, 1, and 2, respectively.
g. In one example, the width of the left template is selected according to the CU width.
   i. For example, if W<=N, then the left template size is w1×H; otherwise, the left template size is w2×H.
      (i) In one example, N, w1, and w2 are set equal to 8, 1, and 2, respectively.
h. In one example, the height of the above template is selected according to the CU height.
   i. For example, if H<=M, then the above template size is W×h1; otherwise, the above template size is W×h2.
      (i) In one example, M, h1, and h2 are set equal to 8, 1, and 2, respectively.
i. In one example, samples of the template and the reference samples of the template samples may be subsampled or downsampled before being used to calculate the cost.
   i. Whether to and/or how to do subsampling may depend on the CU dimensions.
   ii. In one example, no subsampling is performed for the short side of the CU.

8. In above examples, the merge candidate is one candidate which is included in the final merge candidate list (e.g., after pruning)
   a. Alternatively, the merge candidate is one candidate derived from a given spatial or temporal block or HMVP table or with other ways even it may not be included in the final merge candidate list.

9. The template may comprise samples of specific color component(s).
   a. In one example, the template only comprises samples of the luma component.

10. Whether to apply the adaptive merge candidate list reordering may depend on a message signaled in VPS/SPS/PPS/sequence header/picture header/slice header/CTU/CU/TU/PU. It may also be a region based on signaling. For example, the picture is partitioned into groups of CTU/CUs evenly or unevenly, and one flag is coded for each group to indicate whether merge candidate list reordering is applied or not.

2.22. Adaptive Motion Candidate List Proposed in PCT/CN2021/086213 (which is Incorporated Herein in its Entirety)

1. The motion candidates in a motion candidate list of a block can be adaptively rearranged to derive the reordered motion candidate list according to one or some criterions, and the block is encoded/decoded according to the reordered motion candidate list.
   a. The motion candidates in a motion candidate list of a block which is not a regular merge candidate list can be adaptively rearranged to derive the reordered motion candidate list according to one or some criterions.
   b. In one example, whether to and/or how to reorder the motion candidates may depend on the coding mode (e.g. affine merge, affine AMVP, regular merge, regular AMVP, GPM, TPM, MMVD, TM merge, CIIP, GMVD, affine MMVD).
   c. In one example, whether to and/or how to reorder the motion candidates may depend on the category (e.g., spatial, temporal, STMVP, HMVP, pair-wise, SbTMVP, constructed affine, inherited affine) of the motion candidates.
   d. In one example, the motion candidate list may be the AMVP candidate list.
   e. In one example, the motion candidate list may be the merge candidate list.
   f. In one example, the motion candidate list may be the affine merge candidate list.
   g. In one example, the motion candidate list may be the sub-block-based merge candidate list.
   h. In one example, the motion candidate list may be the GPM merge candidate list.
   i. In one example, the motion candidate list may be the TPM merge candidate list.
   j. In one example, the motion candidate list may be the TM merge candidate list.
   k. In one example, the motion candidate list may be the candidate list for MMVD coded blocks.
   l. In one example, the motion candidate list may be the candidate list for DMVR coded blocks.

2. How to adaptively rearrange motion candidates in a motion candidate list may depend on the decoded information, e.g., the category of a motion candidate, a category of a motion candidate list, a coding tool.
   a. In one example, for different motion candidate lists, different criteria may be used to rearrange the motion candidate list.
      i. In one example, the criteria may include how to select the template.
      ii. In one example, the criteria may include how to calculate the template cost.
      iii. In one example, the criteria may include how many candidates and/or how many sub-groups in a candidate list need to be reordered.
   b. In one example, the motion candidates in a motion candidate list are firstly adaptively rearranged to construct a fully rearranged candidate list or partially rearranged candidate list, and at least one motion candidate indicated by at least one index is then retrieved from the rearranged candidate list to derive the final motion information to be used by the current block.
   c. In one example, the motion candidates before refinement (e.g., using TM for TM coded blocks; adding MVD for MMVD coded blocks) are firstly adaptively rearranged to construct a fully rearranged candidate list or partially rearranged candidate list. Then at least one motion candidate indicated by at least one index is retrieved from the rearranged candidate list, and refinement (e.g., using TM for TM coded blocks; adding MVD for MMVD coded blocks) is applied to the retrieved one to derive the final motion information for the current block.
   d. In one example, refinement (e.g., using TM for TM coded blocks; adding MVD for MMVD coded blocks) is applied to at least one of the motion candidates in a motion candidate list, then they are adaptively rearranged to construct a fully rearranged candidate list or partially rearranged candidate list, and at least one motion candidate indicated by at least one index is then retrieved from the rearranged candidate list to derive final the motion information without any further refinement for the current block.

3. In one example, new MERGE/AMVP motion candidates may be generated based on the candidates reordering.
    i. For example, L0 motion and L1 motion of the candidates may be reordered separately.
    ii. For example, new bi-prediction merge candidates may be constructed by combining one from the reordered L0 motion and the other from the reordered L1 motion.
    iii. For example, new uni-prediction merge candidates may be generated by the reordered L0 or L1 motion.

2.23. Adaptive Motion Candidate List Proposed in PCT/CN2021/086216(which is Incorporated Herein in its Entirety)

For subblock motion prediction, if the subblock size is Wsub*Hsub, the height of the above template is Ht, the width of the left template is Wt, the above template can be treated as a constitution of several sub-templates with the size of Wsub*Ht, the left template can be treated as a constitution of several sub-templates with the size of Wt*Hsub. After deriving the reference samples of each sub-template in the above similar way, the reference samples of the template are derived. Two examples are shown in FIG. 2-34 and FIG. 2-35.

It is noted that the terminologies mentioned below are not limited to the specific ones defined in existing standards. Any variance of the coding tool is also applicable. For example, the term "GPM" is used to represent any coding tool that derive two sets of motion information and use the derived information and the splitting pattern to get the final prediction, e.g., TPM is also treated as GPM.

Note that the proposed methods may be applied to merge candidate list construction process for inter coded blocks (e.g., translational motion), affine coded blocks, or IBC coded blocks; or other motion candidate list construction process (e.g., normal AMVP list; affine AMVP list; IBC AMVP list).

W and H are the width and height of current block (e.g., luma block).

1. In one example, if the coding mode is TM merge, partial or full TM merge candidates may be reordered.
    a. In one example, if the coding mode is TM merge, the partial or full original TM merge candidates may be reordered, before the TM refinement process.
    b. Alternatively, if the coding mode is TM merge, the partial or full refined TM merge candidates may be reordered, after the TM refinement process.
    c. Alternatively, if the coding mode is TM merge, the TM merge candidates may not be reordered.
    d. Alternatively, the reordering method may be different for the TM merge mode and other merge modes.

2. In one example, if the coding mode is a subblock based merge mode, partial or full subblock based merge candidates may be reordered.
    a. Alternatively, the reordering method may be different for the subblock based merge mode and other merge modes
    b. In one example, a template may be divided into sub-templates. Each sub-template may possess an individual piece of motion information.
        i. In one example, the cost used to reorder the candidates may be derived based on the cost of each sub-template. For example, the cost used to reorder the candidates may be calculated as the sum of the costs of all sub-templates. For example, the cost for a sub-template may be calculated as SAD, SATD, SSD or any other distortion measurement between the sub-template and its corresponding reference sub-template.
    c. In one example, to derive the reference samples of a sub-template, the motion information of the sub-blocks in the first row and the first column of current block may be used.
        i. In one example, the motion information of a sub-template may be derived (e.g. copied) from its adjacent sub-block in the current block. An example is shown in FIG. 2-34.
    d. In one example, to derive the reference samples of a sub-template, the motion information of the sub-template may be derived without referring to motion information of a sub-block in the current block. An example is shown in FIG. 2-35.
        i. In one example, the motion information of each sub-template is calculated according to the affine model of current block.
            (i) In one example, the motion vector of the center sample of each subblock containing a sub-template calculated according to the affine model of current block is treated as the motion vector of the sub-template.
            (ii) In one example, the motion vector of the center sample of each sub-template calculated according to the affine model of current block is treated as the motion vector of the sub-template.
            (iii) For 4-parameter affine motion model, motion vector at sample location (x,y) in a block is derived as:

$$\begin{cases} mv_x = \dfrac{mv_{1x} - mv_{0x}}{W}x + \dfrac{mv_{0y} - mv_{1y}}{W}y + mv_{0x} \\ mv_y = \dfrac{mv_{1y} - mv_{0y}}{W}x + \dfrac{mv_{1x} - mv_{0x}}{W}y + mv_{0y} \end{cases}$$

(iv) For 6-parameter affine motion model, motion vector at sample location (x,y) in a block is derived as:

$$\begin{cases} mv_x = \dfrac{mv_{1x} - mv_{0x}}{W}x + \dfrac{mv_{2x} - mv_{0x}}{H}y + mv_{0x} \\ mv_y = \dfrac{mv_{1y} - mv_{0y}}{W}x + \dfrac{mv_{2y} - mv_{0y}}{H}y + mv_{0y} \end{cases}$$

(v) For (iii) and (iv), the coordinates of above-left, above-right, and bottom-left corner of current block are (0,0), (W,0) and (0,H), the motion vectors of above-left, above-right, and bottom-left corner of current block are ($mv_{0x}$, $mv_{0y}$), ($mv_{1x}$, $mv_{1y}$) and ($mv_{2x}$, $mv_{2y}$).
            (vi) In one example, the coordinate (x,y) in the above equations may be set equal to a position in the template, or a position of a sub-template. E.g., the coordinate (x,y) may be set equal to a center position of a sub-template.
    e. In one example, this scheme may be applied to affine merge candidates.
    f In one example, this scheme may be applied to affine AMVP candidates.
    g. In one example, this scheme may be applied to SbTMVP merge candidate.
    h. In one example, this scheme may be applied to GPM merge candidates.

i. In one example, this scheme may be applied to TPM merge candidates.
j. In one example, this scheme may be applied to TM-refinement merge candidates.
k. In one example, this scheme may be applied to DMVR-refinement merge candidates.
l. In one example, this scheme may be applied to MULTI_PASS_DMVR-refinement merge candidates.

3. In one example, if the coding mode is MMVD, the merge candidates to derive the base merge candidates may be reordered.
   a. In one example, the reordering process may be applied on the merge candidates before the merge candidates is refined by the signaled or derived MVD(s).
   b. For example, the reordering method may be different for the MMVD mode and other merge modes.

4. In one example, if the coding mode is MMVD, the merge candidates after the MMVD refinement may be reordered.
   a. In one example, the reordering process may be applied on the merge candidates after the merge candidates is refined by the signaled or derived MVD(s).
   b. For example, the reordering method may be different for the MMVD mode and other merge modes.

5. In one example, if the coding mode is affine MMVD, the merge candidates to derive the base merge candidates may be reordered.
   a. In one example, the reordering process may be applied on the merge candidates before the affine merge candidates is refined by the signaled or derived MVD(s).
   b. For example, the reordering method may be different for the affine MMVD mode and other merge modes.

6. In one example, if the coding mode is affine MMVD, the merge candidates after the affine MMVD refinement may be reordered.
   a. In one example, the reordering process may be applied on the affine merge candidates after the merge candidates is refined by the signaled or derived MVD(s).
   b. For example, the reordering method may be different for the affine MMVD mode and other merge modes.

7. In one example, if the coding mode is GMVD, the merge candidates to derive the base merge candidates may be reordered.
   a. In one example, the reordering process may be applied on the merge candidates before the merge candidates is refined by the signaled or derived MVD(s).
   b. For example, the reordering method may be different for the GMVD mode and other merge modes.

8. In one example, if the coding mode is GMVD, the merge candidates after the GMVD refinement may be reordered.
   a. In one example, the reordering process may be applied on the merge candidates after the merge candidates is refined by the signaled or derived MVD(s).
   b. For example, the reordering method may be different for the GMVD mode and other merge modes.

9. In one example, if the coding mode is GPM, the merge candidates may be reordered.
   a. In one example, the reordering process may be applied on the original merge candidates before the merge candidates are used to derive the GPM candidate list for each partition (a.k.a. the uni-prediction candidate list for GPM).
   b. In one example, if the coding mode is GPM, the merge candidates in the uni-prediction candidate list may be reordered.
   c. In one example, the GPM uni-prediction candidate list may be constructed based on the reordering.
      i. In one example, a candidate with bi-prediction (a.k.a. bi-prediction candidate) may be separated into two uni-prediction candidates.
         (i) If the number of original merge candidates is M, at most 2M uni-prediction candidates may be separated from them.
      ii. In one example, uni-prediction candidates separated from a bi-prediction candidate may be put into an initial uni-prediction candidate list.
      iii. In one example, candidates in the initial uni-prediction candidate list may be reordered with the template matching costs.
      iv. In one example, the first N uni-prediction candidates with smaller template matching costs may be used as the final GPM uni-prediction candidates. As an example, N is equal to M.
   d. In one example, after deriving a GPM uni-prediction candidate list, a combined bi-prediction list for partition 0 and partition 1 is constructed, then the bi-prediction list is reordered.
      i. In one example, if the number of GPM uni-prediction candidates is M, the number of combined bi-prediction candidates is $M*(M-1)$.
   e. Alternatively, the reordering method may be different for the GPM mode and other merge modes.

3. PROBLEMS

The current design of merge mode can be further improved.

Fixed merge candidate order may not be optimal. Adaptive merge candidate list generation process can be used to improve the effectiveness of merge mode. Furthermore, coding efficiency can be improved.

4. DETAILED DESCRIPTION

The detailed descriptions below should be considered as examples to explain general concepts. These detailed descriptions should not be interpreted in a narrow way. Furthermore, these detailed descriptions can be combined in any manner.

It is noted that the terminologies mentioned below are not limited to the specific ones defined in existing standards. Any variance of the coding tool is also applicable. For example, the term "GPM" is used to represent any coding tool that derive two sets of motion information and use the derived information and the splitting pattern to get the final prediction, e.g., TPM is also treated as GPM.

Note that the proposed methods may be applied to merge candidate list construction process for inter coded blocks (e.g., translational motion), affine coded blocks, or IBC coded blocks; or other motion candidate list construction process (e.g., normal AMVP list; affine AMVP list; IBC AMVP list).

W and H are the width and height of current block (e.g., luma block).

1. The reference samples of a template or sub-template (RT) for bi-directional prediction are derived by equal weighted averaging of the reference samples of the template or sub-template in reference list0 ($RT_0$) and the reference samples of the template or sub-template in reference list1 ($RT_1$). One example is as follows:

$$RT(x,y)=(RT_0(x,y)+RT_1(x,y)+1)>>1$$

2. The reference samples of a template or sub-template (RT) for bi-directional prediction are derived by weighted averaging of the reference samples of the template or sub-template in reference list0 ($RT_0$) and the reference samples of the template or sub-template in reference list1 ($RT_1$).
   a. One example is as follows:

$$RT(x,y)=((2^N-w)*RT_0(x,y)+w*RT_1(x,y)+2^{N-1})>>N, \text{ for example, } N=3.$$

b. The weights may be determined by the BCW index or derived on-the-fly or pre-defined or by the weights used in weighted prediction.
   c. In one example, the weight of the reference template in reference list0 such as (8−w) and the weight of the reference template in reference list1 such as (w) maybe decided by the BCW index of the merge candidate.
      i. In one example, BCW index is equal to 0, w is set equal to −2.
      ii. In one example, BCW index is equal to 1, w is set equal to 3.
      iii. In one example, BCW index is equal to 2, w is set equal to 4.
      iv. In one example, BCW index is equal to 3, w is set equal to 5.
      v. In one example, BCW index is equal to 4, w is set equal to 10.
3. It is proposed that the reference samples of the template may be derived with LIC method.
   a. In one example, the LIC parameters for both left and above templates are the same as the LIC parameters of current block.
   b. In one example, the LIC parameters for left template are derived as the LIC parameters of current block which uses its original motion vector plus a motion vector offset of (−Wt,0) as the motion vector of current block.
   c. In one example, the LIC parameters for above template are derived as the LIC parameters of current block which uses its original motion vector plus a motion vector offset of (0, −Ht) as the motion vector of current block.
   d. Alternatively, furthermore, the above bullets may be applied if the Local Illumination Compensation (LIC) flag of a merge candidate is true
4. It is proposed that the reference samples of the template or sub-template may be derived with OBMC method. In the following discussion, a "template" may refer to a template or a sub-template.
   a. In one example, to derive the reference samples of the above template, the motion information of the subblocks in the first row of current block and their above adjacent neighboring subblocks are used. And the reference samples of all the sub-templates constitute the reference samples of the above template. An example is shown in FIG. 4-1.
   b. In one example, to derive the reference samples of the left template, the motion information of the subblocks in the first column of current block and their left adjacent neighboring subblocks are used. And the reference samples of all the sub-templates constitute the reference samples of the left template. An example is shown in FIG. 4-1.
   c. In one example, the subblock size is 4×4.
   d. The reference samples of a sub-template based on motion vectors of a neighbouring subblock is denoted as $P_N$, with N indicating an index for the neighbouring above and left subblocks and the reference samples of a sub-template based on motion vectors of a subblock of current block is denoted as $P_C$. For $P_N$ generated based on motion vectors of vertically (horizontally) neighbouring sub-block, samples in the same row (column) of $P_N$ are added to $P_C$ with a same weighting factor.
      i. The reference samples of a sub-template (P) may be derived as $P=W_N*P_N+W_C*P_C$
      ii. In one example, the weighting factors {¼, ⅛, 1/16, 1/32} are used for the {first, second, third, fourth} row (column) of $P_N$ and the weighting factors {¾, ⅞, 15/16, 31/32} are used for the {first, second, third, fourth} row (column) of $P_C$ if the height of the above template or the width of the left template is larger than or equal to 4.
      iii. In one example, the weighting factors {¼, ⅛} are used for the {first, second} row (column) of $P_N$ and the weighting factors {¾, ⅞} are used for the {first, second} row (column) of $P_C$ if the height of the above template or the width of the left template is larger than or equal to 2.
      iv. In one example, the weighting factor {¼} is used for the first row (column) of $P_N$ and the weighting factor {¾} is used for the first row (column) of $P_C$ if the height of the above template or the width of the left template is larger than or equal to 1.
   e. The above bullets may be applied if a merge candidate is assigned with OBMC enabled.
5. In one example, if a merge candidate uses multi-hypothesis prediction, the reference samples of the template may be derived with multi-hypothesis prediction method.
6. The template may comprise samples of specific color component(s).
   a. In one example, the template only comprises samples of the luma component.
   b. Alternatively, the template only comprises samples of any component such as Cb/Cr/R/G/B.
7. Whether to and/or how to reorder the motion candidates may depend on the category of the motion candidates.
   a. In one example, only adjacent spatial and temporal motion candidates can be reordered.
   b. In one example, only adjacent spatial, STMVP, and temporal motion candidates can be reordered.
   c. In one example, only adjacent spatial, STMVP, temporal and non-adjacent spatial motion candidates can be reordered.
   d. In one example, only adjacent spatial, STMVP, temporal, non-adjacent spatial and HMVP motion candidates can be reordered.
   e. In one example, only adjacent spatial, STMVP, temporal, non-adjacent spatial, HMVP and pair-wise average motion candidates can be reordered.
   f. In one example, only adjacent spatial, temporal, HMVP and pair-wise average motion candidates can be reordered.
   g. In one example, only adjacent spatial, temporal, and HMVP motion candidates can be reordered.

h. In one example, only adjacent spatial motion candidates can be reordered.
i. In one example, the uni-prediction subblock based motion candidates are not reordered.
j. In one example, the SbTMVP candidate is not reordered.
k. In one example, the inherited affine motion candidates are not reordered.
l. In one example, the constructed affine motion candidates are not reordered.
m. In one example, the zero padding affine motion candidates are not reordered.
n. In one example, only the first N motion candidates can be reordered.
  i. In one example, N is set equal to 5.
8. In one example, the motion candidates may be divided into subgroups. Whether to and/or how to reorder the motion candidates may depend on the subgroup of the motion candidates.
  a. In one example, only the first subgroup can be reordered.
  b. In one example, the last subgroup can not be reordered.
  c. In one example, the last subgroup can not be reordered. But if the last subgroup also is the first subgroup, it can be reordered.
  d. Different subgroups may be reordered separately.
  e. Two candidates in different subgroups cannot be compared and/or reordered.
  f. A first candidate in a first subgroup must be put ahead of a second candidate in a second subgroup after reordering if the first subgroup is ahead of a second subgroup.
9. In one example, the motion candidates which are not included in the reordering process may be treated in specified way.
  a. In one example, for the candidates not to be reordered, they will be arranged in the merge candidate list according to the initial order.
  b. In one example, candidates not to be reordered may be put behind the candidates to be reordered.
  c. In one example, candidates not to be reordered may be put before the candidates to be reordered.
10. Whether to apply the adaptive merge candidate list reordering may depend on a message signaled in VPS/SPS/PPS/sequence header/picture header/slice header/CTU/CU/TU/PU. It may also be a region based on signaling. For example, the picture is partitioned into groups of CTU/CUs evenly or unevenly, and one flag is coded for each group to indicate whether merge candidate list reordering is applied or not.

1. Embodiment 1.1 Embodiment #1

We can assume the number of the merge candidates is 8. We take the first 5 merge candidates as a first subgroup and take the following 3 merge candidates as a second subgroup (i.e. the last subgroup).

For the encoder, after the merge candidate list is constructed, some merge candidates are adaptively reordered in an ascending order of costs of merge candidates as shown in FIG. 5-1.

More specifically, the template matching costs for the merge candidates in all subgroups except the last subgroup are computed; then reorder the merge candidates in their own subgroups except the last subgroup; finally, the final merge candidate list will be got.

For the decoder, after the merge candidate list is constructed, some/no merge candidates are adaptively reordered in ascending order of costs of merge candidates as shown in FIG. 5-2.

In FIG. 5-2, the subgroup the selected (signaled) merge candidate located in is called the selected subgroup.

More specifically, if the selected merge candidate is located in the last subgroup, the merge candidate list construction process is terminated after the selected merge candidate is derived, no reorder is performed and the merge candidate list is not changed; otherwise, the execution process is as follows:

The merge candidate list construction process is terminated after all the merge candidates in the selected subgroup are derived; compute the template matching costs for the merge candidates in the selected subgroup; reorder the merge candidates in the selected subgroup; finally, a new merge candidate list will be got.

For both encoder and decoder, the followings apply:
  A template matching cost is derived as a function of T and RT, wherein T is a set of samples in the template and RT is a set of reference samples for the template.
  When deriving the reference samples of the template for a merge candidate, bilinear interpolation filter is used.
  The reference samples of the template (RT) for bi-directional prediction are derived by weighted averaging of the reference samples of the template in reference list0 ($RT_0$) and the reference samples of the template in reference list1 ($RT_1$) as follows.

$$RT=((8-w)*RT_0+w*RT_1+4)>>3$$

where the weight of the reference template in reference list0 (8−w) and the weight of the reference template in reference list1 (w) are decided by the BCW index of the merge candidate. BCW index equal to {0,1,2,3,4} corresponds to w equal to {−2,3,4,5,10}, respectively.
  If the Local Illumination Compensation (LIC) flag of the merge candidate is true, the reference samples of the template are derived with LIC method.
  The template matching cost is calculated based on the sum of absolute differences (SAD) of T and RT.
  The template size is 1. That means the width of the left template and/or the height of the above template is 1.
  If the coding mode is MMVD, the merge candidates to derive the base merge candidates are not reordered.
  If the coding mode is GPM, the merge candidates to derive the uni-prediction candidate list are not reordered.
  If the coding mode is TM merge, all the original TM merge candidates are reordered.
  If the coding mode is subblock based merge mode, all subblock based merge candidates are reordered.

Figure 42:
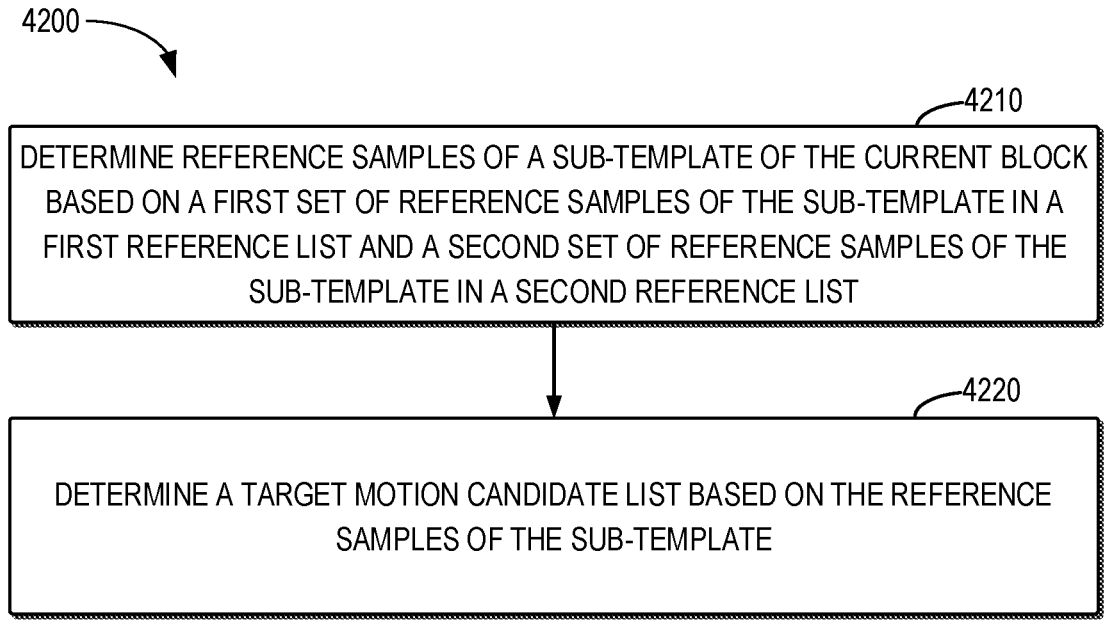
FIG. 42 illustrates a flowchart of a method for video processing in accordance with some embodiments of the present disclosure.

FIG. 42 illustrates a flowchart of a method 4200 for video processing in accordance with some embodiments of the present disclosure. The method 4200 comprises: determining 4210, during a conversion between a current block of a video and a bitstream of the video, reference samples of a sub-template of the current block based on a first set of reference samples of the sub-template in a first reference list and a second set of reference samples of the sub-template in a second reference list; and determining 4220 a target motion candidate list based on the reference samples of the sub-template. In this way, the proposed method can advantageously improve the coding efficiency.

In some embodiments, determining the reference samples of the sub-template comprises: determining a weighted average of the first set of reference samples and the second set of reference samples, wherein the first set of reference samples are associated with a first weight, and the second set of reference samples are associated with a second weight; and determining the reference sample of the template based on the weighted average.

In some embodiments, the first weight is equal to the second weight.

In some embodiments, the reference samples of the sub-template (RT) are determined according to: $RT(x,y)=(RT_0(x,y)+RT_1(x,y)+1)>>1$, wherein $RT_0$ denotes the first set of reference samples and $RT_1$ denotes the second set of reference samples.

In some embodiments, the reference samples of the sub-template (RT) are determined according to: $RT(x,y)=((2^N-w)*RT_0(x,y)+w*RT_1(x,y)+2^{N-1})>>N$, wherein $RT_0$ denotes the first set of reference samples, $RT_1$ denotes the second set of reference samples, and N is a positive integer.

In some embodiments, at least one of the first weight and the second weight is determined based on a CU-level weight (BCW) index. In some embodiments, w is determined according to at least one of the following rules: if the BCW index is equal to 0, w is set equal to −2; if the BCW index is equal to 1, w is set equal to 3; if the BCW index is equal to 2, w is set equal to 4; if the BCW index is equal to 3, w is set equal to 5; or if the BCW index is equal to 4, w is set equal to 10.

In some embodiments, at least one of the first weight and the second weight is predefined. In some embodiments, at least one of the first weight and the second weight is comprised in the bitstream. In some embodiments, at least one of the first weight and the second weight is determined based on a weight used in weighted prediction.

In some examples, the weights may be determined by the BCW index or derived on-the-fly or pre-defined or by the weights used in weighted prediction.

In some embodiments, the reference samples of the sub-template are derived with a multi-hypothesis prediction method if a corresponding merge candidate uses multi-hypothesis prediction.

In some embodiments, determining the target motion candidate list comprises: constructing a first motion candidate list for the current block; determining a reordering scheme; and determining the target motion candidate list based on the reordering scheme and the reference samples.

In some embodiments, determining the reordering scheme comprises: determining a reordering scheme to indicate that the first motion candidate list or at least one motion candidate in the first motion candidate list is to be reordered, in accordance with a determination that the at least one motion candidate belongs to at least one of the following categories: a category of adjacent spatial motion candidates, a category of temporal motion candidates, a category of spatial temporal motion vector prediction (STMVP) motion candidates, a category of non-adjacent spatial motion candidates, a category of history-based motion vector prediction (HMVP) motion candidates, or a category of pair-wise average motion candidates.

In some embodiments, determining a reordering scheme comprises: determining a reordering scheme to indicate that at least one motion candidate in the first motion candidate list is not to be reordered in accordance with a determination that the at least one motion candidate belongs to at least one of the following categories: a category of uni-prediction subblock based motion candidates, a category of subblock-based temporal motion vector prediction (SbTMVP) motion candidates, a category of inherited affine motion candidates, a category of constructed affine motion candidates, or a category of zero padding affine motion candidates.

In one example, only adjacent spatial and temporal motion candidates can be reordered. In one example, only adjacent spatial, STMVP, and temporal motion candidates can be reordered. In one example, only adjacent spatial, STMVP, temporal and non-adjacent spatial motion candidates can be reordered. In one example, only adjacent spatial, STMVP, temporal, non-adjacent spatial and HMVP motion candidates can be reordered. In one example, only adjacent spatial, STMVP, temporal, non-adjacent spatial, HMVP and pair-wise average motion candidates can be reordered. In one example, only adjacent spatial, temporal, HMVP and pair-wise average motion candidates can be reordered. In one example, only adjacent spatial, temporal, and HMVP motion candidates can be reordered. In one example, only adjacent spatial motion candidates can be reordered. In one example, the uni-prediction subblock based motion candidates are not reordered. In one example, the SbTMVP candidate is not reordered. In one example, the inherited affine motion candidates are not reordered. In one example, the constructed affine motion candidates are not reordered. In one example, the zero padding affine motion candidates are not reordered.

In some embodiments, determining a reordering scheme comprises: determining the reordering scheme to indicate that a number of motion candidates from a beginning of the first motion candidate list are to be reordered.

In one example, only the first N motion candidates can be reordered. In one example, N is set equal to 5.

In some embodiments, the first motion candidate list is divided into at least one subgroup of motion candidates, and wherein determining a reordering scheme comprises: determining the reordering scheme based on the at least one subgroup of motion candidates.

In some embodiments, the reordering scheme indicates at least one of the following: only the first subgroup of motion candidates is to be reordered, a last subgroup of motion candidates is not to be reordered, the last subgroup of motion candidates is to be reordered if the last subgroup is also the first group, different subgroups are to be reordered separately, two motion candidates in different subgroups are not to be reordered together, or a first motion candidate in a first subgroup is to be put ahead of a second motion candidate in a second subgroup after reordering if the first subgroup is ahead of the second subgroup.

In some embodiments, determining the first motion candidate list comprises: in accordance with a determination that the reordering scheme indicates that at least one first motion candidate in the first motion candidate list is not to be reordered, determining an order of the first at least one motion candidate within the target motion candidate list according to an original order of the at least one first motion candidate within the first motion candidate list.

In one example, the motion candidates may be divided into subgroups. Whether to and/or how to reorder the motion candidates may depend on the subgroup of the motion candidates. In one example, only the first subgroup can be reordered. In one example, the last subgroup can not be reordered. In one example, the last subgroup can not be reordered. But if the last subgroup also is the first subgroup, it can be reordered. Different subgroups may be reordered separately. In one example, two candidates in different subgroups cannot be compared and/or reordered. In one example, a first candidate in a first subgroup must be put ahead of a second candidate in a second subgroup after reordering if the first subgroup is ahead of a second subgroup.

In some embodiments, determining the first motion candidate list comprises: in accordance with a determination that the reordering scheme indicates that at least one first motion candidate in the first motion candidate list is not to be reordered and at least one second motion candidate in the first motion candidate list is to be reordered, arranging, within the target motion candidate list, the at least one first motion candidate to be ahead of the at least one second motion candidate to be reordered, or arranging, within the target motion candidate list, the at least one first motion candidate to follow the at least one second motion candidate to be reordered.

In one example, the motion candidates which are not included in the reordering process may be treated in specified way. In one example, for the candidates not to be reordered, they will be arranged in the merge candidate list according to the initial order. In one example, candidates not to be reordered may be put behind the candidates to be reordered. In one example, candidates not to be reordered may be put before the candidates to be reordered.

In some embodiments, the bitstream comprises a signal indicating the reordering scheme applied on the first motion candidate list. In one example, Whether to apply the adaptive merge candidate list reordering may depend on a message signaled in VPS/SPS/PPS/sequence header/picture header/slice header/CTU/CU/TU/PU. It may also be a region based on signaling. For example, the picture is partitioned into groups of CTU/CUs evenly or unevenly, and one flag is coded for each group to indicate whether merge candidate list reordering is applied or not.

In some embodiments, the sub-template comprises samples of at least one color component. In some embodiments, the sub-template only comprises samples of the luma component. In some embodiments, the sub-template comprises samples of the at least one of: a Cb component, a Cr component, a R component, a G component, or a B component.

In some embodiments, the conversion comprises decoding the current block from the bitstream. In some embodiments, wherein the conversion comprises encoding the current block into the bitstream.

Figure 43:
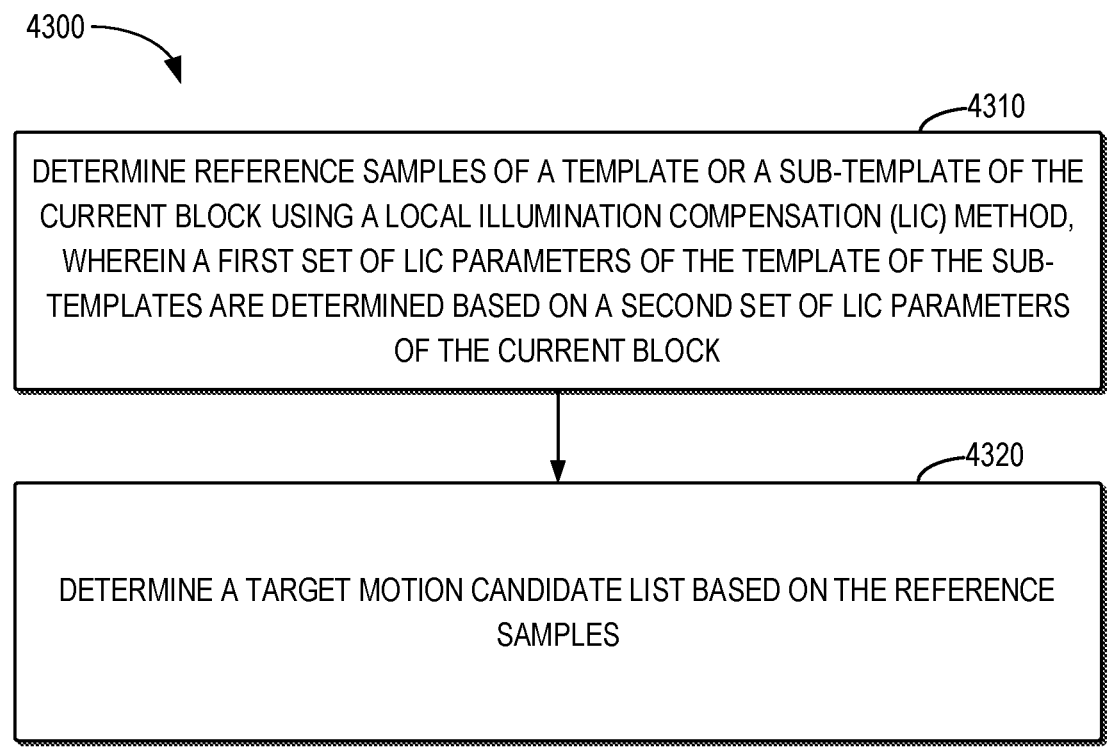
FIG. 43 illustrates a flowchart of another method for video processing in accordance with some embodiments of the present disclosure.

FIG. 43 illustrates a flowchart of another method 4300 for video processing in accordance with some embodiments of the present disclosure. The method 4300 comprises: determining 4310, during a conversion between a current block of a video and a bitstream of the video, reference samples of a template or a sub-template of the current block using a Local illumination compensation (LIC) method, wherein a first set of LIC parameters of the template of the sub-templates are determined based on a second set of LIC parameters of the current block; and determining 4320 a target motion candidate list based on the reference samples. In this way, the proposed method can advantageously improve the coding efficiency.

In some embodiments, the first set of LIC parameters for both left and above templates or sub-templates are the same as the second set of LIC parameters of the current block.

In some embodiments, the first set of LIC parameters for a left template or sub-template are derived as the second set of LIC parameters of the current block. In one example, the LIC parameters for left template are derived as the LIC parameters of current block which uses its original motion vector plus a motion vector offset of (−Wt,0) as the motion vector of current block.

In some embodiments, the first set of LIC parameters for a above template or sub-template are derived as the second set of LIC parameters of the current block. In one example, the LIC parameters for above template are derived as the LIC parameters of current block which uses its original motion vector plus a motion vector offset of (0, −Ht) as the motion vector of current block.

In some embodiments, the LIC method is applied when a LIC flag of a corresponding candidate is true. For example, the above bullets may be applied if the Local Illumination Compensation (LIC) flag of a merge candidate is true.

In some embodiments, the reference samples of the template or sub-template are derived with a multi-hypothesis prediction method if a corresponding merge candidate uses multi-hypothesis prediction.

In some embodiments, determining the target motion candidate list comprises: constructing a first motion candidate list for the current block; determining a reordering scheme; and determining the target motion candidate list based on the reordering scheme and the reference samples.

In some embodiments, determining the reordering scheme comprises: determining a reordering scheme to indicate that the first motion candidate list or at least one motion candidate in the first motion candidate list is to be reordered, in accordance with a determination that the at least one motion candidate belongs to at least one of the following categories: a category of adjacent spatial motion candidates, a category of temporal motion candidates, a category of spatial temporal motion vector prediction (STMVP) motion candidates, a category of non-adjacent spatial motion candidates, a category of history-based motion vector prediction (HMVP) motion candidates, or a category of pair-wise average motion candidates.

In some embodiments, determining a reordering scheme comprises: determining a reordering scheme to indicate that at least one motion candidate in the first motion candidate list is not to be reordered in accordance with a determination that the at least one motion candidate belongs to at least one of the following categories: a category of uni-prediction subblock based motion candidates, a category of subblock-based temporal motion vector prediction (SbTMVP) motion candidates, a category of inherited affine motion candidates, a category of constructed affine motion candidates, or a category of zero padding affine motion candidates.

In some embodiments, determining a reordering scheme comprises: determining the reordering scheme to indicate that a number of motion candidates from a beginning of the first motion candidate list are to be reordered.

In some embodiments, the first motion candidate list is divided into at least one subgroup of motion candidates, and wherein determining a reordering scheme comprises: determining the reordering scheme based on the at least one subgroup of motion candidates.

In some embodiments, the reordering scheme indicates at least one of the following: only the first subgroup of motion candidates is to be reordered, a last subgroup of motion candidates is not to be reordered, the last subgroup of motion candidates is to be reordered if the last subgroup is also the first group, different subgroups are to be reordered separately, two motion candidates in different subgroups are not to be reordered together, or a first motion candidate in a first subgroup is to be put ahead of a second motion candidate in a second subgroup after reordering if the first subgroup is ahead of the second subgroup.

In some embodiments, determining the first motion candidate list comprises: in accordance with a determination that the reordering scheme indicates that at least one first motion candidate in the first motion candidate list is not to be reordered, determining an order of the first at least one motion candidate within the target motion candidate list according to an original order of the at least one first motion candidate within the first motion candidate list.

In some embodiments, determining the first motion candidate list comprises: in accordance with a determination that the reordering scheme indicates that at least one first motion candidate in the first motion candidate list is not to be reordered and at least one second motion candidate in the first motion candidate list is to be reordered, arranging, within the target motion candidate list, the at least one first motion candidate to be ahead of the at least one second motion candidate to be reordered, or arranging, within the target motion candidate list, the at least one first motion candidate to follow the at least one second motion candidate to be reordered.

In some embodiments, the bitstream comprises a signal indicating the reordering scheme applied on the first motion candidate list.

In some embodiments, the template or sub-template comprises samples of at least one color component.

In some embodiments, the template or sub-template only comprises samples of the luma component.

In some embodiments, the template or sub-template comprises samples of the at least one of: a Cb component, a Cr component, a R component, a G component, or a B component.

In some embodiments, the conversion comprises decoding the current block from the bitstream.

In some embodiments, the conversion comprises encoding the current block into the bitstream.

Figure 44:
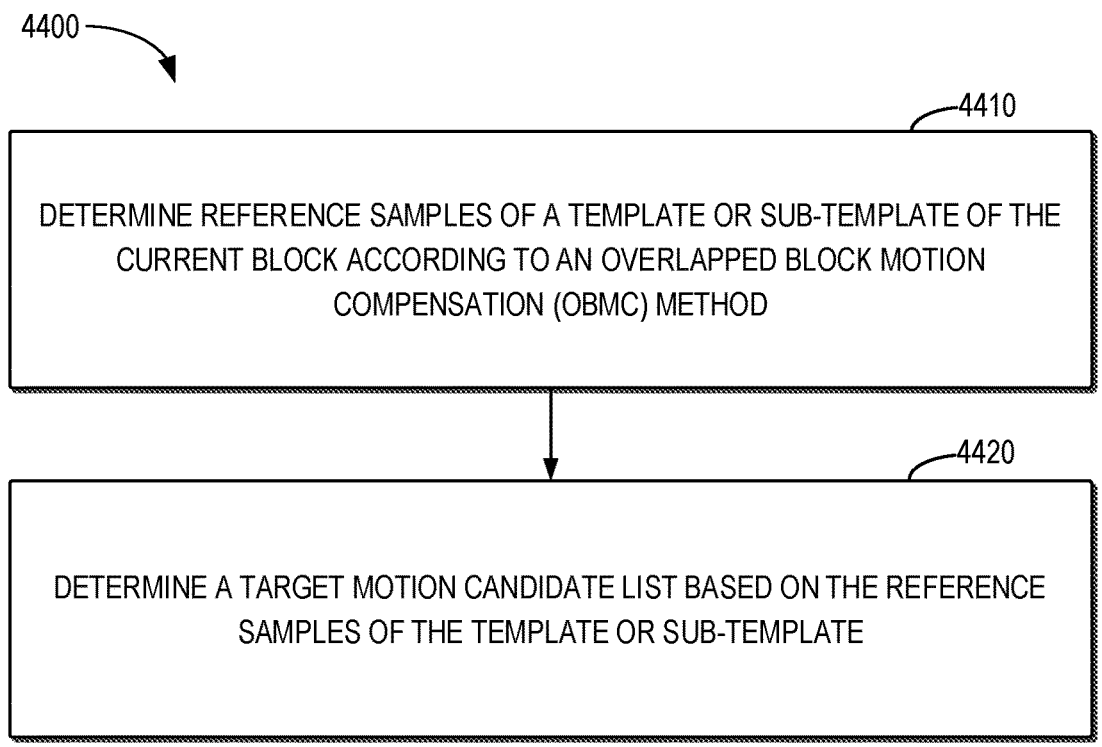
FIG. 44 illustrates a flowchart of a further method for video processing in accordance with some embodiments of the present disclosure.

FIG. 44 illustrates a flowchart of a method 4400 for video processing in accordance with some embodiments of the present disclosure. The method 4400 comprises: determining 4410, during a conversion between a current block of a video and a bitstream of the video, reference samples of a template or sub-template of the current block according to an Overlapped Block Motion Compensation (OBMC) method; and determining 4420 a target motion candidate list based on the reference samples of the template or sub-template. In this way, the proposed method can advantageously improve the coding efficiency.

In some embodiments, determining the reference samples of the template or sub-template of the current block comprises: determining the reference samples of a above template or sub-template based on motion information of a first set of subblocks in a first row of the current block and a second set of above adjacent neighboring subblocks of the first set of subblocks. In one example, to derive the reference samples of the above template, the motion information of the subblocks in the first row of current block and their above adjacent neighboring subblocks are used.

In some embodiments, determining the reference samples of the template or sub-template of the current block comprises: determining the reference samples of a left template or sub-template based on motion information of a third set of subblocks in a first column of the current block and a fourth set of left adjacent neighboring subblocks of the third set of subblocks. In one example, to derive the reference samples of the left template, the motion information of the subblocks in the first column of current block and their left adjacent neighboring subblocks are used.

In some embodiments, wherein a size of a subblock is 4×4.

In some embodiments, determining the reference samples of the sub-template of the current block comprises: determining the reference samples based on a first set of reference samples $P_N$ and a second set of reference samples $P_C$ of the sub-template, wherein the first set of reference samples $P_N$ are determined based on motion vectors of a neighbouring subblock, and the second set of reference samples $P_C$ are determined based on motion vectors of a subblock of current block.

In some embodiments, the first set of reference samples $P_N$ are generated based on motion vectors of vertically neighbouring sub-block, and the samples in the same row of $P_N$ are added to $P_C$ with a same weighting factor.

In some embodiments, if a height of the above template is larger than or equal to 4: a weighting factor $\frac{1}{4}$ is applied to a first row of $P_N$, a weighting factor $\frac{1}{8}$ is applied to a second row of $P_N$, a weighting factor $\frac{1}{16}$ is applied to a third row of $P_N$, and a weighting factor $\frac{1}{32}$ is applied to a fourth row of $P_N$; and/or a weighting factor $\frac{3}{4}$ is applied to a first row of $P_C$, a weighting factor $\frac{7}{8}$ is applied to a second row of $P_C$, a weighting factor $\frac{15}{16}$ is applied to a third row of $P_C$, and a weighting factor $\frac{31}{32}$ is applied to a fourth row of $P_C$.

In some embodiments, if a height of a above template is larger than or equal to 2: a weighting factor $\frac{1}{4}$ is applied to a first row of $P_N$, a weighting factor $\frac{1}{8}$ is applied to a second row of $P_N$; and/or a weighting factor $\frac{3}{4}$ is applied to a first row of $P_C$, a weighting factor $\frac{7}{8}$ is applied to a second row of $P_C$.

In some embodiments, if a height of a above template is larger than or equal to 1: a weighting factor $\frac{1}{4}$ is applied to a first row of $P_N$; and/or a weighting factor $\frac{3}{4}$ is applied to a first row of $P_C$.

In some embodiments, the first set of reference samples $P_N$ are generated based on motion vectors of horizontally neighbouring sub-block, and the samples in the same column of $P_N$ are added to $P_C$ with a same weighting factor.

In some embodiments, if a width of the left template is larger than or equal to 4: a weighting factor $\frac{1}{4}$ is applied to a first column of $P_N$, a weighting factor $\frac{1}{8}$ is applied to a second column of $P_N$, a weighting factor $\frac{1}{16}$ is applied to a third column of $P_N$, and a weighting factor $\frac{1}{32}$ is applied to a fourth column of $P_N$; and/or a weighting factor $\frac{3}{4}$ is applied to a first column of $P_C$, a weighting factor $\frac{7}{8}$ is applied to a second column of $P_C$, a weighting factor $\frac{15}{16}$ is applied to a third column of $P_C$, and a weighting factor $\frac{31}{32}$ is applied to a fourth column of $P_C$.

In some embodiments, if a width of the left template is larger than or equal to 2: a weighting factor $\frac{1}{4}$ is applied to a first column of $P_N$, a weighting factor $\frac{1}{8}$ is applied to a second column of $P_N$; and/or a weighting factor $\frac{3}{4}$ is applied to a first column of $P_C$, a weighting factor $\frac{7}{8}$ is applied to a second column of $P_C$.

In some embodiments, if a width of the left template is larger than or equal to 1: a weighting factor $\frac{1}{4}$ is applied to a first column of $P_N$; and/or a weighting factor $\frac{3}{4}$ is applied to a first column of $P_C$.

In some embodiments, the reference samples of the sub-template (P) are determined according to: $P=W_N*P_N+W_C*P_C$, wherein $W_N$ and $W_C$ are weighting factors.

In one example, the weighting factors $\{\frac{1}{4}, \frac{1}{8}, \frac{1}{16}, \frac{1}{32}\}$ are used for the {first, second, third, fourth} row (column) of $P_N$ and the weighting factors $\{\frac{3}{4}, \frac{7}{8}, \frac{15}{16}, \frac{31}{32}\}$ are used for the {first, second, third, fourth} row (column) of $P_C$ if the height of the above template or the width of the left template is larger than or equal to 4.

In one example, the weighting factors $\{\frac{1}{4}, \frac{1}{8}\}$ are used for the {first, second} row (column) of $P_N$ and the weighting factors $\{\frac{3}{4}, \frac{7}{8}\}$ are used for the {first, second} row (column)

of $P_C$ if the height of the above template or the width of the left template is larger than or equal to 2.

In one example, the weighting factor {¼} is used for the first row (column) of $P_N$ and the weighting factor {¾} is used for the first row (column) of $P_C$ if the height of the above template or the width of the left template is larger than or equal to 1.

In some embodiments, the OBMC method is enabled if a corresponding merge candidate is assigned with OBMC enabled. For example, the above bullets may be applied if a merge candidate is assigned with OBMC enabled.

In some embodiments, the reference samples of the template or sub-template are derived with a multi-hypothesis prediction method if a corresponding merge candidate uses multi-hypothesis prediction.

In some embodiments, determining the target motion candidate list comprises: constructing a first motion candidate list for the current block; determining a reordering scheme; and determining the target motion candidate list based on the reordering scheme and the reference samples.

In some embodiments, determining the reordering scheme comprises: determining a reordering scheme to indicate that the first motion candidate list or at least one motion candidate in the first motion candidate list is to be reordered, in accordance with a determination that the at least one motion candidate belongs to at least one of the following categories: a category of adjacent spatial motion candidates, a category of temporal motion candidates, a category of spatial temporal motion vector prediction (STMVP) motion candidates, a category of non-adjacent spatial motion candidates, a category of history-based motion vector prediction (HMVP) motion candidates, or a category of pair-wise average motion candidates.

In some embodiments, determining a reordering scheme comprises: determining a reordering scheme to indicate that at least one motion candidate in the first motion candidate list is not to be reordered in accordance with a determination that the at least one motion candidate belongs to at least one of the following categories: a category of uni-prediction subblock based motion candidates, a category of subblock-based temporal motion vector prediction (SbTMVP) motion candidates, a category of inherited affine motion candidates, a category of constructed affine motion candidates, or a category of zero padding affine motion candidates.

In some embodiments, determining a reordering scheme comprises: determining the reordering scheme to indicate that a number of motion candidates from a beginning of the first motion candidate list are to be reordered.

In some embodiments, the first motion candidate list is divided into at least one subgroup of motion candidates, and wherein determining a reordering scheme comprises: determining the reordering scheme based on the at least one subgroup of motion candidates.

In some embodiments, the reordering scheme indicates at least one of the following: only the first subgroup of motion candidates is to be reordered, a last subgroup of motion candidates is not to be reordered, the last subgroup of motion candidates is to be reordered if the last subgroup is also the first group, different subgroups are to be reordered separately, two motion candidates in different subgroups are not to be reordered together, or a first motion candidate in a first subgroup is to be put ahead of a second motion candidate in a second subgroup after reordering if the first subgroup is ahead of the second subgroup.

In some embodiments, determining the first motion candidate list comprises: in accordance with a determination that the reordering scheme indicates that at least one first motion candidate in the first motion candidate list is not to be reordered, determining an order of the first at least one motion candidate within the target motion candidate list according to an original order of the at least one first motion candidate within the first motion candidate list.

In some embodiments, determining the first motion candidate list comprises: in accordance with a determination that the reordering scheme indicates that at least one first motion candidate in the first motion candidate list is not to be reordered and at least one second motion candidate in the first motion candidate list is to be reordered, arranging, within the target motion candidate list, the at least one first motion candidate to be ahead of the at least one second motion candidate to be reordered, or arranging, within the target motion candidate list, the at least one first motion candidate to follow the at least one second motion candidate to be reordered.

In some embodiments, the bitstream comprises a signal indicating the reordering scheme applied on the first motion candidate list.

In some embodiments, the template or sub-template comprises samples of at least one color component.

In some embodiments, the template or sub-template only comprises samples of the luma component.

In some embodiments, the template or sub-template comprises samples of the at least one of: a Cb component, a Cr component, a R component, a G component, or a B component.

In some embodiments, the conversion comprises decoding the current block from the bitstream.

In some embodiments, the conversion comprises encoding the current block into the bitstream.

Implementations of the present disclosure can be described in view of the following clauses, the features of which can be combined in any reasonable manner.

Clause 1. A method for video processing, comprising:
  determining, during a conversion between a current block of a video and a bitstream, reference samples of a sub-template of the current block based on a first set of reference samples of the sub-template in a first reference list and a second set of reference samples of the sub-template in a second reference list; and
  determining a target motion candidate list based on the reference samples of the sub-template.

Clause 2. The method of Clause 1, wherein determining the reference samples of the sub-template comprises:
  determining a weighted average of the first set of reference samples and the second set of reference samples, wherein the first set of reference samples are associated with a first weight, and the second set of reference samples are associated with a second weight; and
  determining the reference sample of the template based on the weighted average.

Clause 3. The method of Clause 2, wherein the first weight is equal to the second weight.

Clause 4. The method of Clause 3, wherein the reference samples of the sub-template (RT) are determined according to:

$$RT(x,y)=(RT_0(x,y)+RT_1(x,y)+1)>>1$$

wherein $RT_0$ denotes the first set of reference samples and $RT_1$ denotes the second set of reference samples.

Clause 5. The method of Clause 2, wherein the reference samples of the sub-template (RT) are determined according to:

$$RT(x,y)=((2^N-w)*RT_0(x,y)+w*RT_1(x,y)+2^{N-1})>>N$$

wherein $RT_0$ denotes the first set of reference samples, $RT_1$ denotes the second set of reference samples, and N is a positive integer.

Clause 6. The method of Clause 5, wherein w is determined according to at least one of the following rules:
if a CU-level weight (BCW) index is equal to 0, w is set equal to −2;
if the BCW index is equal to 1, w is set equal to 3;
if the BCW index is equal to 2, w is set equal to 4;
if the BCW index is equal to 3, w is set equal to 5; or
if the BCW index is equal to 4, w is set equal to 10.

Clause 7. The method of Clause 2, wherein at least one of the first weight and the second weight is determined based on a BCW index.

Clause 8. The method of Clause 2, wherein at least one of the first weight and the second weight is predefined.

Clause 9. The method of Clause 2, wherein at least one of the first weight and the second weight is comprised in the bitstream.

Clause 10. The method of Clause 2, wherein at least one of the first weight and the second weight is determined based on a weight used in weighted prediction.

Clause 11. The method of Clause 1, wherein the reference samples of the sub-template are derived with a multi-hypothesis prediction method if a corresponding merge candidate uses multi-hypothesis prediction.

Clause 12. The method of Clause 1, wherein determining the target motion candidate list comprises:
constructing a first motion candidate list for the current block;
determining a reordering scheme; and
determining the target motion candidate list based on the reordering scheme and the reference samples.

Clause 13. The method of Clause 12, wherein determining the reordering scheme comprises:
determining a reordering scheme to indicate that the first motion candidate list or at least one motion candidate in the first motion candidate list is to be reordered, in accordance with a determination that the at least one motion candidate belongs to at least one of the following categories:
a category of adjacent spatial motion candidates,
a category of temporal motion candidates,
a category of spatial temporal motion vector prediction (STMVP) motion candidates,
a category of non-adjacent spatial motion candidates,
a category of history-based motion vector prediction (HMVP) motion candidates, or
a category of pair-wise average motion candidates.

Clause 14. The method of Clause 12, wherein determining a reordering scheme comprises:
determining a reordering scheme to indicate that at least one motion candidate in the first motion candidate list is not to be reordered in accordance with a determination that the at least one motion candidate belongs to at least one of the following categories:
a category of uni-prediction subblock based motion candidates,
a category of subblock-based temporal motion vector prediction (SbTMVP) motion candidates,
a category of inherited affine motion candidates,
a category of constructed affine motion candidates, or
a category of zero padding affine motion candidates.

Clause 15. The method of Clause 12, wherein determining a reordering scheme comprises:
determining the reordering scheme to indicate that a number of motion candidates from a beginning of the first motion candidate list are to be reordered.

Clause 16. The method of Clause 1, wherein the first motion candidate list is divided into at least one subgroup of motion candidates, and wherein determining a reordering scheme comprises:
determining the reordering scheme based on the at least one subgroup of motion candidates.

Clause 17. The method of Clause 16, wherein the reordering scheme indicates at least one of the following:
only the first subgroup of motion candidates is to be reordered,
a last subgroup of motion candidates is not to be reordered,
the last subgroup of motion candidates is to be reordered if the last subgroup is also the first group,
different subgroups are to be reordered separately,
two motion candidates in different subgroups are not to be reordered together, or
a first motion candidate in a first subgroup is to be put ahead of a second motion candidate in a second subgroup after reordering if the first subgroup is ahead of the second subgroup.

Clause 18. The method of Clause 1, wherein determining the first motion candidate list comprises:
in accordance with a determination that the reordering scheme indicates that at least one first motion candidate in the first motion candidate list is not to be reordered,
determining an order of the first at least one motion candidate within the target motion candidate list according to an original order of the at least one first motion candidate within the first motion candidate list.

Clause 19. The method of Clause 1, wherein determining the first motion candidate list comprises:
in accordance with a determination that the reordering scheme indicates that at least one first motion candidate in the first motion candidate list is not to be reordered and at least one second motion candidate in the first motion candidate list is to be reordered,
arranging, within the target motion candidate list, the at least one first motion candidate to be ahead of the at least one second motion candidate to be reordered, or
arranging, within the target motion candidate list, the at least one first motion candidate to follow the at least one second motion candidate to be reordered.

Clause 20. The method of Clause 1, wherein the bitstream comprises a signal indicating the reordering scheme applied on the first motion candidate list.

Clause 21. The method of Clause 1, wherein the sub-template comprises samples of at least one color component.

Clause 22. The method of Clause 21, wherein the sub-template only comprises samples of the luma component.

Clause 23. The method of Clause 21, wherein the sub-template comprises samples of the at least one of:
a Cb component, a Cr component, a R component, a G component or a B component.

Clause 24. The method of any of Clauses 1-23, wherein the conversion comprises decoding the current block from the bitstream.

Clause 25. The method of any of Clauses 1-23, wherein the conversion comprises encoding the current block into the bitstream.

Clause 26. A method for video processing, comprising:
determining, during a conversion between a current block of a video and a bitstream, reference samples of a template or a sub-template of the current block using a Local illumination compensation (LIC) method, wherein a first set of LIC parameters of the template of the sub-templates are determined based on a second set of LIC parameters of the current block; and determining a target motion candidate list based on the reference samples.

Clause 27. The method of Clause 26, wherein the first set of LIC parameters for both left and above templates or sub-templates are the same as the second set of LIC parameters of the current block.

Clause 28. The method of Clause 26, wherein the first set of LIC parameters for a left template or sub-template are derived as the second set of LIC parameters of the current block.

Clause 29. The method of Clause 26, wherein the first set of LIC parameters for a above template or sub-template are derived as the second set of LIC parameters of the current block.

Clause 30. The method of Clause 26, wherein the LIC method is applied when a LIC flag of a corresponding candidate is true.

Clause 31. The method of Clause 26, wherein the reference samples of the template or sub-template are derived with a multi-hypothesis prediction method if a corresponding merge candidate uses multi-hypothesis prediction.

Clause 32. The method of Clause 26, wherein determining the target motion candidate list comprises:

constructing a first motion candidate list for the current block;

determining a reordering scheme; and determining the target motion candidate list based on the reordering scheme and the reference samples.

Clause 33. The method of Clause 26, wherein determining the reordering scheme comprises:

determining a reordering scheme to indicate that the first motion candidate list or at least one motion candidate in the first motion candidate list is to be reordered, in accordance with a determination that the at least one motion candidate belongs to at least one of the following categories:

a category of adjacent spatial motion candidates, a category of temporal motion candidates, a category of spatial temporal motion vector prediction (STMVP) motion candidates, a category of non-adjacent spatial motion candidates, a category of history-based motion vector prediction (HMVP) motion candidates, or a category of pair-wise average motion candidates.

Clause 34. The method of Clause 26, wherein determining a reordering scheme comprises:

determining a reordering scheme to indicate that at least one motion candidate in the first motion candidate list is not to be reordered in accordance with a determination that the at least one motion candidate belongs to at least one of the following categories:

a category of uni-prediction subblock based motion candidates, a category of subblock-based temporal motion vector prediction (SbTMVP) motion candidates, a category of inherited affine motion candidates, a category of constructed affine motion candidates, or a category of zero padding affine motion candidates.

Clause 35. The method of Clause 26, wherein determining a reordering scheme comprises:

determining the reordering scheme to indicate that a number of motion candidates from a beginning of the first motion candidate list are to be reordered.

Clause 36. The method of Clause 26, wherein the first motion candidate list is divided into at least one subgroup of motion candidates, and wherein determining a reordering scheme comprises:

determining the reordering scheme based on the at least one subgroup of motion candidates.

Clause 37. The method of Clause 36, wherein the reordering scheme indicates at least one of the following:

only the first subgroup of motion candidates is to be reordered, a last subgroup of motion candidates is not to be reordered, the last subgroup of motion candidates is to be reordered if the last subgroup is also the first group, different subgroups are to be reordered separately, two motion candidates in different subgroups are not to be reordered together, or a first motion candidate in a first subgroup is to be put ahead of a second motion candidate in a second subgroup after reordering if the first subgroup is ahead of the second subgroup.

Clause 38. The method of Clause 26, wherein determining the first motion candidate list comprises:

in accordance with a determination that the reordering scheme indicates that at least one first motion candidate in the first motion candidate list is not to be reordered, determining an order of the first at least one motion candidate within the target motion candidate list according to an original order of the at least one first motion candidate within the first motion candidate list.

Clause 39. The method of Clause 26, wherein determining the first motion candidate list comprises:

in accordance with a determination that the reordering scheme indicates that at least one first motion candidate in the first motion candidate list is not to be reordered and at least one second motion candidate in the first motion candidate list is to be reordered, arranging, within the target motion candidate list, the at least one first motion candidate to be ahead of the at least one second motion candidate to be reordered, or arranging, within the target motion candidate list, the at least one first motion candidate to follow the at least one second motion candidate to be reordered.

Clause 40. The method of Clause 26, wherein the bitstream comprises a signal indicating the reordering scheme applied on the first motion candidate list.

Clause 41. The method of Clause 26, wherein the template or sub-template comprises samples of at least one color component.

Clause 42. The method of Clause 41, wherein the template or sub-template only comprises samples of the luma component.

Clause 43. The method of Clause 41, wherein the template or sub-template comprises samples of the at least one of:

a Cb component, a Cr component, a R component, a G component, or a B component.

Clause 44. The method of any of Clauses 26-43, wherein the conversion comprises decoding the current block from the bitstream.

Clause 45. The method of any of Clauses 26-43, wherein the conversion comprises encoding the current block into the bitstream.

Clause 46. A method for video processing, comprising:
determining, during a conversion between a current block of a video and a bitstream, reference samples of a template or sub-template of the current block according to an Overlapped Block Motion Compensation (OBMC) method; and
determining a target motion candidate list based on the reference samples of the template or sub-template.

Clause 47. The method of Clause 46, wherein determining the reference samples of the template or sub-template of the current block comprises:
determining the reference samples of a above template or sub-template based on motion information of a first set of subblocks in a first row of the current block and a second set of above adjacent neighboring subblocks of the first set of subblocks.

Clause 48. The method of Clause 46, wherein determining the reference samples of the template or sub-template of the current block comprises:
determining the reference samples of a left template or sub-template based on motion information of a third set of subblocks in a first column of the current block and a fourth set of left adjacent neighboring subblocks of the third set of subblocks.

Clause 49. The method of Clause 47 or 48, wherein a size of a subblock is 4×4.

Clause 50. The method of Clause 46, wherein determining the reference samples of the sub-template of the current block comprises:
determining the reference samples based on a first set of reference samples $P_N$ and a second set of reference samples $P_C$ of the sub-template, wherein the first set of reference samples $P_N$ are determined based on motion vectors of a neighbouring subblock, and the second set of reference samples $P_C$ are determined based on motion vectors of a subblock of current block.

Clause 51. The method of Clause 50, wherein the first set of reference samples $P_N$ are generated based on motion vectors of vertically neighbouring sub-block, and the samples in the same row of $P_N$ are added to $P_C$ with a same weighting factor.

Clause 52. The method of Clause 51, wherein if a height of the above template is larger than or equal to 4:
a weighting factor ¼ is applied to a first row of $P_N$, a weighting factor ⅛ is applied to a second row of $P_N$, a weighting factor 1/16 is applied to a third row of $P_N$, and a weighting factor 1/32 is applied to a fourth row of $P_N$; and/or
a weighting factor ¾ is applied to a first row of $P_C$, a weighting factor ⅞ is applied to a second row of $P_C$, a weighting factor 15/16 is applied to a third row of $P_C$, and a weighting factor 31/32 is applied to a fourth row of $P_C$.

Clause 53. The method of Clause 51, wherein if a height of a above template is larger than or equal to 2:
a weighting factor ¼ is applied to a first row of $P_N$, a weighting factor ⅛ is applied to a second row of $P_N$; and/or
a weighting factor ¾ is applied to a first row of $P_C$, a weighting factor ⅞ is applied to a second row of $P_C$.

Clause 54. The method of Clause 51, wherein if a height of a above template is larger than or equal to 1:
a weighting factor ¼ is applied to a first row of $P_N$; and/or
a weighting factor ¾ is applied to a first row of $P_C$.

Clause 55. The method of Clause 50, wherein the first set of reference samples $P_N$ are generated based on motion vectors of horizontally neighbouring sub-block, and the samples in the same column of $P_N$ are added to $P_C$ with a same weighting factor.

Clause 56. The method of Clause 55, wherein if a width of the left template is larger than or equal to 4:
a weighting factor ¼ is applied to a first column of $P_N$, a weighting factor ⅛ is applied to a second column of $P_N$, a weighting factor 1/16 is applied to a third column of $P_N$, and a weighting factor 1/32 is applied to a fourth column of $P_N$; and/or
a weighting factor ¾ is applied to a first column of $P_C$, a weighting factor ⅞ is applied to a second column of $P_C$, a weighting factor 15/16 is applied to a third column of $P_C$, and a weighting factor 31/32 is applied to a fourth column of $P_C$.

Clause 57. The method of Clause 55, wherein if a width of the left template is larger than or equal to 2:
a weighting factor ¼ is applied to a first column of $P_N$, a weighting factor ⅛ is applied to a second column of $P_N$; and/or
a weighting factor ¾ is applied to a first column of $P_C$, a weighting factor ⅞ is applied to a second column of $P_C$.

Clause 58. The method of Clause 55, wherein if a width of the left template is larger than or equal to 1:
a weighting factor ¼ is applied to a first column of $P_N$; and/or
a weighting factor ¾ is applied to a first column of $P_C$.

Clause 59. The method of Clause 51, wherein the reference samples of the sub-template (P) are determined according to:

$$P = W_N * P_N + W_C * P_C$$

wherein $W_N$ and $W_C$ are weighting factors.

Clause 60. The method of Clause 51, wherein the OBMC method is enabled if a corresponding merge candidate is assigned with OBMC enabled.

Clause 61. The method of Clause 46, wherein the reference samples of the template or sub-template are derived with a multi-hypothesis prediction method if a corresponding merge candidate uses multi-hypothesis prediction.

Clause 62. The method of Clause 46, wherein determining the target motion candidate list comprises:
constructing a first motion candidate list for the current block;
determining a reordering scheme; and
determining the target motion candidate list based on the reordering scheme and the reference samples.

Clause 63. The method of Clause 46, wherein determining the reordering scheme comprises:
determining a reordering scheme to indicate that the first motion candidate list or at least one motion candidate in the first motion candidate list is to be reordered, in accordance with a determination that the at least one motion candidate belongs to at least one of the following categories:
a category of adjacent spatial motion candidates,
a category of temporal motion candidates,
a category of spatial temporal motion vector prediction (STMVP) motion candidates,
a category of non-adjacent spatial motion candidates,
a category of history-based motion vector prediction (HMVP) motion candidates, or
a category of pair-wise average motion candidates.

Clause 64. The method of Clause 46, wherein determining a reordering scheme comprises:

determining a reordering scheme to indicate that at least one motion candidate in the first motion candidate list is not to be reordered in accordance with a determination that the at least one motion candidate belongs to at least one of the following categories:
a category of uni-prediction subblock based motion candidates,
a category of subblock-based temporal motion vector prediction (SbTMVP) motion candidates,
a category of inherited affine motion candidates,
a category of constructed affine motion candidates, or
a category of zero padding affine motion candidates.

Clause 65. The method of Clause 46, wherein determining a reordering scheme comprises:
determining the reordering scheme to indicate that a number of motion candidates from a beginning of the first motion candidate list are to be reordered.

Clause 66. The method of Clause 46, wherein the first motion candidate list is divided into at least one subgroup of motion candidates, and wherein determining a reordering scheme comprises:
determining the reordering scheme based on the at least one subgroup of motion candidates.

Clause 67. The method of Clause 66, wherein the reordering scheme indicates at least one of the following:
only the first subgroup of motion candidates is to be reordered,
a last subgroup of motion candidates is not to be reordered,
the last subgroup of motion candidates is to be reordered if the last subgroup is also the first group,
different subgroups are to be reordered separately,
two motion candidates in different subgroups are not to be reordered together, or
a first motion candidate in a first subgroup is to be put ahead of a second motion candidate in a second subgroup after reordering if the first subgroup is ahead of the second subgroup.

Clause 68. The method of Clause 46, wherein determining the first motion candidate list comprises:
in accordance with a determination that the reordering scheme indicates that at least one first motion candidate in the first motion candidate list is not to be reordered, determining an order of the first at least one motion candidate within the target motion candidate list according to an original order of the at least one first motion candidate within the first motion candidate list.

Clause 69. The method of Clause 46, wherein determining the first motion candidate list comprises:
in accordance with a determination that the reordering scheme indicates that at least one first motion candidate in the first motion candidate list is not to be reordered and at least one second motion candidate in the first motion candidate list is to be reordered,
arranging, within the target motion candidate list, the at least one first motion candidate to be ahead of the at least one second motion candidate to be reordered, or
arranging, within the target motion candidate list, the at least one first motion candidate to follow the at least one second motion candidate to be reordered.

Clause 70. The method of Clause 46, wherein the bitstream comprises a signal indicating the reordering scheme applied on the first motion candidate list.

Clause 71. The method of Clause 46, wherein the template or sub-template comprises samples of at least one color component.

Clause 72. The method of Clause 71, wherein the template or sub-template only comprises samples of the luma component.

Clause 73. The method of Clause 71, wherein the template or sub-template comprises samples of the at least one of:
a Cb component, a Cr component, a R component, a G component, or a B component.

Clause 74. The method of any of Clauses 46-73, wherein the conversion comprises decoding the current block from the bitstream.

Clause 75. The method of any of Clauses 46-73, wherein the conversion comprises encoding the current block into the bitstream.

Clause 76. An apparatus for processing video data comprising a processor and a non-transitory memory with instructions thereon, wherein the instructions upon execution by the processor, cause the processor to:
determine, during a conversion between a current block of a video and a bitstream of the video, reference samples of a sub-template of the current block based on a first set of reference samples of the sub-template in a first reference list and a second set of reference samples of the sub-template in a second reference list; and
determine a target motion candidate list based on the reference samples of the sub-template.

Clause 77. A non-transitory computer-readable storage medium storing instructions that cause a processor to:
determining, during a conversion between a current block of a video and a bitstream of the video, reference samples of a sub-template of the current block based on a first set of reference samples of the sub-template in a first reference list and a second set of reference samples of the sub-template in a second reference list; and
determining a target motion candidate list based on the reference samples of the sub-template.

Clause 78. A non-transitory computer-readable recording medium storing a bitstream of a video which is generated by a method performed by a video processing apparatus, wherein the method comprises:
determining, during a conversion between a current block of a video and a bitstream of the video, reference samples of a sub-template of the current block based on a first set of reference samples of the sub-template in a first reference list and a second set of reference samples of the sub-template in a second reference list;
determining a target motion candidate list based on the reference samples of the sub-template; and
generating the bitstream based on the target motion candidate list.

Clause 79. A method for storing bitstream of a video, comprising:
determining, during a conversion between a current block of a video and a bitstream of the video, reference samples of a sub-template of the current block based on a first set of reference samples of the sub-template in a first reference list and a second set of reference samples of the sub-template in a second reference list;
determining a target motion candidate list based on the reference samples of the sub-template;
generating the bitstream based on the target motion candidate list; and storing the bitstream in a non-transitory computer-readable recording medium.

Clause 80. An apparatus for processing video data comprising a processor and a non-transitory memory with instructions thereon, wherein the instructions upon execution by the processor, cause the processor to:

determine, during a conversion between a current block of a video and a bitstream of the video, reference samples of a template or a sub-template of the current block using a Local illumination compensation (LIC) method, wherein a first set of LIC parameters of the template of the sub-templates are determined based on a second set of LIC parameters of the current block; and determine a target motion candidate list based on the reference samples.

Clause 81. A non-transitory computer-readable storage medium storing instructions that cause a processor to:

determine, during a conversion between a current block of a video and a bitstream of the video, reference samples of a template or a sub-template of the current block using a Local illumination compensation (LIC) method, wherein a first set of LIC parameters of the template of the sub-templates are determined based on a second set of LIC parameters of the current block; and determine a target motion candidate list based on the reference samples.

Clause 82. A non-transitory computer-readable recording medium storing a bitstream of a video which is generated by a method performed by a video processing apparatus, wherein the method comprises:

determining, during a conversion between a current block of a video and a bitstream of the video, reference samples of a template or a sub-template of the current block using a Local illumination compensation (LIC) method, wherein a first set of LIC parameters of the template of the sub-templates are determined based on a second set of LIC parameters of the current block;

determining a target motion candidate list based on the reference samples; and generating the bitstream based on the target motion candidate list.

Clause 83. A method for storing bitstream of a video, comprising:

determining, during a conversion between a current block of a video and a bitstream of the video, reference samples of a template or a sub-template of the current block using a Local illumination compensation (LIC) method, wherein a first set of LIC parameters of the template of the sub-templates are determined based on a second set of LIC parameters of the current block;

determining a target motion candidate list based on the reference samples;

generating the bitstream based on the target motion candidate list; and storing the bitstream in a non-transitory computer-readable recording medium.

Clause 84. An apparatus for processing video data comprising a processor and a non-transitory memory with instructions thereon, wherein the instructions upon execution by the processor, cause the processor to:

determine, during a conversion between a current block of a video and a bitstream of the video, reference samples of a template or sub-template of the current block according to an Overlapped Block Motion Compensation (OBMC) method; and determine a target motion candidate list based on the reference samples of the template or sub-template.

Clause 85. A non-transitory computer-readable storage medium storing instructions that cause a processor to:

determine, during a conversion between a current block of a video and a bitstream of the video, reference samples of a template or sub-template of the current block according to an Overlapped Block Motion Compensation (OBMC) method; and determine a target motion candidate list based on the reference samples of the template or sub-template.

Clause 86. A non-transitory computer-readable recording medium storing a bitstream of a video which is generated by a method performed by a video processing apparatus, wherein the method comprises:

determining, during a conversion between a current block of a video and a bitstream of the video, reference samples of a template or sub-template of the current block according to an Overlapped Block Motion Compensation (OBMC) method; and determining a target motion candidate list based on the reference samples of the template or sub-template; and generating the bitstream based on the target motion candidate list.

Clause 87. A method for storing bitstream of a video, comprising:

determining, during a conversion between a current block of a video and a bitstream of the video, reference samples of a template or sub-template of the current block according to an Overlapped Block Motion Compensation (OBMC) method; and determining a target motion candidate list based on the reference samples of the template or sub-template;

generating the bitstream based on the target motion candidate list; and storing the bitstream in a non-transitory computer-readable recording medium.

Example Device

Figure 45:
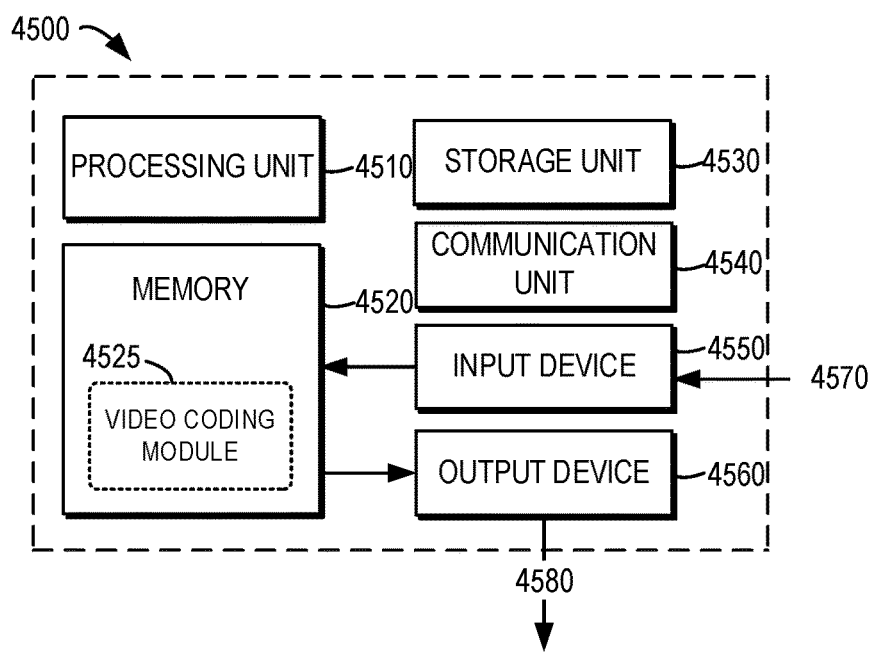
FIG. 45 illustrates a block diagram of a computing device in which various embodiments of the present disclosure can be implemented.

FIG. 45 illustrates a block diagram of a computing device 4500 in which various embodiments of the present disclosure can be implemented. The computing device 4500 may be implemented as or included in the source device 110 (or the video encoder 114 or 200) or the destination device 120 (or the video decoder 124 or 300).

It would be appreciated that the computing device 4500 shown in FIG. 45 is merely for purpose of illustration, without suggesting any limitation to the functions and scopes of the embodiments of the present disclosure in any manner.

As shown in FIG. 45, the computing device 4500 includes a general-purpose computing device 4500. The computing device 4500 may at least comprise one or more processors or processing units 4510, a memory 4520, a storage unit 4530, one or more communication units 4540, one or more input devices 4550, and one or more output devices 4560.

In some embodiments, the computing device 4500 may be implemented as any user terminal or server terminal having the computing capability. The server terminal may be a server, a large-scale computing device or the like that is provided by a service provider. The user terminal may for example be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, television receiver, radio broadcast receiver, E-book device, gaming device, or any combination thereof, including the accessories and peripherals of these devices, or any combination thereof. It would be contemplated that the computing device 4500 can support any type of interface to a user (such as "wearable" circuitry and the like).

The processing unit 4510 may be a physical or virtual processor and can implement various processes based on programs stored in the memory 4520. In a multi-processor system, multiple processing units execute computer executable instructions in parallel so as to improve the parallel processing capability of the computing device 4500. The processing unit 4510 may also be referred to as a central processing unit (CPU), a microprocessor, a controller or a microcontroller.

The computing device 4500 typically includes various computer storage medium. Such medium can be any medium accessible by the computing device 4500, including, but not limited to, volatile and non-volatile medium, or detachable and non-detachable medium. The memory 4520 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage unit 4530 may be any detachable or non-detachable medium and may include a machine-readable medium such as a memory, flash memory drive, magnetic disk or another other media, which can be used for storing information and/or data and can be accessed in the computing device 4500.

The computing device 4500 may further include additional detachable/non-detachable, volatile/non-volatile memory medium. Although not shown in FIG. 45, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 4540 communicates with a further computing device via the communication medium. In addition, the functions of the components in the computing device 4500 can be implemented by a single computing cluster or multiple computing machines that can communicate via communication connections. Therefore, the computing device 4500 can operate in a networked environment using a logical connection with one or more other servers, networked personal computers (PCs) or further general network nodes.

The input device 4550 may be one or more of a variety of input devices, such as a mouse, keyboard, tracking ball, voice-input device, and the like. The output device 4560 may be one or more of a variety of output devices, such as a display, loudspeaker, printer, and the like. By means of the communication unit 4540, the computing device 4500 can further communicate with one or more external devices (not shown) such as the storage devices and display device, with one or more devices enabling the user to interact with the computing device 4500, or any devices (such as a network card, a modem and the like) enabling the computing device 4500 to communicate with one or more other computing devices, if required. Such communication can be performed via input/output (I/O) interfaces (not shown).

In some embodiments, instead of being integrated in a single device, some or all components of the computing device 4500 may also be arranged in cloud computing architecture. In the cloud computing architecture, the components may be provided remotely and work together to implement the functionalities described in the present disclosure. In some embodiments, cloud computing provides computing, software, data access and storage service, which will not require end users to be aware of the physical locations or configurations of the systems or hardware providing these services. In various embodiments, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The computing device 4500 may be used to implement video encoding/decoding in embodiments of the present disclosure. The memory 4520 may include one or more video coding modules 4525 having one or more program instructions. These modules are accessible and executable by the processing unit 4510 to perform the functionalities of the various embodiments described herein.

In the example embodiments of performing video encoding, the input device 4550 may receive video data as an input 4570 to be encoded. The video data may be processed, for example, by the video coding module 4525, to generate an encoded bitstream. The encoded bitstream may be provided via the output device 4560 as an output 4580.

In the example embodiments of performing video decoding, the input device 4550 may receive an encoded bitstream as the input 4570. The encoded bitstream may be processed, for example, by the video coding module 4525, to generate decoded video data. The decoded video data may be provided via the output device 4560 as the output 4580.

While this disclosure has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting.

The invention claimed is:

1. A method for video processing, comprising:
    determining, during a conversion between a current block of a video and a bitstream of the video, reference samples of a sub-template of the current block based on a first set of reference samples of the sub-template in a first reference list and a second set of reference samples of the sub-template in a second reference list, wherein the first reference list is different from the second reference list, wherein the reference samples of the sub-template (RT) are determined according to:

$$RT(x,y)=(RT_0(x,y)+RT_1(x,y)+1)>>1, \text{ or}$$

$$RT(x,y)=((2^N-w)*RT_0(x,y)+w*RT_1(x,y)+2^{N-1})>>N$$

wherein RT, denotes the first set of reference samples and RT, denotes the second set of reference samples;
    determining a target motion candidate list based on the reference samples of the sub-template; and performing the conversion based on the target motion candidate list.

2. The method of claim 1, wherein determining the reference samples of the sub-template comprises:
determining a weighted average of the first set of reference samples and the second set of reference samples, wherein the first set of reference samples are associated with a first weight, and the second set of reference samples are associated with a second weight; and
determining the reference sample of the template based on the weighted average.

3. The method of claim 2, wherein:
at least one of the first weight and the second weight is determined based on a BCW index;
at least one of the first weight and the second weight is predefined;
at least one of the first weight and the second weight is comprised in the bitstream; or
at least one of the first weight and the second weight is determined based on a weight used in weighted prediction.

4. The method of claim 1, wherein w is determined according to at least one of the following rules:
if a CU-level weight (BCW) index is equal to 0, w is set equal to =2;
if the BCW index is equal to 1, w is set equal to 3;
if the BCW index is equal to 2, w is set equal to 4;
if the BCW index is equal to 3, w is set equal to 5; or
if the BCW index is equal to 4, w is set equal to 10.

5. The method of claim 1, wherein the reference samples of the sub-template are derived with a multi-hypothesis prediction method if a corresponding merge candidate uses multi-hypothesis prediction.

6. The method of claim 1, wherein determining the target motion candidate list comprises:
constructing a first motion candidate list for the current block;
determining a reordering scheme; and
determining the target motion candidate list based on the reordering scheme and the reference samples.

7. The method of claim 6, wherein determining the reordering scheme comprises:
determining a reordering scheme to indicate that the first motion candidate list or at least one motion candidate in the first motion candidate list is to be reordered, in accordance with a determination that the at least one motion candidate belongs to at least one of the following categories:
a category of adjacent spatial motion candidates,
a category of temporal motion candidates,
a category of spatial temporal motion vector prediction (STMVP) motion candidates,
a category of non-adjacent spatial motion candidates,
a category of history-based motion vector prediction (HMVP) motion candidates, or
a category of pair-wise average motion candidates.

8. The method of claim 6, wherein determining a reordering scheme comprises:
determining a reordering scheme to indicate that at least one zero motion candidate is not to be reordered; or
determining a reordering scheme to indicate that at least one motion candidate in the first motion candidate list is not to be reordered in accordance with a determination that the at least one motion candidate belongs to at least one of the following categories:
a category of uni-prediction subblock based motion candidates,
a category of subblock-based temporal motion vector prediction (SbTMVP) motion candidates,
a category of inherited affine motion candidates,
a category of constructed affine motion candidates, or
a category of zero padding affine motion candidates; or
determining the reordering scheme to indicate that a number of motion candidates from a beginning of the first motion candidate list are to be reordered; or
determining the reordering scheme based on the at least one subgroup of motion candidates.

9. The method of claim 8, wherein the reordering scheme indicates at least one of the following:
only the first subgroup of motion candidates is to be reordered,
a last subgroup of motion candidates is not to be reordered,
the last subgroup of motion candidates is to be reordered if the last subgroup is also the first group,
different subgroups are to be reordered separately,
two motion candidates in different subgroups are not to be reordered together, or
a first motion candidate in a first subgroup is to be put ahead of a second motion candidate in a second subgroup after reordering if the first subgroup is ahead of the second subgroup.

10. The method of claim 6, wherein determining the first motion candidate list comprises:
in accordance with a determination that the reordering scheme indicates that at least one first motion candidate in the first motion candidate list is not to be reordered, determining an order of the first at least one motion candidate within the target motion candidate list according to an original order of the at least one first motion candidate within the first motion candidate list; or
in accordance with a determination that the reordering scheme indicates that at least one first motion candidate in the first motion candidate list is not to be reordered and at least one second motion candidate in the first motion candidate list is to be reordered,
arranging, within the target motion candidate list, the at least one first motion candidate to be ahead of the at least one second motion candidate to be reordered, or
arranging, within the target motion candidate list, the at least one first motion candidate to follow the at least one second motion candidate to be reordered.

11. The method of claim 1, wherein the sub-template comprises samples of at least one color component.

12. The method of claim 11, wherein the sub-template only comprises samples of the luma component, the sub-template comprises samples of the at least one of: a Cb component, a Cr component, a R component, a G component or a B component.

13. The method of claim 1, wherein the conversion comprises:
decoding the current block from the bitstream; or encoding the current block into the bitstream.

14. The method of claim 1, further comprising:
determining, during a conversion between a first block of a video and a bitstream of the video, reference samples of a template or a sub-template of the first block using a Local illumination compensation (LIC) method, wherein a first set of LIC parameters of the template of the sub-templates are determined based on a second set of LIC parameters of the first block; and
determining a target motion candidate list based on the reference samples.

15. The method of claim 14, wherein:
the first set of LIC parameters for both left and above templates or sub-templates are the same as the second set of LIC parameters of the first block; or the first set of LIC parameters for a left template or sub-template are derived as the second set of LIC parameters of the first block; or the first set of LIC parameters for a above template or sub-template are derived as the second set of LIC parameters of the first block; or the LIC method is applied when a LIC flag of a corresponding candidate is true; or the reference samples of the template are derived with a multi-hypothesis prediction method if a corresponding merge candidate uses multi-hypothesis prediction.

16. The method of claim 1, further comprising:
determining, during a conversion between a second block of a video and a bitstream of the video, reference samples of a template or sub-template of the second block according to an Overlapped Block Motion Compensation (OBMC) method; and determining a target motion candidate list based on the reference samples of the template or sub-template.

17. The method of claim 1, further comprising:
storing the bitstream in a non-transitory computer-readable recording medium.

18. An apparatus for processing video data comprising a processor and a non-transitory memory with instructions thereon, wherein the instructions upon execution by the processor, cause the processor to:

determine, during a conversion between a current block of a video and a bitstream of the video, reference samples of a sub-template of the current block based on a first set of reference samples of the sub-template in a first reference list and a second set of reference samples of the sub-template in a second reference list, wherein the first reference list is different from the second reference list, wherein the reference samples of the sub-template (RT) are determined according to:

$RT(x,y)=(RT_0(x,y)+RT_1(x,y)+1)>>1$, or $RT(x,y)=((2^N-w)*RT_0(x,y)+w*RT_1(x,y)+2^{N-1})>>N$ wherein $RT_0$ denotes the first set of reference samples and $RT_1$ denotes the second set of reference samples;

determining a target motion candidate list based on the reference samples of the sub-template; and performing the conversion based on the target motion candidate list.

19. A non-transitory computer-readable storage medium storing instructions that cause a processor to:
determining, during a conversion between a current block of a video and a bitstream of the video, reference samples of a sub-template of the current block based on a first set of reference samples of the sub-template in a first reference list and a second set of reference samples of the sub-template in a second reference list, wherein the first reference list is different from the second reference list, wherein the reference samples of the sub-template (RT) are determined according to:

$RT(x,y)=(RT_0(x,y)+RT_1(x,y)+1)>>1$, or $RT(x,y)=((2^N-w)*RT_0(x,y)+w*RT_1(x,y)+2^{N-1})>>N$ wherein $RT_0$ denotes the first set of reference samples and $RT_1$ denotes the second set of reference samples;

determining a target motion candidate list based on the reference samples of the sub-template;

performing the conversion based on the target motion candidate list.

\* \* \* \* \*